(12) United States Patent
Au

(10) Patent No.: US 11,995,408 B2
(45) Date of Patent: May 28, 2024

(54) RELATIVISTIC FIELD EFFECT METHODS TO OPTIMIZE CREATIVE AWARENESS

(71) Applicant: Lawrence Au, Vienna, VA (US)

(72) Inventor: Lawrence Au, Vienna, VA (US)

( * ) Notice: Subject to any disclaimer, the term of this patent is extended or adjusted under 35 U.S.C. 154(b) by 278 days.

(21) Appl. No.: 17/676,660

(22) Filed: Feb. 21, 2022

(65) Prior Publication Data

US 2023/0267275 A1    Aug. 24, 2023

(51) Int. Cl.
*G06F 40/30* (2020.01)
*G06F 18/22* (2023.01)
*G06N 5/02* (2023.01)

(52) U.S. Cl.
CPC ............. *G06F 40/30* (2020.01); *G06F 18/22* (2023.01); *G06N 5/02* (2013.01)

(58) Field of Classification Search
CPC ................................. G06F 40/30; G06N 5/02
USPC ................................. 704/231, 232, 236, 237
See application file for complete search history.

(56) References Cited

U.S. PATENT DOCUMENTS

2015/0350259 A1* 12/2015 Garg .................... H04L 51/52
                                                  709/203

* cited by examiner

*Primary Examiner* — George C Monikang

(57) ABSTRACT

A self-correction economic resource allocation system, based on measurements of open-mindedness and creativity in narrative content, wherein an automatically generated empirical polysemous dictionary stores cause and effect meanings for parsing narrative content. Narrative content is automatically analyzed for metrics of rootedness, clarity, open-mindedness and creativity, and top performing content creators are chosen to validate cryptocurrency transactions, and to vote on system governance proposals, and to participate in appeal level smart contract arbitration narrative conversations.

12 Claims, 83 Drawing Sheets

Self-correcting Economic Goals Adjustment System

Example Of Causal Direction Filter Method Analyzing Sun and Streetlights

*Ingested Symbol Sequences, (FIG. 2):*

Just before sunset the streetlights turn on, so the sun goes down because the streetlights turn on.

Streetlights turn on in the city when skies darken, then the sun sets.

Streetlights turn on when skies darken, unless they are on timers, then it doesn't matter if the sun is shining.

The sun sets over desert, over endless dunes.

The sun sets over ocean, with seagulls hovering to watch it.

The sun sets over polar ice cap, over white snow.

The sun set over Mount Everest, the wind drowning out my words.

---

*Analysis: (FIG. 3):*
Symbol 'A' streetlights co-occurrences: just, before, sunset, the, sun, turn on, so, goes down, because the, in the city, when, skies darken, then the, sets, skies darken, unless they, are on, timers, then it, doesn't matter, is shining.
Symbol 'A' streetlights co-occurrence Cardinality: a = 21.

Symbol 'B' sun co-occurrences: just, before, sunset, the, streetlights, turn on, so, goes down, because the, in the city, when, skies darken, then the, sets, skies darken, unless they, are on, timers, then it, doesn't matter, is shining, over, desert, endless dunes, ocean, seagulls, hovering, to watch it, polar ice cap, white snow, Mount Everest, wind, drowning out, my words.
Symbol 'B' sun co-occurrence Cardinality: b = 34.

Is a > b ? NO, so remove causal link streetlights => sun
b > c, so allow causal link sun => streetlights

FIG. 4

Example Of Causal Direction Filter Method Analyzing Stationkeeping and Attitude Control

*note: Co-occurence terms lists are from FIG. 2 Symbol Index to Collocated Symbols*

Symbol "stationkeeping" 30 co-occurring terms: ("approximately three" "attitude" "attitude control" "awaken" "capabilities" "capabilities of the" "energy than" "for precision" "in time for" "kalman" "lot" "lot more" "monopropellant" "months of" "needs for" "of fuel"

Symbol "attitude control 253 co-occurring terms: '("a back" "a composer" "a gradual" "a landing" "a reaction" "a troop of" "abort" "above are" "acceleration" "acpo" "actuator" "affects" "after the start" "aheavya" "already be" "also included" "amateur" "amateur and professional" "an approach" "an empirical" "and a pioneer" "and include the" "and pork" "and tail" "approximately three" "are referred to as the" "artist or even" "as shown by the" "atmosphere and" "attitude" "attitude control" "australian centre" "autocatalytic" "awaken" "bap" "big game" "bittorrent" "black voters" "blades" "blades of" "boeing 727" "booster" "bosch" "burgundy" "burgundy and" "burns and" "calculation" "can induce" "capabilities" "capabilities of the" "carried out the" "centre line" "colonial times" "composer" "constant and" "corresponds" "csiro" "deceleration" "described with" "destination" "digital" "dried" "dried fruit" "dutch roll" "empirical" "enables" "enclosed" "enclosed in a" "energy than" "euler" "euler angles" "exceeded the" "exergonic" "filtering" "fired" "fired by a" "first stage" "fitted" "five" "floury" "flux" "for a short period" "for precision" "free energy" "fritters" "from play" "fuze" "gau" "gauge" "gauge the" "gradual" "halva" "hot dog" "however it has" "important" "impossibility" "in the set" "in time for" "in usage" "induce" "infection" "infection by" "information for" "involved some" "it also" "it enables" "it provides" "jigs" "kalman" "landing" "landing the" "lifter" "lot" "lot more" "magnitude" "mere" "mermaid" "mildew" "monopropellant" "months of" "nana" "navigation" "needs for" "neutron flux" "next few" "november" "ocean" "of the performance" "of the reaction" "of the use of" "olmpicos" "on the order of" "opened" "opened his" "operations that" "opticians" "or vertical" "order of magnitude" "out into" "peer" "peer to peer" "phenomenon" "phenomenon called" "piezo" "pilot must" "pioneer" "pitch or" "place by" "platonic" "platonic solid" "pork" "powdery" "powdery mildew" "power and" "prawns" "precision" "problem or" "rate" "reaches" "redefining" "referred" "reliable" "required a" "requires a" "retrieved" "retrieved from the" "ritz" "robert bosch" "roll" "roll and" "roll or" "rolling" "rolling and" "rotations" "rotations are" "rudder" "screwing" "self is" "showed" "shown" "sideslip" "some parents" "stationkeeping" "stoichiometry" "style of music" "subsea" "supplemented" "supplemented with" "surroundings" "surroundings and the" "system" "system was" "system was not" "tail" "tailplane" "take care of" "tasks such as" "ten" "tested" "thaifoodmaster" "that allows for" "the acceleration" "the calculation" "the city on" "the company will" "the destination" "the fuze" "the processor" "the roll" "the rudder" "these were all" "they showed" "this control" "threshold" "threshold and" "threshold for" "through the" "thrust" "thruster" "thrusters" "thrusters are" "time is an" "time world" "to abort" "to be re" "to be tested" "tobacco" "tobacco in" "total" "trackers" "traffic from" "troop" "until it reaches" "updates" "used for" "usual" "very fine" "very low" "vigour" "voters" "was subsequently" "wedge" "wedge is" "were fitted" "wheel" "which affects the" "which corresponds to the" "who uses" "winglets" "wingtips" "yaw" "yaw and" "yawing")

First Test: Causality Link Symbol A "stationkeeping" causes Symbol B "attitude control":
  Symbol A Co-occurrences 30 > Symbol B Co-occurrences 253? NO, so link is deleted

Second Test: Causality Link Symbol A "attitude control" causes Symbol B "stationkeeping":
  Symbol A Co-occurrences 253 > Symbol B Co-occurrences 30? YES, so link is retained

FIG. 5

Example Of A Method To Compute Relativistic Clarity Of Links Between Two Symbols Over A Bigram (S-2) Collocation space

Examples Of Clarity Of Links Between Two Symbols

| Symbol A | Symbol A Coocurrences | Symbol B | A-and-B | A-not-B | Clarity |
|---|---|---|---|---|---|
| and | 470883 | nuclear physics | 954 | 40 | 23.2683 |
| nuclear physics | 991 | cyclotron | 117 | 856 | 0.1365 |
| cyclotron | 973 | chanel | 10 | 895 | 0.0112 |
| perfume | 2054 | and | 1952 | 102 | 18.9515 |
| perfume | 2054 | chanel | 76 | 829 | 0.0916 |
| and | 470883 | or | 317322 | 46011 | 6.8965 |
| or | 363333 | | | | |
| chanel | 905 | | | | |

Interesting Evidence Filter Method

Acceptable ADS Range Examples

| Category | Range Type | Examples Of Boundary Values |
|---|---|---|
| Creative Meaning | Maximum Interestingness | Greatest member of set |
| Engaging Meaning | Elevated Interestingness | 50-90th percentile member of set |
| Boring Literal Meaning | Moderate Interestingness | 5-50th percentile member of set |
| Boring or Circumstantial Meaning | Minimum Interestingness | below 5th percentile members of set, or other smallness criteria |

FIG. 8

Example Of Interesting Evidence Filter Method

Set Of Symbols linked by collocation salience to "Kwajalein Atoll":

```
""                   CLARITIES :0.00000,0.00000,195.00000 DIFFS:0.00000,195.00000 ADS:97.50000
"Kwajalein Atoll"    CLARITIES :0.00000,195.00000,3.88607 DIFFS:195.00000,191.11392 ADS:193.06
"Spacex"             CLARITIES :195.00000,3.88607,0.57444 DIFFS:191.11392,3.31163 ADS:97.21278
"hydroxylammonium"   CLARITIES :3.88607,0.57444,0.43835 DIFFS:3.31163,0.13609 ADS:1.72386
"hercynian"          CLARITIES :0.57444,0.43835,0.43283 DIFFS:0.13609,0.00552 ADS:0.07081
"several times and"  CLARITIES :0.43835,0.43283,0.38901 DIFFS:0.00552,0.04382 ADS:0.02467
"Loret"              CLARITIES :0.43283,0.38901,0.37788 DIFFS:0.04382,0.01113 ADS:0.02747
"the launch"         CLARITIES :0.38901,0.37788,0.22940 DIFFS:0.01113,0.14848 ADS:0.07981
"Aerojet"            CLARITIES :0.37788,0.22940,0.21553 DIFFS:0.14848,0.01387 ADS:0.08118
"SRMU"               CLARITIES :0.22940,0.21553,0.18260 DIFFS:0.01387,0.03293 ADS:0.02340
"monopropellant"     CLARITIES :0.21553,0.18260,0.14336 DIFFS:0.03293,0.03923 ADS:0.03608
"destruct"           CLARITIES :0.18260,0.14336,0.13651 DIFFS:0.03923,0.00685 ADS:0.02304
"the Soyuz"          CLARITIES :0.14336,0.13651,0.13527 DIFFS:0.00685,0.00125 ADS:0.00405
"cadomian"           CLARITIES :0.13651,0.13527,0.12237 DIFFS:0.00125,0.01289 ADS:0.00707
"the launch was"     CLARITIES :0.13527,0.12237,0.11672 DIFFS:0.01289,0.00566 ADS:0.00928
"Vandenberg"         CLARITIES :0.12237,0.11672,0.11586 DIFFS:0.00566,0.00086 ADS:0.00326
"elon "              CLARITIES :0.11672,0.09016,0.06729 DIFFS:0.02656,0.02287 ADS:0.024715
```

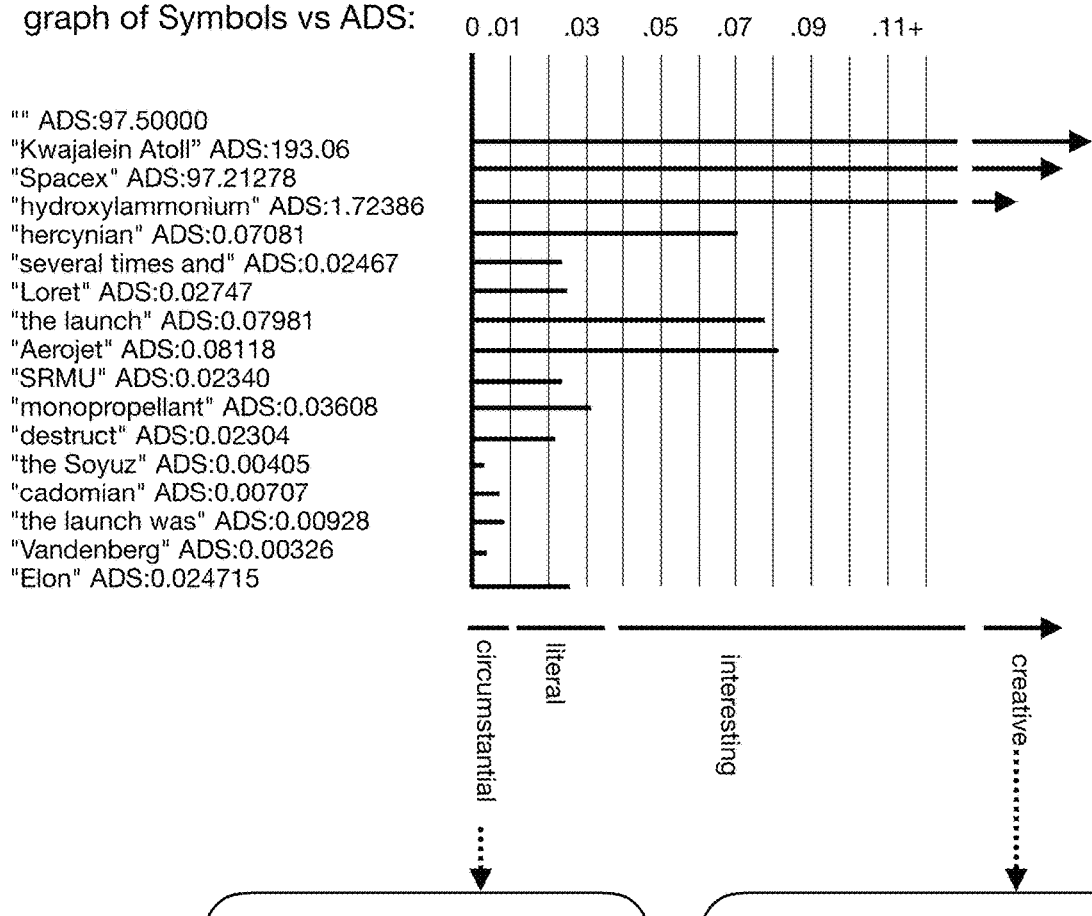

FIG. 9

Example Of Staged Interesting Filter Method

Set Of Symbols linked by weighted collocation salience to "Kwajalein Atoll", Spacex:

```
""  CLARITIES :0.00000,0.00000,382.46384 DIFFS:0.00000,382.46384 ADS:191.23192
"Kwajalein Atoll "
            CLARITIES :0.00000,382.46384,115.44556 DIFFS:382.46384,267.01828 ADS:324.74106
"Spacex"  CLARITIES :382.46384,115.44556,7.33024 DIFFS:267.01828,108.11532 ADS:187.56679
"Elon"  CLARITIES :115.44556,7.33024,4.02582 DIFFS:108.11532,3.30442 ADS:55.70987
"several times and"  CLARITIES :1.76227,1.26277,1.13579 DIFFS:0.49950,0.12698 ADS:0.31324
"hydroxylammonium"  CLARITIES :1.13579,1.02900,0.91843 DIFFS:0.10679,0.11057 ADS:0.10868
"hercynian"  CLARITIES :0.91843,0.88210,0.82596 DIFFS:0.03633,0.05613 ADS:0.04623
"Loret"  CLARITIES :0.82596,0.79468,0.69681 DIFFS:0.03129,0.09787 ADS:0.06458
"the launch"  CLARITIES :0.79468,0.69681,0.67017 DIFFS:0.09787,0.02664 ADS:0.06225
"Aerojet"  CLARITIES :0.49423,0.48808,0.45500 DIFFS:0.00615,0.03308 ADS:0.01961
"srmu"  CLARITIES :0.48808,0.45500,0.43013 DIFFS:0.03308,0.02487 ADS:0.02898
"monopropellant"  CLARITIES :0.45500,0.43013,0.35176 DIFFS:0.02487,0.07836 ADS:0.05162
```

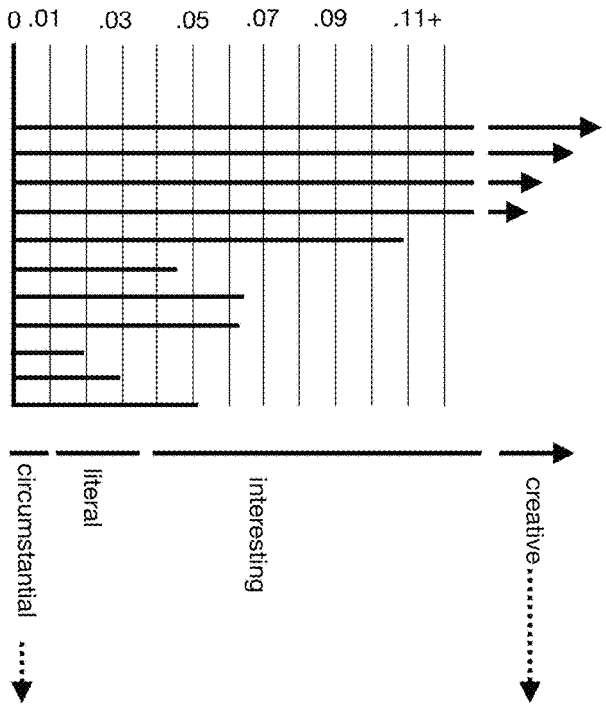

graph of Symbols vs ADS:   0  .01  .03  .05  .07  .09  .11+

"" ADS:191.23192
"Kwajalein Atoll" ADS:324.74106
"Spacex" ADS:187.56679
"Elon" ADS:55.70987
"several times and" ADS:0.31324
"hydroxylammonium" ADS:0.10868
"hercynian" ADS:0.04623
"Loret" ADS:0.06458
"the launch" ADS:0.06225
"Aerojet" ADS:0.01961
"srmu" ADS:0.02898
"monopropellant" ADS:0.05162 circumstantial  literal  interesting  creative

Interesting Symbol Set E:
Kwajalein Atoll,
Spacex, Elon,
"several times and"

FIG. 11

Example Of Addiction Detected By Total Causal Tree Openness Of Negative 4

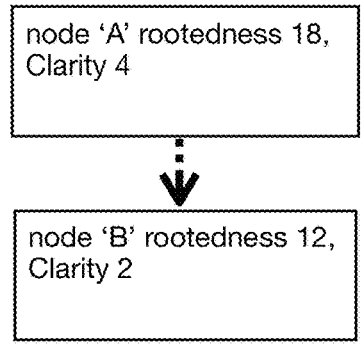

*Nodes are linked leafward in depending rootedness order: 18, 12*

*Node A:*
  *To leafward Node B: expecting positive change in clarity, yet change in clarity 2 - 4 = -2, so Node A openness = -2*

*Node B:*
  *To rootward Node A: expecting negative change in clarity, yet change in clarity 4 - 2 = 2, so Node B openness = -2*

*Causal Tree total openness = sum of node openness = -2 + -2 = -4*

FIG. 12

Example Of Addiction Mitigated By New Node, Detected By Causal Tree Openness Positive 10

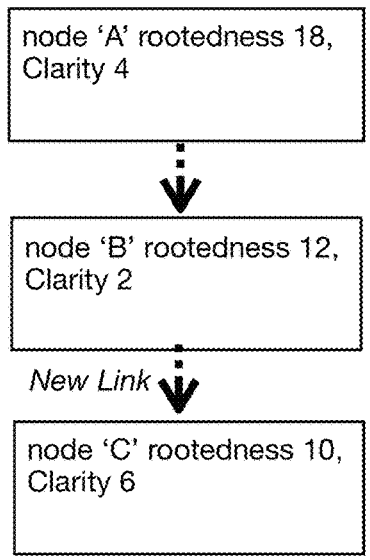

*Nodes are linked leafward in depending rootedness order: 18, 12, 10*

*Node A:*
  *To leafward Node B: expecting positive change in clarity, yet change in clarity 2 - 4 = -2, so Node A to B openness = -2*
  *To leafward Node C: expecting positive change in clarity, got it, change in clarity 6 - 4 = 2, so Node A to C openness = 2*
  *Node A Sum of Node B and C openness = -2 + 2 = 0*

*Node B:*
  *To rootward Node A: expecting negative change in clarity, yet change in clarity 4 - 2 = 2, so Node B to A openness = -2*
  *To leafward Node C: expecting positive change in clarity, got it, change in clarity 6- 2 = 4 , so Node B to C openness = 4*
  *Node B Sum of Node A and B openness = -2 + 4 = 2*

*Node C:*
  *To rootward Node A: expecting negative change in clarity, got it, change in clarity 6 - 4 = 2, so Node B to A openness = 2*
  *To rootward Node B: expecting negative change in clarity, got it, change in clarity 6 - 2= 4, so Node B to C openness = 4*
  *Node B Sum of Node A and B openness = 2 + 4 = 6*

*Causal Tree total openness = sum of node openness = 0 + 2 + 6 = 8*

FIG. 13

Example Of Addictive Anger On Social Media

Example Of Measuring Addictive Anger

*In FIG. 15, Nodes A, C and B are linked leafward in depending rootedness order:*
*18.127, 11.936, 9.829*

*Using the Method of Computing Causal Tree Openness Of FIG. 14:*

*Node A: -3.3125 clarity*
  *To leafward Node B: expecting positive change in clarity, yet*
    *change in clarity -9.625 - -3.3125 = -6.3125, so Node A to B openness = -6.3125*
  *To leafward Node C: expecting positive change in clarity, got it,*
    *change in clarity 5.375 - -3.3125 = , so Node A to C openness = 8.6875*
  *Node A Sum of Node B and C openness = -6.3125 + 8.6875 = 2.375*

*Node C: -0.375 clarity*
  *To rootward Node A: expecting negative change in clarity, got it,*
    *change in clarity 5.375 - -3.3125 = 2, so Node C to A openness = 8.6875*
  *To leafward Node B: expecting positive change in clarity, yet*
    *change in clarity -9.625 - 5.375 = -15 , so Node C to B openness = -15*
  *Node C Sum of Node A and B openness = 8.6875 + -15 = -6.3125*

*Node B: -9.625 clarity*
  *To rootward Node A: expecting negative change in clarity, yet*
    *change in clarity -9.625 - -3.3125 = -6.3125, so Node B to A openness = -6.3125*
  *To rootward Node C: expecting negative change in clarity, got it,*
    *change in clarity -9.625 - 5.375 = -15, so Node B to C openness = -15*
  *Node B Sum of Node A and C openness = -6.3125 + -15 = -21.3125*

*Causal Tree total openness = sum of node openness = 2.375 + -6.3125 + -15 = -18.9375*

FIG. 16

Method Of Allocating Credit To Openminded Causal Nodes

Example Of Allocating Credit To Openminded Causal Nodes

Node A:
"{1} Hola! I am the mother that maced you in the ladies room last week and I would do it again. I hope that pepper-spray"

Openness 2.375

Since linked nodes B and C both have negative Openness, they are disqualified from being To-nodes, so allocate the 115 Inbound Credits to the Node A itself.

Node B:
"{1} burned the fuck out of you. I think it's sick that you go into ladies rooms and you encourage others to do it on social media. Go to the 1 your ID says to! Keep your "

Openness -21.3125
Since the linked node C has negative Openness, allocate the 165 Inbound Credits to the only other linked node A.

Node C:
nastie dick away from us! {2}What the hell do you know about what my ID says? Did you even ask to see it before you pepper sprayed me?"

Openness -6.3125

Since the linked node B has negative Openness, allocate the 131 Inbound Credits to the only other linked node A.

Node A: Outbound Credits 115 + 165 + 131 = 411
Node B: Outbound Credits = 0
Node C: Outbound Credits = 0

Node A:
"{1} Hola! I am the mother that maced you in the ladies room last week and I would do it again. I hope that pepper-spray"

Outbound Credits 411 allocated proportionally across all Source contributors of text to Node A, in this case Source {1} alone receives 411 Credits. Since Source {1} contributed 115 Inbound Credits for Node A plus 165 Credits for Node B plus 25 for "nastie dick away from us!" in Node C, for a total of 305 Inbound Credits, receiving 411 Outbound Credits results a net gain of 411 - 305 = 106 credits of profit.

Source {2} thus receives zero credits despite contributing 106 Inbound Credits for "What the hell do you know about what my ID says? Did you even ask to see it before you pepper sprayed me?", for a net loss of 106 Credits to Source {1}.

FIG. 18

Example Of Addiction Mitigated by New Posts On Social Media

{1} Hola! I am the mother that maced you in the ladies room last week and I would do it again. I hope that pepper-spray burned the fuck out of you. I think it's sick that you go into ladies rooms and you encourage others to do it on social media. Go to the 1 your ID says to! Keep your nastie dick away from us!

{2}What the hell do you know about what my ID says? Did you even ask to see it before you pepper sprayed me? Did you know I was wearing contact lenses and spent the next ten minutes trying to wash the pepper spray out of my eyes? The acids get ground into my eyeballs.

{1}You deserve every minute of that agony, you dangerous creep.

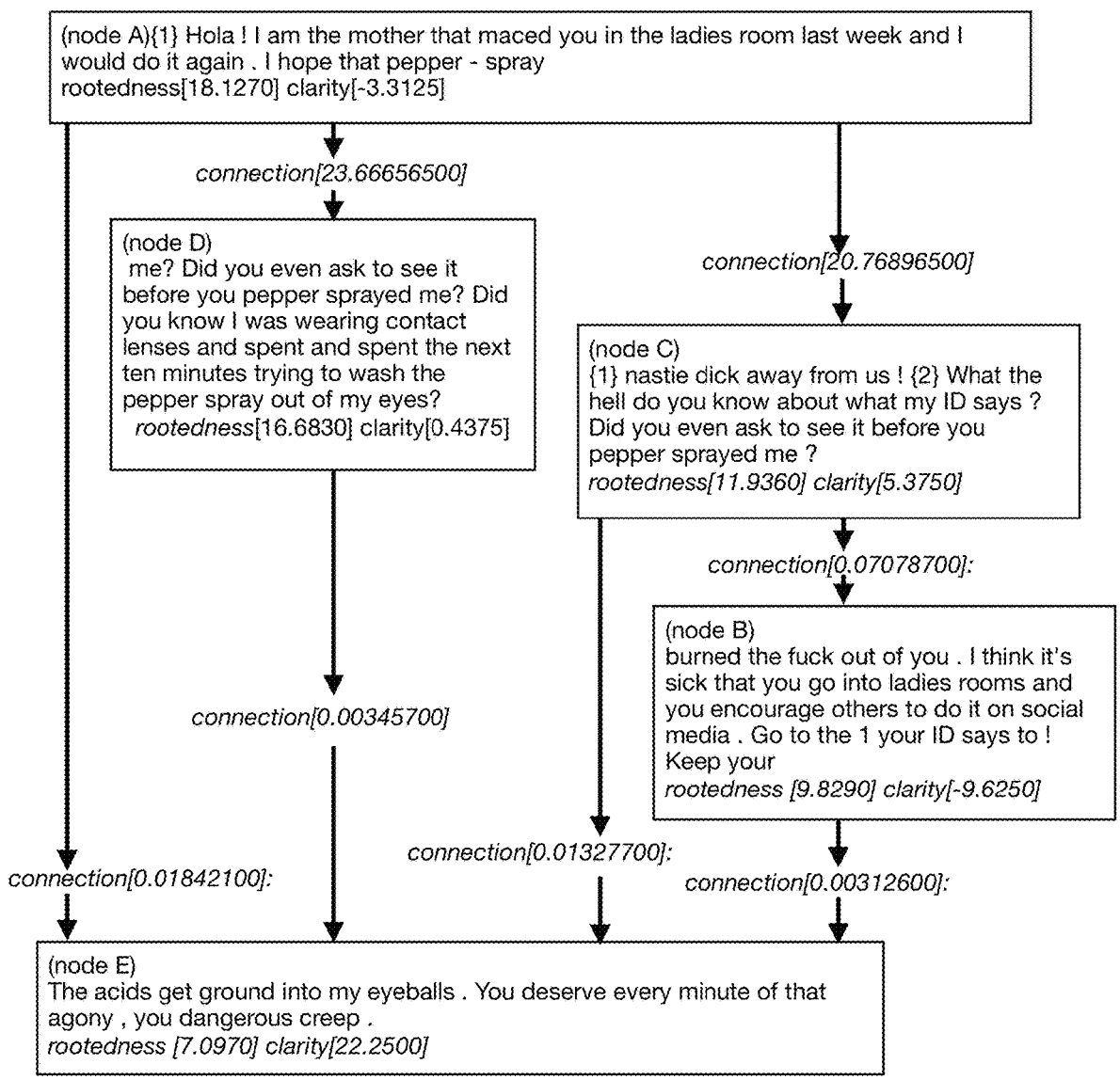

FIG. 19

Example Of Measuring Mitigated Addictive Anger

*In FIG. 19, Nodes A, C and B from Fig. 15, together with new nodes from Fig. 19 of D and E are linked leafward in depending rootedness order: A, D, C, B, E with corresponding rootedness 18.127, 16.683, 11.936, 9.829, 7.097*

*Node A: -3.3125 clarity*
    *Node A to B calculates increase in clarity -9.625 - -3.3125 = -6.3125*
    *Node A to C calculates increase in clarity -5.375 - -3.3125 = -2.0625*
    *Node A to D calculates increase in clarity 0.4375 - -3.3125 = 3.75*
    *Node A to E calculates increase in clarity 22.25 - -3.3125 = 25.5625*
  *Node A Sum of B,C,D,E openness = -6.3125 + -2.0625 + 3.75 + 25.5625 = 20.9375*

*Node D: 0.4375 clarity*
    *Node D to A calculates decrease in clarity 0.4375 - -3.3125 = 3.75*
    *Node D to C calculates increase in clarity -5.375 - 0.4375 = -5.8125*
    *Node D to B calculates increase in clarity -9.625 - 0.4375 = -10.0625*
    *Node D to E calculates increase in clarity 22.25 - 0.4375 = 21.8125*
  *Node D Sum of A,C,B,E openness = 3.75 + -5.8125 + -10.0625 + 21.8125 = 9.6875*

*Node C: -5.375 clarity*
    *Node C to A calculates decrease in clarity -5.375 - -3.3125 = -2.0625*
    *Node C to D calculates decrease in clarity -5.375 - 0.4375 = -5.8125*
    *Node C to B calculates increase in clarity -9.625 - -5.375 = -15*
    *Node C to E calculates increase in clarity 22.25 - -5.375 = 27.625*
  *Node C Sum of A,D,B,E openness = -2.0625 + -5.8125 + -15 + 27.625 = 4.75*

*Node B: -9.625 clarity*
    *Node B to A calculates decrease in clarity -9.625 - -3.3125 = -6.3125*
    *Node B to D calculates decrease in clarity -9.625 - 0.4375 = -10.0625*
    *Node B to C calculates decrease in clarity -9.625 - -5.375 = -15*
    *Node B to E calculates increase in clarity 22.25 - -9.625 = 31.875*
  *Node B Sum of A,D,C,E openness = -6.3125 + -10.0625 + -15 + 31.875 = 0.5*

*Node E: 22.25 clarity*
    *Node E to A calculates decrease in clarity 22.25 - -3.3125 = 25.5625*
    *Node E to D calculates decrease in clarity 22.25 - 0.4375 = 21.8125*
    *Node E to C calculates decrease in clarity 22.25 - -5.375 = 27.625*
    *Node E to B calculates decrease in clarity 22.25 - -9.625 = 31.875*
  *Node B Sum of A,D,C,B openness = 25.5625 + 21.8125 + 27.625 + 31.875 = 106.875*

*Causal Tree total openness 20.9375 + 9.6875 + 4.75 + 0.5 + 106.875 = 142.75*

FIG. 20

Example Of Overcoming Addictive Anger

"{1}'Hola! I am the mother that maced you in the ladies room last week and I would do it again. I hope that pepper-spray burned the fuck out of you. I think it's sick that you go into ladies rooms and you encourage others to do it on social media. Go to the 1 your ID says to! Keep your nastie dick away from us!

{2}What the hell do you know about what my ID says? Did you even ask to see it before you pepper sprayed me? Did you know I was wearing contact lenses and spent the next ten minutes trying to wash the pepper spray out of my eyes? The acids get ground into my eyeballs. {1}You deserve every minute of that agony, you dangerous creep. I'm sorry my children have to grow up in a world where people like you are running loose everywhere!

{2}Look, I'm sorry I lost my temper. I'm glad you reached out. I was so tied up washing out my eyes and talking to the security guard I didn't get to say what I wanted to say before you left! Here's a selfie of my holding my passport, you see where it says on my passport my sex is F which stands for a female?

{1}But you didn't look like a female!

{2}Why would you say that?

{1}Idk. I was gunna say short hair but I guess you coulda been a female with cancer or meth addiction or just a dyke. What really got me was your face though. Your face is really manly.

{2}I get that a lot. That's why when I was growing up, I really thought F stands for Fail."

FIG. 23

Example Of Measuring The Overcoming Of Addictive Anger node[A] openness[117.6875] "{1}' Hola ! I am the mother that maced you in the ladies room last week and I would do it again . I hope that pepper - spray "

node[B] openness[36.1250] "{1}burned the fuck out of you . I think it's sick that you go into ladies rooms and you encourage others to do it on social media . Go to the 1 your ID says to ! Keep your "

node[C] openness[-12.3125] "{1}nastie dick away from us ! {2}What the hell do you know about what my ID says ? Did you even ask to see it before you pepper sprayed "

node[D] openness[75.9375] "{2}me ? Did you know I was wearing contact lenses and spent the next ten minutes trying to wash the pepper spay out of my eyes ? "

node[E] openness[123.2500] "{2}The acids get ground into my eyeballs . {1}You deserve every minute of that agony , you dangerous creep "

node[F] openness[57.8750]"{1}. I'm sorry my children have to grow up in a world where people like you are running loose everywhere ! {2}Look , I'm sorry I "

node[G] openness[26.1250]"{2}lost my temper . I'm glad you reached out . I was so tied up washing out my eyes and talking to "

node[H] openness[101.8750]"{2}the security guard I didn't get to say what I wanted to say before you left ! Here's a selfie of me holding my passport , you see where it says "

node[I] openness[40.6875] c "{2}on my passport my sex is F which stands for a female ? {1} But you didn't look like a female ! {2}Why would you say that ? "

node[J] openness[0.0000] "{1}Idk . I was gunna say short hair but I guess you coulda been a female with cancer or meth addiction "

node[K] openness[60.6250] "{1}or just a dyke . What really got me was your face though . Your face is really manly . {2}I get that a lot . That's why when I was growing up , I really thought F stands for Fail . "

tree total openness[627.8750]
tree average openness[57.0795] over [11] nodes

FIG. 24

Method Of Allocating Credit To Openminded Sources

Example Of Allocating Credit To Openminded Sources, Part 1 Of 2

*using FIG. 19 and FIG. 20 examples of nodes,*

*Node A: openness 25.9375, 120 Source bytes from Source {1}*
    *Node A to B: is 25.9375 > B openness 6.25? Yes so add B to set of To-nodes*
    *Node A to C: is 25.9375 > C openness 15.5? Yes so add C to set of To-nodes*
    *Node A to D: is 25.9375 > D openness 14.6875? Yes so add D to set of To-nodes*
    *Node A to E: is 25.9375 > E openness 101.875? No*
  *Node A 120 Source Bytes are allocated across set of To-nodes (B,C,D):*
    *Node B, C D each get 40 Credit Bytes*

*Node D: openness 14.6875, 126 Source bytes from Source {2}*
    *Node D to A: is 14.6875 > A openness 25.9375? No*
    *Node D to C: is 14.6875 > C openness 15.5? No*
    *Node D to B: is 14.6875 > B openness 6.25? Yes so add B to set of To-nodes*
    *Node D to E: is 14.6875 > E openness 101.875? No*
  *Node D 126 Source Bytes are allocated across set of To-nodes (B)*
    *Node B gets 126 Credit Bytes*

*Node C: openness 15.5, 27 Source bytes from Source {1}, 103 Source bytes from Source {2}*
    *Node C to A: is 15.5 > A openness 25.9375? No*
    *Node C to D: is 15.5 > A openness 14.6875? Yes so add D to set of To-nodes*
    *Node C to B: is 15.5 > B openness 6.25? Yes so add B to set of To-nodes*
    *Node C to E: is 15.5 > E openness 101.875? No*
  *Node C 27 + 103 = 130 Source Bytes are allocated across set of To-nodes (B,D)*
    *Node B and D each get 65 Credit Bytes*

*Node B: openness 6.25, 169 Source bytes from Source {1}*
    *Node B to A: is 6.25 > A openness 25.9375? No*
    *Node B to D: is 6.25 > A openness 14.6875? No*
    *Node B to C: is 6.25 > C openness 15.5? No*
    *Node B to E: is 14.6875 > E openness 101.875? No*
  *Node B 169 Source Bytes cannot allocated across empty set of To-nodes*
    *allocate to B itself instead*
    *Node B gets 169 Credit bytes*

*Node E: openness 101.875, 63 Source bytes from Source {1}, 40 Source bytes from Source {2}*
    *Node E to A: is 101.875 > A openness 25.9375? Yes so add A to set of To-nodes*
    *Node E to D: is 101.875 > D openness 14.6875? Yes so add D to set of To-nodes*
    *Node E to C: is 101.875 > C openness 15.5? Yes so add C to set of To-nodes*
    *Node E to B: is 101.875 > C openness 6.5? Yes so add B to set of To-nodes*
  *Node E 63 + 40 = 103 Source Bytes are allocated across set of To-nodes (A,D,B,E)*
    *Nodes A,D,C,B each get 25.75 Credit Bytes*

See Fig. 27 for rest of this Example

FIG. 26

Example Of Allocating Credit To Openminded Sources, part 2 of 2 continued from FIG. 26:

Node A: openness 25.9375, 120 Source bytes from Source {1}
    Node A received 25.75 Credit Bytes from Node E
    Node A allocates all 25.75 Credit Bytes to its Source {1}

Node D: openness 14.6875, 126 Source bytes from Source {2}
    Node D received 40 Credit Bytes from Node A
    Node D received 65 Credit Bytes from Node C
    Node D received 25.75 Credit Bytes from Node E
    Node D total Credit Bytes = 40 + 65 + 25.75 = 130.75
    Node D allocates all 130.75 Credit Bytes to Source {2}

Node C: openness 15.5, 27 Source bytes from Source {1}, 103 Source bytes from Source {2}
    Node C received 40 Credit Bytes from Node A
    Node C received 25.75 Credit Bytes from Node E
    Node C total Credit Bytes = 40 + 25.75 = 65.75
    Node C allocates 65.75 * (27/130) Source Byte to Source {1} = 13.66
    Node C allocates 65.75 * (103/130) Source Bytes to Source {2} = 52.09

Node B: openness 6.25, 169 Source bytes from Source {1}
    Node B received 40 Credit Bytes from Node A
    Node B received 126 Credit Bytes from Node D
    Node B received 65 Credit Bytes from Node D
    Node B received 169 Credit Bytes from Node B itself
    Node B received 25.75 Credit Bytes from Node E
    Node B total Credit Bytes = 40 + 126 + 65 + 169 + 25.75 = 425.75
    Node B allocates all 425.75 Credit Bytes to Source {1}

Node E: openness 101.875, 63 Source bytes from Source {1}, 40 Source bytes from Source {2}
    Node E received no Credit Bytes

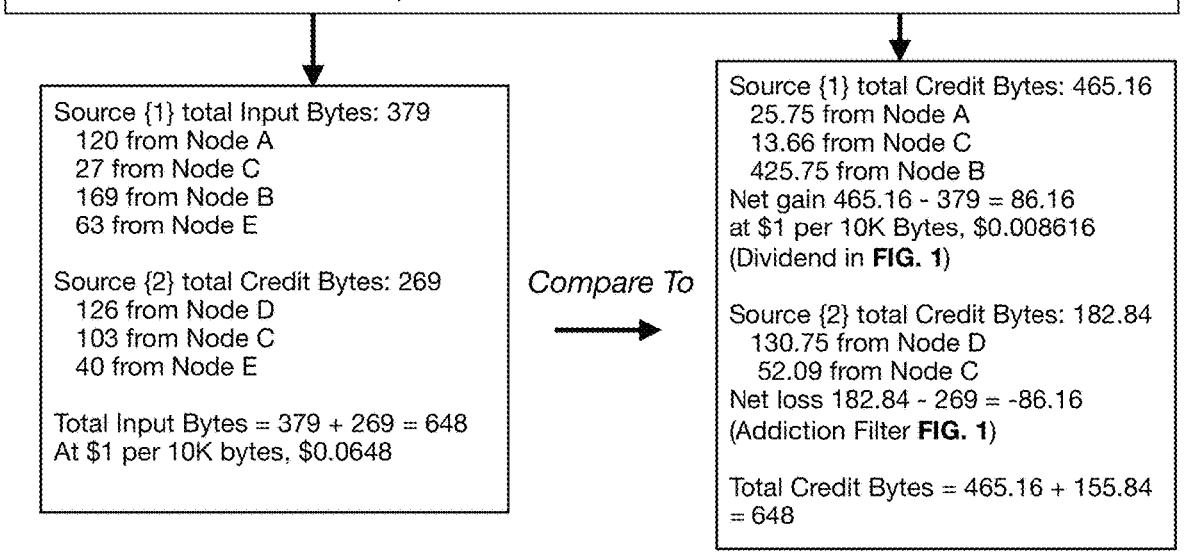

Source {1} total Input Bytes: 379
  120 from Node A
  27 from Node C
  169 from Node B
  63 from Node E Source {2} total Credit Bytes: 269
  126 from Node D
  103 from Node C
  40 from Node E Total Input Bytes = 379 + 269 = 648
At $1 per 10K bytes, $0.0648

Compare To →

Source {1} total Credit Bytes: 465.16
  25.75 from Node A
  13.66 from Node C
  425.75 from Node B
Net gain 465.16 - 379 = 86.16
at $1 per 10K Bytes, $0.008616
(Dividend in FIG. 1)

Source {2} total Credit Bytes: 182.84
  130.75 from Node D
  52.09 from Node C
Net loss 182.84 - 269 = -86.16
(Addiction Filter FIG. 1)

Total Credit Bytes = 465.16 + 155.84 = 648

FIG. 27

Example Of Rewarding
The Overcoming Of Addictive Anger node[A] openness[117.6875] credits[46.9286] "{1}' Hola ! I am the mother that maced you in the ladies room last week and I would do it again . I hope that pepper - spray "

node[B] openness[36.1250] credits[203.1905] "{1}burned the fuck out of you . I think it's sick that you go into ladies rooms and you encourage others to do it on social media . Go to the 1 your ID says to ! Keep your "

node[C] openness[-12.3125] credits[0.0000] "{1}nastie dick away from us ! {2}What the hell do you know about what my ID says ? Did you even ask to see it before you pepper sprayed "

node[D] openness[75.9375] credits[93.1571] "{2}me ? Did you know I was wearing contact lenses and spent the next ten minutes trying to wash the pepper spay out of my eyes ? "

node[E] openness[123.2500] credits[0.0000]"{2}The acids get ground into my eyeballs . {1}You deserve every minute of that agony , you dangerous creep "

node[F] openness[57.8750] credits[42.6286] "{1}. I'm sorry my children have to grow up in a world where people like you are running loose everywhere ! {2}Look , I'm sorry I "

node[G] openness[26.1250] credits[404.6905] "{2}lost my temper . I'm glad you reached out . I was so tied up washing out my eyes and talking to "

node[H] openness[101.8750] credits[31.8571] "{2}the security guard I didn't get to say what I wanted to say before you left ! Here's a selfie of me holding my passport , you see where it says "

node[I] openness[40.6875] credits[300.6905] "{2}on my passport my sex is F which stands for a female ? {1}But you didn't look like a female ! {2}Why would you say that ? "

node[J] openness[0.0000] credits[0.0000]"{1}Idk . I was gunna say short hair but I guess you coulda been a female with cancer or meth addiction "

node[K] openness[60.6250] credits[85.8571] "{1}or just a dyke . What really got me was your face though . Your face is really manly . {2}I get that a lot . That's why when I was growing up , I really thought F stands for Fail . "

tree total openness[627.8750]
tree average openness[57.0795] over [11] nodes

Source {1} Input Bytes[706.0000] Credit Bytes[521.4443], net loss 521.4443 - 706 = -184.5557 at $1 per 10K bytes, -$0.0184557 loss on $0.0706, for a 26% loss Source {2} Input Bytes[699.0000] Credit Bytes[883.5557], net gain 883.5557 - 699 = 184.5557 at $1 per 10K Bytes, $0.0184557 profit on $0.0699, for a 32% gain

FIG. 28

Example Of Rewarding Relative Open-mindedness

In this social media dialog, the contributing sources are:
{1} Brad Parscale, RNC  {2} Alexandria Ocasio Cortez
{3} Wayne Dunham @wdunlap  {4} Larry Smith @scottside800

---

{1} Radical protestors, fueled by a week of apocalyptic media coverage, interfered with @realDonaldTrump supporters at the rally. They even blocked access to the metal detectors, preventing people from entering. Thanks to the 1,000s who made it anyway!

{2} Actually you just got ROCKED by teens on TikTok who flooded the Trump campaign w/ fake ticket reservations & tricked you into believing a million people wanted your white supremacist open mic enough to pack an arena during COVID. Shout out to Zoomers. Y'all make me so proud. Pop allies, we see and appreciate your contributions in the fight for justice too.

{3} FAILED AGAIN, AOC... 'In addition to the over 11 MILLION who watched President Trump's rally online, a whopping 7.7 MILLION more watched on Fox News. That's more viewers than any Democrat primary debate got on MSNBC or CNN. Huge!' - Ronna McDaniel {4} Including the people who were paid to go to the rally (see Craigslists ads), the sad reality is that trump manipulated the 38% of Americans who are mentally vulnerable to volunteer to go to the gas chamber because he had cabin fever.

--- node[A] openness[74.4375] credits[130.2917] "{1}Radical protestors , fueled by a week of apocalyptic media coverage , interfered with @ realDonaldTrump supporters at the rally . They even "]node[B] openness[28.6250] credits[14.6250] text["{1}blocked access to the metal detectors , preventing people from entering . Thanks to the 1 , 000s who made it anyway ! "]
node[C] openness[44.2500] credits[421.2917] "{2}Actually you just got ROCKED by teens on TikTok who flooded the Trump campaign w / fake "
node[D] openness[81.3125] credits[51.6250] "{2}ticket reservations & tricked you into believing a million people wanted your white supremacist open mic enough to pack an arena"
node[E] openness[137.0000] credits[14.6250] "{2}during COVID . Shout out to Zoomers . Y ' all make me so proud . Pop allies , we see "
node[F] openness[238.8125] credits[0.0000] "{2}and appreciate your contributions in the fight for justice too . {3}FAILED AGAIN , AOC ... ' In addition to the over 11 "
node[G] openness[125.3125] credits[31.6250] "{3}MILLION who watched President Trump ' s rally online , a whopping 7 . 7 MILLION more watched on Fox "
node[H] openness[81.3125] credits[51.6250] "{3}News . That's more viewers than any Democrat primary debate got on MSNBC or CNN . Huge !' - Ronna MeDaniel "]
node[I] openness[65.6875] credits[200.2917] "{4}Including the people who were paid to go to the rally ( see Craigslists ads ), the sad reality is that trump manipulated the 38 % of Americans who are mentally vulnerable to volunteer to go to the gas chamber because he had cabin fever . "

Tree Total Openness[876.7500] Tree Avg Node Openness[97.4167] over [9] nodes (FIG. 1) Investment flows between sources:
  Source[1] Input Bytes[258.0000] Credit Bytes[262.9167] Gain 1%
  Source[2] Input Bytes[367.0000] Credit Bytes[575.5417] Gain 57%
  Source[3] Input Bytes[259.0000] Credit Bytes[83.2500] Loss 68%
  Source[4] Input Bytes[238.0000] Credit Bytes[200.2917] Loss 16%

FIG. 29

Example Of A Review Of A Cash Transaction

{1} Bill came to $101.00...was scratching my head at why it was so much? Jessica our server didn't mention anything at all. Not cool. Looked at the menus didn't see anything written. What am I missing here? Ohhhh a sneaky 20% gratuity added. Why would I ever come back to an establishment that is going to do something like that? I'm honestly very disappointed because I anticipated being a regular here. I hope management addresses this.

{2} Hello again Amanda -- Thanks again for your 5-star Yelp review less than a month ago. We're glad you came back again in September to get more of the happy hour food you so kindly raved about less than 30 days ago. You may not have noticed the signs everywhere stating the standard tipping policy, which is why it may have taken you buy surprise when you looked at the bill. These are indeed tough times for businesses, especially restaurants who have to limit capacity to maintain safe distancing. We can certainly understand that not everyone may be happy with this policy, which is why we have signs posted everywhere throughout the restaurant so guests can choose to eat elsewhere if that's just too generous for their personal preferences.

{1} Update to the defensive and aggressive response from management: Signage on the 20% automatic gratuity was nowhere to be found. Menu? Table? Nope. Server? Nope. Is this supposed to be a scavenger hunt to find the signage on the automatic gratuity - at the least it should 100% be listed on the menu which it WAS NOT. I have no idea where all this 'SIGNAGE was EVERYWHERE???' We entered, said table for 2 for inside, were taken directly to our table...and saw no signage!!! Can you show me a picture of where you display your signage about automatic gratuity?"

Automatic Moderation Results in FIG. 31

FIG. 30

Example Of Automatically Moderating A Review Using Open-mindedness Criteria

From FIG. 30:

node[0] openness[89.7500] credits[82.8714] "{1}Bill came to $ 101 . 00 ... was scratching my head at why it was so much ? Jessica our "
node[1] openness[54.2500] credits[82.8714] "{1}server didn't mention anything at all . Not cool . Looked at the menus didn't see anything written . What am I missing here "
node[2] openness[-27.2500] credits[0.0000] "{1}? Ohhhh a sneaky 20 % gratuity added . Why would I ever come back to an "
node[3] openness[21.5000] credits[82.8714] "{1}establishment that is going to do something like that ? I'm honestly very disappointed because I anticipated being a regular "
node[4] openness[-4.5000] credits[0.0000] "{1}here . I hope management addresses this . {2}Hello again Amanda Thanks again for your 5 - star Yelp review less than a "
node[5] openness[0.0000] credits[0.0000] "{2}month ago . We're glad you came back again in September to get more of the happy hour food you so kindly raved about less than 30 days ago . You may not have noticed the "
node[6] openness[-5.7500] credits[0.0000] "{2}signs everywhere stating the standard tipping policy , which is why it may have taken you buy surprise when you looked at the "
node[7] openness[-50.0000] credits[0.0000] "{2}bill . These are indeed tough times for businesses , especially restaurants who have to limit capacity to maintain "
node[8] openness[173.1250] credits[251.0714] "{2}safe distancing . We can certainly understand that not everyone may be happy with this policy , which is why we have signs posted everywhere "
node[9] openness[-43.5625] credits[0.0000] "{2}throughout the restaurant so guests can choose to eat elsewhere if that's just too generous for their personal preferences . {1}Update to the defensive and aggressive "
node[10] openness[24.8125] credits[82.8714] "{1}response from management : Signage on the 20 % automatic gratuity was nowhere to be found . Menu ? Table "
node[11] openness[-51.0000] credits[0.0000] "{1}? Nope . Server ? Nope . Is this supposed to be a scavenger hunt to find the signage on the "
node[12] openness[141.9375] credits[274.5714] "{1}automatic gratuity at the least it should 100 % be listed on the menu which it WAS NOT . I have no idea where all "
node[13] openness[13.5625] credits[187.8714] "{1}this ' SIGNAGE was EVERYWHERE ???' We entered , said table for 2 for inside , were taken directly to "
node[14] openness[0.0000] credits[0.0000] "{1}our table ... and saw no signage !!! Can you show me a picture of where you display your signage about automatic gratuity ? "

Tree Total Openness[336.8750] Tree Average Node Openness[22.4583] over [15] nodes Investment credit flows between sources:
  Source[1] Input Bytes[1025.0000] Output Bytes[1354.9286] Gain 32%
  Source[2] Input Bytes[751.0000] Output Bytes[421.0714] Loss 44%

FIG. 31

Example Of Verifying Transactions With Open-mindedness Criteria

From FIG. 30, FIG. 32 node[0] openness[89.7500] credits[82.8714] "{1}Bill came to $ 101 . 00 ... was scratching my head at why it was so much ? Jessica our "
node[1] openness[54.2500] credits[82.8714] "{1}server didn't mention anything at all . Not cool . Looked at the menus didn't see anything written . What am I missing here "
node[2] openness[-27.2500] credits[0.0000] "{1}? Ohhhh a sneaky 20 % gratuity added . Why would I ever come back to an "
node[3] openness[21.5000] credits[82.8714] "{1}establishment that is going to do something like that ? I'm honestly very disappointed because I anticipated being a regular "
node[4] openness[-4.5000] credits[0.0000] "{1}here . I hope management addresses this . {2}Hello again Amanda Thanks again for your 5 - star Yelp review less than a "
node[5] openness[0.0000] credits[0.0000] "{2}month ago . We're glad you came back again in September to get more of the happy hour food you so kindly raved about less than 30 days ago . You may not have noticed the "
node[6] openness[-5.7500] credits[0.0000] "{2}signs everywhere stating the standard tipping policy , which is why it may have taken you buy surprise when you looked at the "
node[7] openness[-50.0000] credits[0.0000] "{2}bill . These are indeed tough times for businesses , especially restaurants who have to limit capacity to maintain "
node[8] openness[173.1250] credits[251.0714] "{2}safe distancing . We can certainly understand that not everyone may be happy with this policy , which is why we have signs posted everywhere "
node[9] openness[-43.5625] credits[0.0000] "{2}throughout the restaurant so guests can choose to eat elsewhere if that's just too generous for their personal preferences . {1}Update to the defensive and aggressive "
node[10] openness[24.8125] credits[82.8714] "{1}response from management : Signage on the 20 % automatic gratuity was nowhere to be found . Menu ? Table "
node[11] openness[-51.0000] credits[0.0000] "{1}? Nope . Server ? Nope . Is this supposed to be a scavenger hunt to find the signage on the "
node[12] openness[141.9375] credits[274.5714] "{1}automatic gratuity at the least it should 100 % be listed on the menu which it WAS NOT . I have no idea where all "
node[13] openness[13.5625] credits[187.8714] "{1}this ' SIGNAGE was EVERYWHERE ???' We entered , said table for 2 for inside , were taken directly to "
node[14] openness[0.0000] credits[0.0000] "{1}our table ... and saw no signage !!! Can you show me a picture of where you display your signage about automatic gratuity ? "

Tree Total Openness[336.8750] Tree Average Node Openness[22.4583] over [15] nodes Investment credit flows between sources:
  Source[1] Input Bytes[1025.0000] Output Bytes[1354.9286] Gain 32%
  Source[2] Input Bytes[751.0000] Output Bytes[421.0714] Loss 44%

Automated Adjustment Of Transaction Amount: $101.00 * (1 - 44%) = $101.00 * 56% = $56.56

FIG. 33

Example Of Detecting Terrifying Causality
(in Fig.15 and Fig.16)

*In FIG. 15, Nodes A, C and B are linked leafward in depending rootedness order:*
*18.127, 11.936, 9.829*

*Node A:*
"{1} Hola ! I am the mother that maced you in the ladies room last week and I would do it
again . I hope that pepper - spray"
rootedness[18.1270] clarity[-3.3125]

*To leafward Node B: expecting positive change in clarity, yet*
      *change in clarity  -9.625 - -3.3125 = -6.3125, so Node A to B openness = -6.3125*
   *To leafward Node C: expecting positive change in clarity, got it,*
      *change in clarity 5.375 - -3.3125 = , so Node A to C openness = 8.6875*
   *Node A Sum of Node B and C openness = -6.3125 + 8.6875 = 2.375*

*Node C:*
"{1} nastie dick away from us ! {2} What the hell do you know about what my ID says ? Did
you even ask to see it before you pepper sprayed me ? "
rootedneses[11.9360] clarity[5.3750]

*To rootward Node A: expecting negative change in clarity, got it,*
      *change in clarity 5.375 - -3.3125 = 2, so Node C to A openness = 8.6875*
   *To leafward Node B: expecting positive change in clarity, yet*
      *change in clarity -9.625 - 5.375 = -15 , so Node C to B openness = -15*
   *Node C Sum of Node A and B openness = 8.6875 + -15 = -6.3125*

*Node B:*
"burned the fuck out of you . I think it's sick that you go into ladies rooms and you encourage
others to do it on social media . Go to the 1 your ID says to ! Keep your
rootedness [9.8290] clarity[-9.6250] "

*To rootward Node A: expecting negative change in clarity, yet*
      *change in clarity -9.625 - -3.3125 = -6.3125, so Node B to A openness = -6.3125*
   *To rootward Node C: expecting negative change in clarity, got it,*
      *change in clarity -9.625 - 5.375 = -15, so Node B to C openness = -15*
   *Node B Sum of Node A and C openness = -6.3125 + -15 = -21.3125*

*Causal Tree total openness = sum of node openness = 2.375 + -6.3125 + -15 = -18.9375*

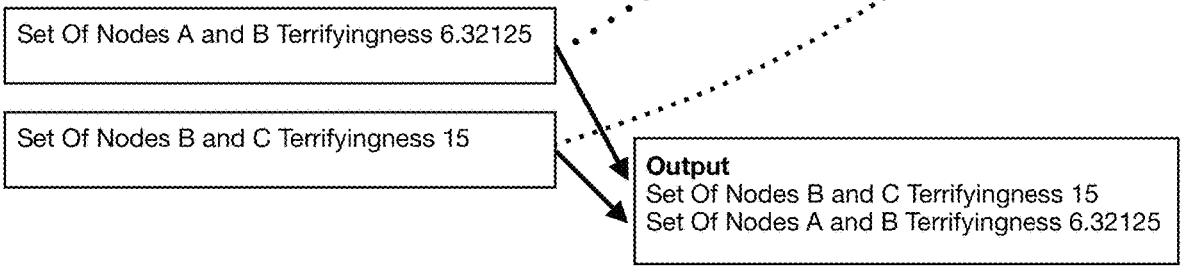

Set Of Nodes A and B Terrifyingness 6.32125

Set Of Nodes B and C Terrifyingness 15

Output
Set Of Nodes B and C Terrifyingness 15
Set Of Nodes A and B Terrifyingness 6.32125

FIG. 36

Example Of Detecting Inspiring Causality

*From FIG. 15, FIG. 16: Nodes A, C and B are linked leafward in depending rootedness order: 18.127, 11.936, 9.829, and open-mindedness of the A to B, and B to C links changes in Fig. 20.*

Using the Method Of Fig. 35, the causal tree of Fig. 16 produces two pairs of nodes selected for Terrifyingness:

Set Of Nodes B and C Terrifyingness 15
Set Of Nodes A and B Terrifyingness 6.32125

*In FIG. 19, Nodes A, C and B from Fig. 15, together with new nodes from Fig. 19 of D and E are linked leafward in depending rootedness order: A, D, C, B, E with corresponding rootedness 18.127, 16.683, 11.936, 9.829, 7.097*

*The new Node D has openmindedness relative to Nodes B of -10.0625 and relative to C of -5.8125 (in Fig. 20), for a total openmindedness delta relative to the pair (B,C) of -10.0625 + -5.8125 = -15.875. The new Node D has open-mindedness relative to Node A of 3.75, for a total openmindedness delta relative to the pair of (A,B) of -10.0625 + 3.75 = -6.3175*

*The new Node E has open-mindedness relative to Nodes B of 31.875 and relative to C of 27.625 for a total openmindedness delta relative to the pair (B,C) of 31.875 + 27.625 = 59.5. The new Node E has open-mindedness relative to Node A of 25.5625, for a total openmindedness delta relative to the pair of (A,B) of 25.5625 + 31.875 = 57.4375*

*Since Node E has positive reversals and Node D has negative, sorting by greatest total reversals puts Node E way before Node D. The whining of Node D*

*"{2}me ? Did you know I was wearing contact lenses and spent the next ten minutes trying to wash the pepper spay out of my eyes ? "*

*is not inspiring whereas Node E*

*"{2}The acids get ground into my eyeballs . {1} You deserve every minute of that agony , you dangerous creep."*

*is clearly inspiringly authentic.*

FIG. 38

Method For Transparent Moderation With Recourse

Method To Detect Cross-Posting Open-mindedness

Example of Independent Postings

Input
"{3} I know you feel like a lady, but you are obviously a man. Did I hear you talk about going into the ladies room? You can't go in there. I've got a young lady here. It's not right for you to be in there when she is.

{4} But, I am a woman.

{3} Well, you can think what you want, but we all know you are obviously a man.

{4} I could go in after you are done. OK?

{3} It's disgusting you think you can use the women's bathroom. It's just not right. What message is this to my daughter?

{5} He surely can go to the lady's room. What makes this such an issue for you? It makes me so uncomfortable hearing you talk like this: If she's going to use the womens bathroom, she's minding her business, you can't discriminate like this. I know how ppl feel yucky about me what with my one leg and with this blotchy vitiligo. "

FIG. 41

Example of Independent Postings Analysis

Example of Independent Postings Credits Flow

Output node[J] openness[46.1250] credits[70.9500] text["{3}I know you feel like a lady , but you are obviously a man . Did I hear you talk about going into the ladies room ? You can't go in there . I've got a young lady "]

node[K] openness[70.1250] credits[49.2000] text["{3}here . It's not right for you to be in there when she is . {4}But , I am a woman . {3}Well , "]

node[L] openness[26.0625] credits[212.9500] text["{3}you can think what you want , but we all know you are obviously a man . {4}I could go in after you are done . OK "]

node[M] openness[46.1250] credits[70.9500] text["{4}? {3}It's disgusting you think you can use the women's bathroom . It's just not right . What message is this to my daughter ? "]

node[N] openness[6.8125] credits[212.9500] text["{5}He surely can go to the lady's room . What makes this such an issue for you ? It makes "]

node[O] openness[179.1250] credits[0.0000] text["{5}me so uncomfortable hearing you talk like this : If she's going to use the womens bathroom , she's minding her business , you can't discriminate like this . I know how ppl feel yucky about me what with my one leg and with this blotchy vitiligo . "]

balance of credit flows between sources:
  source{3} debit[420.0000] credit[389.4559]
  source{4} debit[61.0000] credit[124.5941]
  source{5} debit[333.0000] credit[299.9500]

FIG. 43

Example Of Cross Postings Open-mindedness

*In FIG. 44, Nodes A, C, D, E, B, L and O are graphed in descending rootedness order: O, K, A, M, D, J, C, B, E, L with corresponding rootedness 19.555, 18.965, 18.127, 17.717, 16.683, 14.475, 11.936, 9.829, 7.097, 6.218*
*In FIG. 44, only node O of the Inspiring nodes avoids boundary crossings with the other dialog nodes, so only O should be considered added to the Terrifying Dialog for computation of openness:*

Node A: -3.3125 clarity
    Node A to O calculates decrease in clarity -3.3125 - -21.625 = 18.3125
    Node A to B calculates increase in clarity -9.625 - -3.3125 = -6.3125
    Node A to C calculates increase in clarity -0.375 - -3.3125 = 2.9375
    Node A to D calculates increase in clarity 0.4375 - -3.3125 = 3.75
    Node A to E calculates increase in clarity 22.25 - -3.3125 = 25.5625

Node A Sum of B,C,D,E, A openness = -6.3125 + 2.9375 + 3.75 + 25.5625 + 18.3125 = 44.25

Node D: 0.4375 clarity
    Node D to O calculates decrease in clarity 0.4375 - -21.625 = 22.0625
    Node D to A calculates decrease in clarity 0.4375 - -3.3125 = 3.75
    Node D to C calculates increase in clarity -0.375 - 0.4375 = -0.8125
    Node D to B calculates increase in clarity -9.625 - 0.4375 = -10.0625
    Node D to E calculates increase in clarity 22.25 - 0.4375 = 21.8125
  Node D Sum of A,C,B,E openness = 3.75 + -0.8125 + -10.0625 + 21.8125 + 22.0625 = 36.75

Node C: -0.375 clarity
    Node C to O calculates decrease in clarity -0.375 - -21.625 = 21.25
    Node C to A calculates decrease in clarity -0.375 - -3.3125 = 2.9375
    Node C to D calculates decrease in clarity -0.375 - 0.4375 = -0.8125
    Node C to B calculates increase in clarity -9.625 - -0.375 = -9.25
    Node C to E calculates increase in clarity 22.25 - -0.375 = 22.625
  Node C Sum of A,D,B,E openness = 21.25 + 2.9375 + -0.8125 + -9.25 + 22.625 = 15.5

Node B: -9.625 clarity
    Node B to O calculates decrease in clarity -9.625 - -21.625 = 12
    Node B to A calculates decrease in clarity -9.625 - -3.3125 = -6.3125
    Node B to D calculates decrease in clarity -9.625 - 0.4375 = -10.0625
    Node B to C calculates decrease in clarity -9.625 - -0.375 = -9.25
    Node B to E calculates increase in clarity 22.25 - -9.625 = 31.875
  Node B Sum of A,D,C,E openness = -6.3125 + -10.0625 + -9.25 + 31.875 + 12 = 18.25

Node E: 22.25 clarity
    Node E to A calculates decrease in clarity 22.25 - -21.625 = 43.875
    Node E to A calculates decrease in clarity 22.25 - -3.3125 = 25.5625
    Node E to D calculates decrease in clarity 22.25 - 0.4375 = 21.8125
    Node E to C calculates decrease in clarity 22.25 - -0.375 = 22.625
    Node E to B calculates decrease in clarity 22.25 - -9.625 = 31.875
  Node B Sum of A,D,C,B openness = 25.5625 + 21.8125 + 22.625 + 31.875 + 43.875 = 145.75

*Causal Tree total openness 44.25 + 36.75 + 15.5 + 18.5 + 145.75 = 260.75 (was 165.25 in FIG. 20)*

FIG. 45

Method To Detect Misleading Causality Dialogs

Examples Of Detecting Misleading Causality Dialogs

From FIG. 16 Causal Dialog Node Level Openness:
Node A 2.375
Node C -6.3125
Node B -18.9375

*Positive Cardinality 1*
*Negative Cardinality 2*
*Ratio 1/2*
*Min Ratio 1 > 1/2*
*Dialog is misleading*

From FIG. 20 Causal Dialog Node Level Openness:
Node A 25.9375
Node D 14.6875
Node C 15.5
Node B 6.25
Node E 101.875

*Positive Cardinality 5*
*Negative Cardinality 0*
*Ratio 5/0*
*Min Ratio 1 is not greater than 5/0*
*Dialog is not misleading*

FIG. 47

Example Of Filtering Symbols For Relevance

Linear approximation to a set of 5841 Spelling data points of their collocation count graphed against clarity, has slope 0.0023 and y-intercept -46255, and using the distance of all Spelling data points to this center line, each Spelling has a Centerline Distance. Sorting Spellings by ascending Centerline Distance, and choosing the first N spellings produces a set of Spellings of cardinality N with Minimal Centerline Distance, having greatest likely Relevance.

| Spelling | Collocation Count | Clarity | Rank | Centerline Distance | |
|---|---|---|---|---|---|
| solubility | 2379 | 0.1189 | 52 | 0.6841 | |
| bethe | 1155 | 0.1446 | 319 | 2.1345 | |
| photon is | 1080 | 0.1463 | 427 | 2.3074 | |
| hydrogen bonding | 1047 | 0.1815 | 522 | 2.4179 | |
| charged particles | 1047 | 0.2172 | 553 | 2.4536 | |
| emitted | 3196 | 0.1337 | 625 | 2.5336 | |
| solutes | 994 | 0.1817 | 633 | 2.5390 | |
| nuclear physics | 991 | 0.1810 | 643 | 2.5451 | *In subset* |
| this compound | 951 | 0.1429 | 694 | 2.5983 | |
| cyclotron | 972 | 0.2012 | 700 | 2.6088 | |
| intermolecular | 940 | 0.1836 | 745 | 2.6642 | |
| ionosphere | 920 | 0.1688 | 773 | 2.6950 | |
| the atoms | 835 | 0.2204 | 1022 | 2.9406 | |
| inorganic compounds | 815 | 0.2018 | 1046 | 2.9675 | |
| electron and | 874 | 0.3955 | 1124 | 3.0267 | |
| the photon | 786 | 0.2278 | 1176 | 3.0597 | |
| or | 363333 | 143.4262 | 5837 | 681.0192 | |
| and | 470883 | 203.3298 | 5841 | 866.5283 | |

*beyond subset*

FIG. 49

Examples Of Pairing Symbols With 'emitted' For Causal Relevance

Loop 1 Symbol 'emitted', with Collocation 3196, Clarity 0.1337

| Loop 2 Spelling | Loop 2 Collocation Count | Loop 2 Clarity | Loop 2 Rank | Spelling 1 Spelling 2 Clarity | Loop 2 Result |
|---|---|---|---|---|---|
| solubility | 2379 | 0.1189 | 52 | 0.0943 | Loop 2 spell clarity low |
| bethe | 1155 | 0.1446 | 319 | [0.0433] | Loop 2 spell clarity low |
| photon is | 1080 | 0.1463 | 427 | [28.5000] | Paired for output |
| hydrogen bonding | 1047 | 0.1815 | 522 | [0.0640] | Loop 2 spell clarity low |
| charged particles | 1047 | 0.2172 | 553 | [21.4762] | Paired for output |
| emitted | 3196 | 0.1337 | 625 | n/a | stuttering skipped |
| solutes | 994 | 0.1817 | 633 | [0.0710] | Spelling 1 to 2 clarity low |
| nuclear physics | 991 | 0.1810 | 643 | [0.0610] | Spelling 1 to 2 clarity low |
| this compound | 951 | 0.1429 | 694 | [0.0554] | Spelling 1 to 2 clarity low |
| cyclotron | 972 | 0.2012 | 700 | [0.0751] | Spelling 1 to 2 clarity low |
| intermolecular | 940 | 0.1836 | 745 | [0.0421] | Spelling 1 to 2 clarity low |
| ionosphere | 920 | 0.1688 | 773 | [0.0586] | Spelling 1 to 2 clarity low |
| the atoms | 835 | 0.2204 | 1022 | [0.0623] | Spelling 1 to 2 clarity low |
| inorganic compounds | 815 | 0.2018 | 1046 | [0.0623] | Spelling 1 to 2 clarity low |
| electron and | 874 | 0.3955 | 1124 | [51.4444] | Paired for output |
| the photon | 786 | 0.2278 | 1176 | 28.5 | Paired for output |
| or | 363333 | 143.4262 | 5837 | [258.3506] | beyond Fig. 48 subset |
| and | 470883 | 203.3298 | 5841 | [387.9233] | beyond Fig. 48 subset |

Output:
("emitted " "photon is ")
("emitted " "charged particles ")
("emitted " "electron and ")
("emitted " "the photon ")

FIG. 52

Examples Of Pairing Symbols with 'bethe' For Causal Relevance

Loop 1 Symbol 'bethe', with Collocation 1155, Clarity 0.1446

| Loop 2 Spelling | Loop 2 Collocation Count | Loop 2 Clarity | Loop 2 Rank | Spelling 1 Spelling 2 Clarity | Loop 2 Result |
|---|---|---|---|---|---|
| solubility | 2379 | 0.1189 | 52 | [0.0276] | Loop 2 Collocation high |
| bethe | 1155 | 0.1446 | 319 | n/a | stuttering skipped |
| photon is | 1080 | 0.1463 | 427 | [0.0384] | Spelling 1 to 2 clarity low |
| hydrogen bonding | 1047 | 0.1815 | 522 | [0.0126] | Spelling 1 to 2 clarity low |
| charged particles | 1047 | 0.2172 | 553 | [0.0480] | Spelling 1 to 2 clarity low |
| emitted | 3196 | 0.1337 | 625 | [0.0433] | Loop 2 Collocation high |
| solutes | 994 | 0.1817 | 633 | [[0.0433]] | Spelling 1 to 2 clarity low |
| nuclear physics | 991 | 0.1810 | 643 | [[9.5000]] | Paired for output |
| this compound | 951 | 0.1429 | 694 | [[0.0193]] | Loop 2 spell clarity low |
| cyclotron | 972 | 0.2012 | 700 | [[0.0193]] | Spelling 1 to 2 clarity low |
| intermolecular | 940 | 0.1836 | 745 | [[0.0151]] | Spelling 1 to 2 clarity low |
| ionosphere | 920 | 0.1688 | 773 | [[23.5000]] | Paired for output |
| the atoms | 835 | 0.2204 | 1022 | [[23.5000]] | Paired for output |
| inorganic compounds | 815 | 0.2018 | 1046 | [[0.0213]] | Spelling 1 to 2 clarity low |
| electron and | 874 | 0.3955 | 1124 | [0.0355] | Spelling 1 to 2 clarity low |
| the photon | 786 | 0.2278 | 1176 | [0.0234] | Spelling 1 to 2 clarity low |
| or | 363333 | 143.4262 | 5837 | [5.2826] | beyond Fig. 48 subset |
| and | 470883 | 203.3298 | 5841 | [[20.0182]] | beyond Fig. 48 subset |

Output:
("bethe " "nuclear physics ")
("bethe " "the atoms ")
("bethe " "ionosphere ")

FIG. 53

Examples Of Causal Method Of Linking Symbol Pairs For Automated Lexicography with max-magnitude-change 1000

| Rootmost Spelling | Leafmost Spelling | Rootmost to Leafmost Clarity | Allowable Clarity | Output Path |
|---|---|---|---|---|
| solubility | hydrogen bonding | 0.0922 | | |
| hydrogen bonding | solutes | 14.0000 | 92.2064 | solubility, hydrogen bonding, solutes |
| hydrogen bonding | intermolecular | 6.1053 | 60.8794 | solubility, hydrogen bonding, intermolecular |
| bethe | nuclear physics | 0.0799 | | |
| nuclear physics | cyclotron | 9.7857 | 79.9112 | bethe, nuclear physics, cyclotron |
| hamiltonian | eigenvalue | 10.5172 | | |
| eigenvalue | perturbation | 8.0385 | n/a | n/a |
| range from the | and skin | 0.0098 | | |
| and skin | reacts with the | 13.2000 | 9.8253 | n/a |

Polysemous Meanings of 'proton' Output Tree

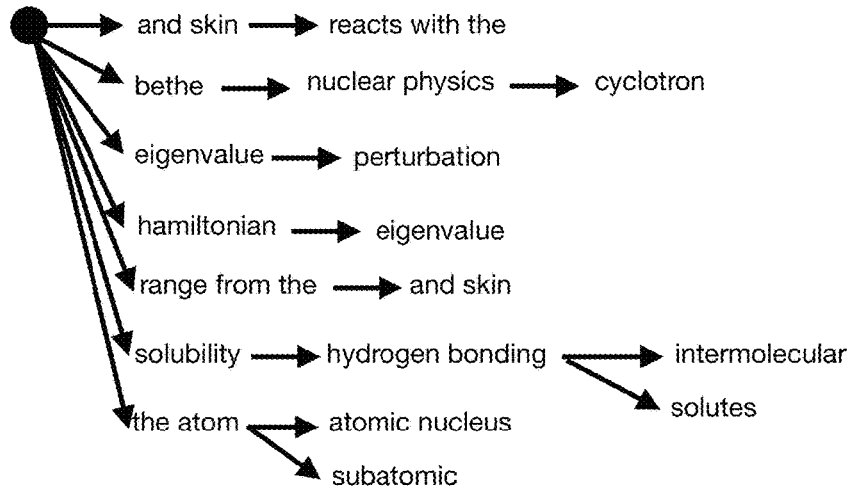

FIG. 55

Method Of Disambiguating Polysemous Meanings For Meaningful Search Of Sets Of Symbols

Example Of Disambiguating Physics Meanings For Associating Subsets Of Symbols

Input Sequence Of Symbols 'Q'

"For proton [ nuclear physics ] experiments, Bethe had pointed out the limitation of the basic cyclotron."

Input Polysemous Meanings of 'proton' Tree

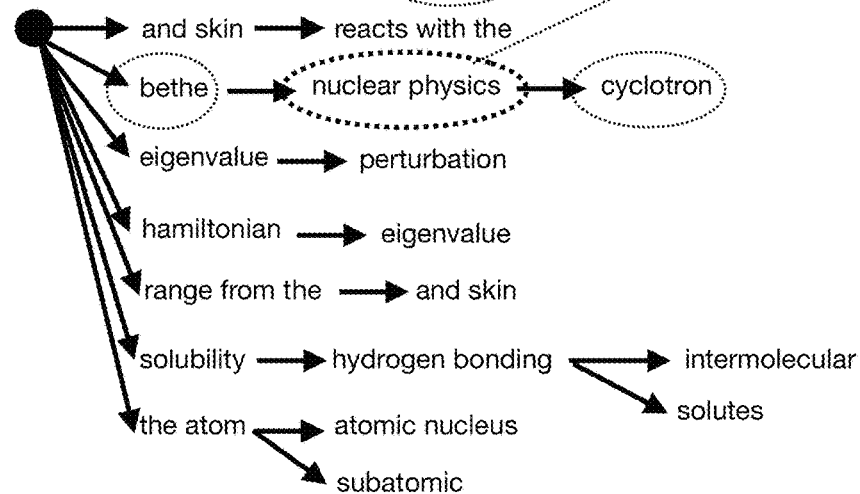

Output Set Of Symbols 'S', total Sum Inverse Collocation Count = 0.004361

| Symbol | Collocation Count | Inverse Of Collocation Count |
|---|---|---|
| bethe | 1155 | 0.000866 |
| cyclotron | 972 | 0.001029 |
| experiments | 12751 | 0.000078 |
| for | 273880 | 0.000004 |
| had | 95103 | 0.000011 |
| limitation of | 1101 | 0.000908 |
| nuclear physics | 991 | 0.001009 |
| out the | 15205 | 0.000066 |
| pointed | 8362 | 0.000120 |
| proton | 5843 | 0.000171 |
| the basic | 9985 | 0.000100 |

FIG. 57

Example Of Disambiguating Chemistry Meanings For Associating Subsets Of Symbols

Input Sequence Of Symbols 'Q'

"Solutes include an intermolecular ammonium ion dissociating to a free amine and a proton showing hydrogen bonding differences."

Examples Of Automatically Generated Polysemous Meanings For 'Proton', From Sample Of 1100 Spellings

```
("iodide " "reacts ")
("iodide " "covalent ")
("iodide " "acetyl ")
("iodide " "crystallizes ")
("iodide " "the sodium ")
("iodide " "claa ")
("aqueous " "oxidizing ")
("aqueous " "reacts ")
("aqueous " "aldehydes ")
("aqueous " "pah ")
("cracks " "carbide ")
("cracks " "deflect ")
("cracks " "the generation of ")
("antiparticle " "fermion ")
("antiparticle " "nucleons ")
("antiparticle " "electron and ")
("designing " "flue ")
("designing " "when designing " "gating ")
("designing " "can also be applied to ")
("emitted " "photon is ")
("emitted " "charged particles ")
("emitted " "electron and ")
("emitted " "the photon ")
("increase the risk of " "leukemias " "and
changes ")
("photon is " "the spin ")
("photon is " "s formula ")
("photon is " "chapter 14 ")
("photon is " "atomic nucleus ")
("bethe " "nuclear physics " "cyclotron ")
("bethe " "s formula ")
("bethe " "ionosphere ")
("bethe " "standards and technology ")
("bethe " "the atoms ")
("hdl " "autosomal recessive ")
("hdl " "phospholipid ")
("hdl " "hypertensive ")
("hdl " "triglyceride ")
("the atom " "nuclear reaction ")
("the atom " "this is referred to as ")
("the atom " "cometary ")
("the atom " "subatomic ")
("the atom " "atomic nucleus ")
("synthesized " "isomer ")
("synthesized " "hydride " "this compound ")
("synthesized " "rna and ")
```

```
("swelling " "redness ")
("swelling " "nerve cells ")
("swelling " "where such ")
("swelling " "with ice ")
("orbitals " "niels bohr ")
("orbitals " "a molecule ")
("orbitals " "chemical bonds " "energy by ")
("hamiltonian " "eigenvalue ")
("hamiltonian " "perturbation ")
("hamiltonian " "if then ")
("hamiltonian " "perturbed ")
("solubility " "pah ")
("solubility " "hydrogen bonding " "solutes ")
("solubility " "hydrogen bonding "
"intermolecular ")
("solubility " "this compound ")
("solubility " "inorganic compounds ")
("quark " "meson ")
("quark " "standard model " "electron and ")
("quark " "fermion ")
("kinase " "is predominantly ")
("kinase " "that in humans is encoded by the
")
("kinase " "ribosomal ")
("dissociation " "chemical bonds " "energy
by ")
("dissociation " "just by ")
("dissociation " "claa ")
("amino " "more than 60 ")
("amino " "side chain " "hydrogen bonding "
"solutes ")
("amino " "side chain " "hydrogen bonding "
"intermolecular ")
("amino " "side chain " "with negative ")
("amino " "reacts with the ")
("amino " "are often considered ")
("amino " "and neutral ")
("amino " "synthesized from ")
("faraday " "electrolysis of " "that generates
")
```

FIG. 59

Method Of Handling Extra Investments Into Postings

Example Of Calculating Extra Investment Loss node-id[0] openness[53.7500] credits[92.5000] text["{1}' Hola ! I am the mother that maced you in the ladies room last week and I would do it again . I hope that pepper - spray "]

node-id[1] openness[39.9375] credits[244.5000] text["{1}burned the fuck out of you . I think it's sick that you go into ladies rooms and you encourage others to do it on social media . "]

node-id[2] openness[98.8125] credits[61.5000] text["{1}Go to the 1 your ID says to ! Keep your nastie dick away from us ! {2}What the hell do you know "]

node-id[3] openness[45.0625] credits[153.5000] text["{2}about what my ID says ? Did you even ask to see it before you pepper sprayed me ? {5}It makes "]

node-id[O] openness[108.6875] credits[0.0000] text["{5}me so uncomfortable hearing you talk like this : If she's going to use the womens bathroom , she's minding her business , you can't discriminate like this . I know how ppl feel yucky about me what with my one leg and with this blotchy vitiligo . "]

tree tot-causal-gain[346.2500] tree-avg-causal-gain[69.2500] over [5] nodes; balance of credit flows between sources:
   src-num[1] debit[318.0000] credit[510.3065]
   src-num[2] debit[108.0000] credit[155.5122]
   src-num[5] debit[255.0000] credit[15.1813] percentage loss = (100 * ( 255 - 15.1813) / 255)  =  94.046546

Compare to original -18.9375 total tree cause gain without node O
the thread tot-causal-gain openmindedness 346.2500 is much higher, but node O loses lots of credits because the high openness of node O gives credits back to lower but still positive openness nodes, since those nodes are closer the issues being discussed; the clarity of node O is too low to be closer to the issues

FIG. 62

Example Of Calculating Extra Investment Gain

Compare to original -18.9375 total tree cause gain without node O
the thread openmindedness only slightly higher, but node O gains lots of credits one way to fix is to increase the clarity of node O so it is closer to the main sequence cluster of other nodes, and its openness is also closer; this could be done by paraphrasing on the fly:

node-id[0] openness[-12.6875] credits[0.0000] text["{1}' Hola ! I am the mother that maced you in the ladies room last week and I would do it again . "]

node-id[1] openness[0.0000] credits[0.0000] text["{1}I hope that pepper - spray burned the fuck out of you . I think it's sick that you go into ladies rooms and "]

node-id[2] openness[-1.3750] credits[0.0000] text["{1}you encourage others to do it on social media . Go to the 1 your ID says to ! Keep your nastie dick away from us "]

node-id[3] openness[0.0000] credits[0.0000] text["{1}! {2}What the hell do you know about what my ID says ? Did you even ask to see it before you pepper sprayed me "]

node-id[O] openness[8.5625] credits[208.0000] text["{2}? {5}It makes me so uncomfortable hearing you talk like this : If she's going to use the womens bathroom , she's minding her business , you can't discriminate like this . I know how ppl feel yucky about me what with my one leg and with this ... vitiligo . "]

tree tot-causal-gain[-5.5000] tree-avg-causal-gain[-1.1000] over [5] nodes; balance of credit flows between sources:
  src-num[1] debit[318.0000] credit[110.0000]
  src-num[2] debit[108.0000] credit[109.6443]
  src-num[5] debit[251.0000] credit[457.3557]  percentage gain = (100 * (457.3557 - 251) / 251 ≈ 82.21343

Compare to original -18.9375 total tree cause gain without node O
the thread tot-causal-gain openmindedness -5.5000 is higher, but node O gains lots of credits because the close to zero openness of node O gives gains credits from almost every other node

FIG. 63

Examples Of Causal Dictionary Tree Metrics

| Symbol | Cooccurence Count |
|---|---|
| A | 10 |
| B | 5 |
| C | 20 |
| D | 11 |
| E | 6 |
| F | 12 |
| G | 9 |

| Symbol 1 | Symbol 2 | Clarity |
|---|---|---|
| A | B | 1 |
| C | D | 2 |
| D | E | 3 |
| F | G | 2 |
| G | B | 3 |
| G | D | 4 |

Example Of Canonical Causal Dictionary Tree

Example Of Canonical Causal Dictionary Gains In Clarity

| Symbol 1 | Symbol 2 | Symbol 3 | Gain in Clarity |
|---|---|---|---|
| A | B | n/a | n/a |
| C | D | E | 3 - 2 = 1 |
| F | G | B | 3 - 2 = 1 |
| F | G | D | 4 - 2 = 2 |

Examples Of Narrative Causal Tree Metrics

| Node | Average Symbol Cooccurence Count over Symbols Of Node | Average Clarity Of Symbol Pairs over Symbols Of Node |
|---|---|---|
| A | 10 | 3 |
| B | 5 | 4 |
| C | 20 | 2 |
| D | 11 | 3 |
| E | 6 | 4 |
| F | 12 | 1 |
| G | 9 | 2 |

| Node | Linked Nodes | Leafward Clarity Gains From Node |
|---|---|---|
| A | B | 4 - 3 = 1 |
| B | A, F, G | 1, 3, 2 = 6 total |
| C | D, E | 1, 2 = 3 total |
| D | C, E, F, G | 1, 1, 2, 1 = 5 total |
| E | C, D | 2, 1 = 3 total |
| G | F, B, D | 1, 3, 1 = 4 total |

Subtree total clarity gains:
1 + 6 + 3 + 5 + 3 + 4 = 22

Example Of Canonical Narrative Causal Tree

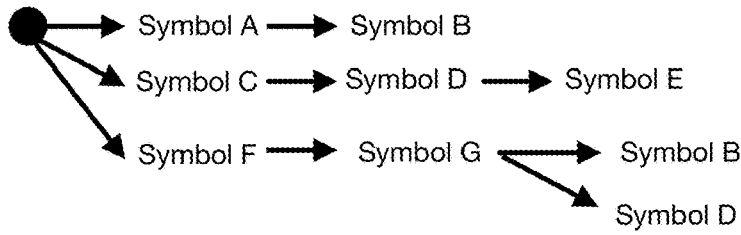

| Node | Available Nodes With Lesser Coocurrece Count | Available Nodes With Greater Clarity | Available Nodes With Less Cooccurences and More Clarity |
|---|---|---|---|
| A | 3 | 2 | 0 |
| B | 0 | 0 | 0 |
| C | 6 | 4 | 4 |
| D | 4 | 2 | 1 |
| E | 1 | 0 | 0 |
| F | 5 | 6 | 5 |
| G | 2 | 4 | 2 |

FIG. 65

Examples Of Dictionary Causal Midline Metrics

| Symbol 1 | 1 Co-ocurrences | Symbol 2 | 2 Co-ocurrences | Average Co-ocurrences | Clarity | Average Coocurrences over Clarity | Bigrrams with more clarity and less avg Coocurrences |
|---|---|---|---|---|---|---|---|
| A | 10 | B | 5 | 7.5 | 1 | 7.5 | BE |
| A | 10 | C | 20 | 15 | 2 | 7.5 | AD, AE,AF,BD,BE,BF,BG, CG,DE,DF,DG,EG |
| A | 10 | D | 11 | 10.5 | 3 | 2.8333 | AD |
| A | 10 | E | 6 | 8 | 4 | 5.25 | none |
| A | 10 | F | 12 | 11 | 5 | 2.3333 | |
| A | 10 | G | 9 | 9.5 | 1 | 2.5 | |
| B | 5 | C | 20 | 12.5 | 2 | 6.25 | |
| B | 5 | D | 11 | 8 | 3 | 2.666 | |
| B | 5 | E | 6 | 5.5 | 4 | 1.375 | |
| B | 5 | F | 12 | 8.5 | 5 | 1.7 | |
| B | 5 | G | 9 | 7 | 3 | 2.3333 | |
| C | 20 | D | 11 | 15.5 | 2 | 7.75 | |
| C | 20 | E | 6 | 13 | 1 | 13 | |
| C | 20 | F | 12 | 16 | 2 | 8 | |
| C | 20 | G | 9 | 14.5 | 3 | 4.666 | |
| D | 11 | E | 6 | 8.5 | 3 | 2.8333 | |
| D | 11 | F | 12 | 11.5 | 6 | 1.916 | |
| D | 11 | G | 9 | 10 | 4 | 2.5 | |
| E | 6 | F | 12 | 9 | 2 | 4.5 | |
| E | 6 | G | 9 | 7.5 | 3 | 2.5 | |
| F | 12 | G | 9 | 10.5 | 2 | 5.25 | |

Overall Average Ratio 4.5312476

FIG. 66

Examples Of Narrative Causal Midline Metrics

| Node | Average Symbol Cooccurence Count over Symbols Of Node | Average Clarity Of Symbol Pairs over Symbols Of Node | Nodes of more clarity and less concurrences |
|---|---|---|---|
| A | 10 | 3 | B |
| B | 5 | 4 | none |
| C | 20 | 2 | D, E |
| D | 11 | 3 | B, E |
| E | 6 | 4 | none |
| F | 12 | 1 | D,E,G |
| G | 9 | 2 | D,E |

○ Cooccurences vs. Clarity

Thought Space Relationships Between Rootedness and Clarity

Thought Space links nodes of thought together much like dendrites of the human mind link neurons together, but with important optimizations to boost creativity. Imagine choosing every link for creative potential. Imagine comparing every subtree of links for creative potential. Imagine that a mental awareness with such goals can steer the accumulation of causal trees of knowledge out of dead ends by navigating towards creative potentials.

To do this, every causal path in a casual tree follows an optimal gradient from cause to effect nodes. Paths start with with maximal rootedness in a path, to frame the meaning of the path in broadest possible terms to cover as many as possible potential branches toward specific useful meanings. Each causal link connects to successively less rooted terms. So for the branching node paths below, the root node has rootedness $R = 5$, $R = 3$ etc. The diameter of each node below is proportional to its rootedness.

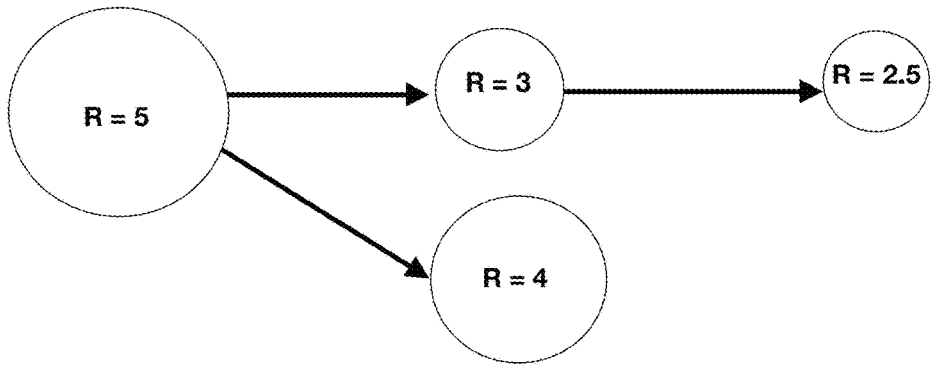

Thought space measures Rootedness by the relative number of distinct observed usage contexts where the symbols of a node occur: this is an empirical measure of breadth of meaning, updated over time as symbols and words acquire or lose vernacular meanings.

Every casual path in thought space also competes with other paths to have a Clarity gradient towards greater clarity. This ranking deprecates cause-effect links that would lead to confusion in the form of decreasing clarity where narrower less rooted terminology should increase focus and clarity. So for path 1 below, root clarity $C = 1$ and leaf clarity $C = 4$ have the gradient of open-mindedness of $4 - 1 = 3$. The inferior path 2 below has the same root clarity $C = 1$ node but a left clarity of $C = 1$ so the gradient is only $1 - 1 = 0$.

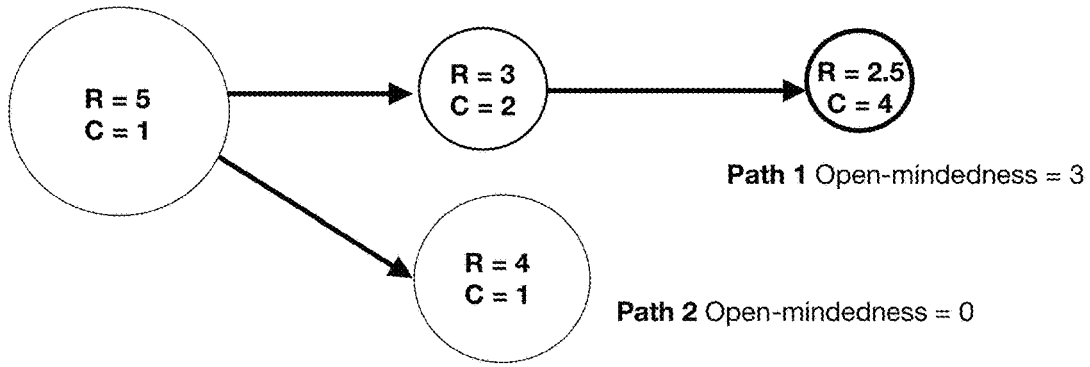

Thought space empirically computes Clarity from actual usage of symbols, in terms of convergence and divergence of symbols where convergence tallies distinct collocations of symbols and divergence tallies differences in distinct collocations of symbols. For any symbols of a node, node clarity is the sum of: convergences divided by its divergences between its symbols.

FIG. 68

Advantages Of Causal Link Subtree Open-mindedness

Thought space automatically measures openmindedness in every causal path to promote openminded links and deprecate close-minded links, thus subtrees defined by clusters of links can also be chosen for creative links. Below are an example of an open-minded subtree and a closed-minded subtree.

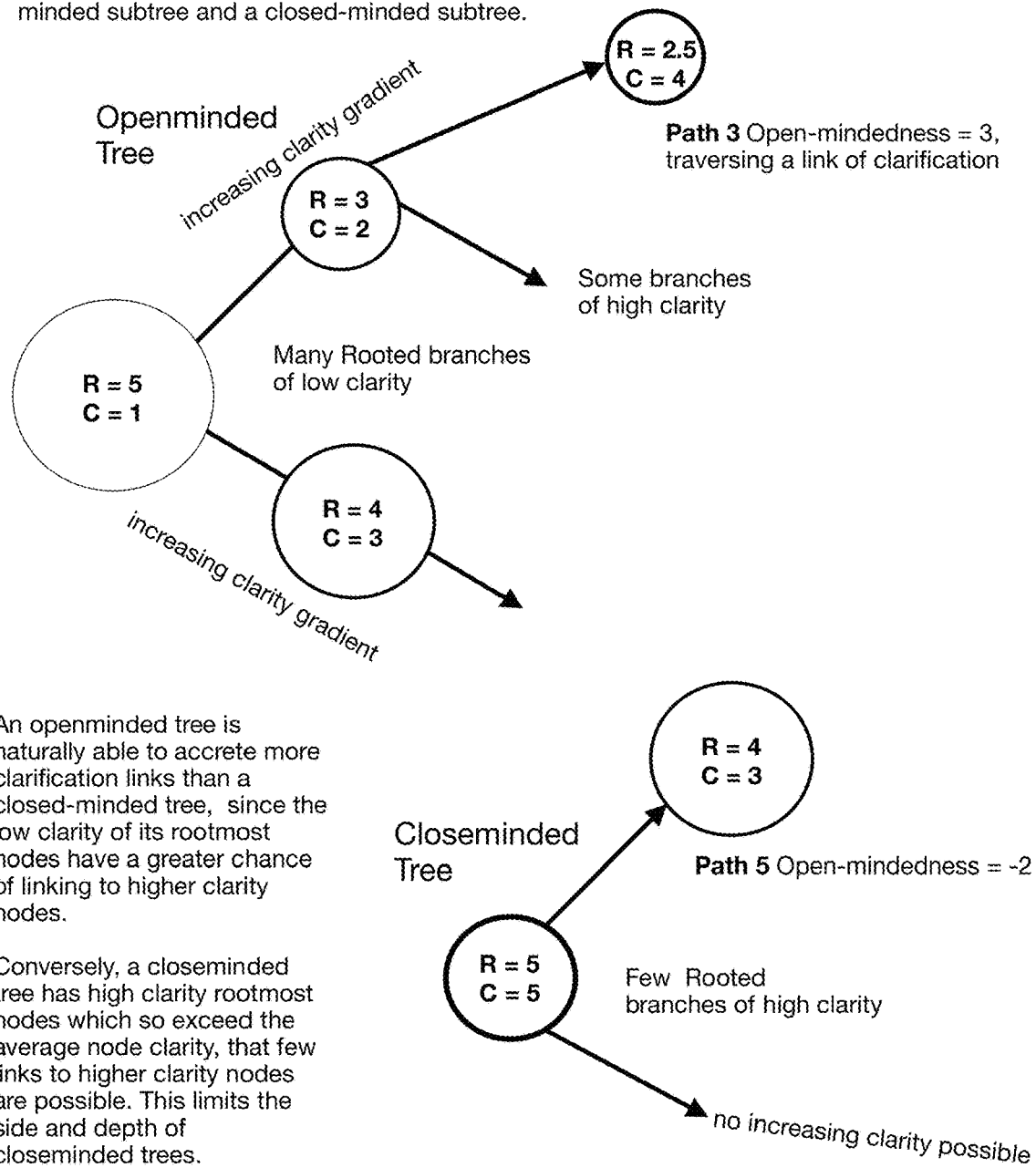

An openminded tree is naturally able to accrete more clarification links than a closed-minded tree, since the low clarity of its rootmost nodes have a greater chance of linking to higher clarity nodes.

Conversely, a closeminded tree has high clarity rootmost nodes which so exceed the average node clarity, that few links to higher clarity nodes are possible. This limits the side and depth of closeminded trees.

FIG. 69

Creative Advantages Of Open-mindedness

Below is a histogram showing the big picture of how link starvation curtails the creativity of close-minded trees. In the simplest example of a probability distribution of clarity over a set of nodes, every occurring clarity has the same population. For close-minded root nodes in the top 10th percentile there can only be links to 10% of the nodes, which have greater clarity. Conversely, for openminded root nodes in the top 90th percentile there can be clarification links to 90% of the nodes, giving the root nodes of openminded trees a 9:1 combinatorial advantage.

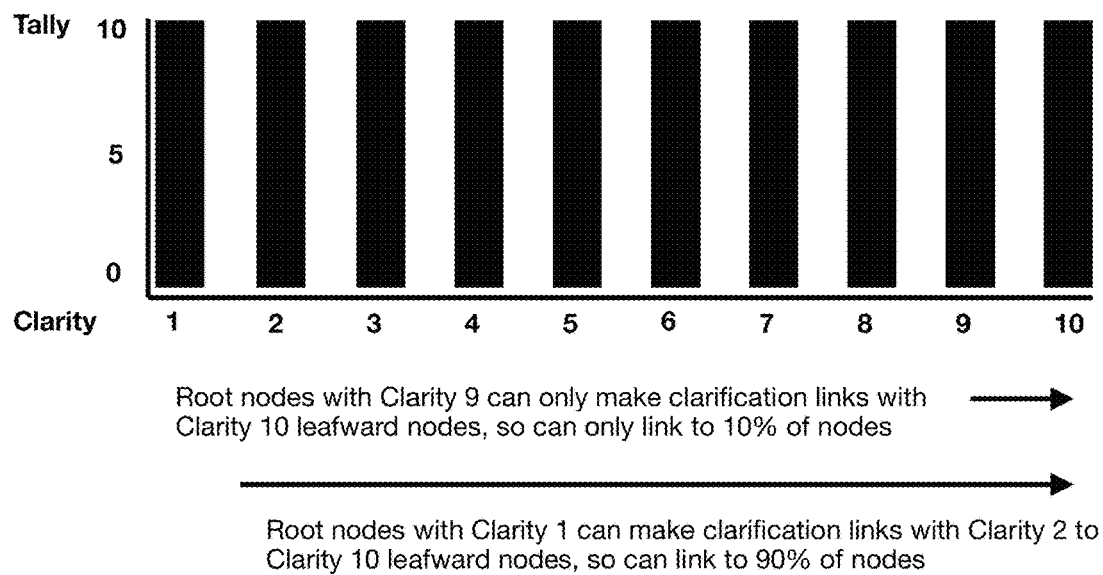

Root nodes with Clarity 9 can only make clarification links with Clarity 10 leafward nodes, so can only link to 10% of nodes Root nodes with Clarity 1 can make clarification links with Clarity 2 to Clarity 10 leafward nodes, so can link to 90% of nodes The combinatorial advantage of top 90th percentile openminded nodes multiplies exponentially over longer path lengths, in trees of deeper meanings. For example, trees with an average of three branches per node and an average path length of 3 will have 3 x 3 x 3 = 27 nodes on average. For nodes with 90th percentile clarity, each of these nodes will have a 9:1 advantage in potential clarification links to other nodes, over 10th percentile nodes. Since each node potentially generates 9 times as many different paths, there will be 27 x 9 = 243 times as many potential path combinations. Shown below are just 7 nodes with a 9:1 advantage per node for an openminded tree.

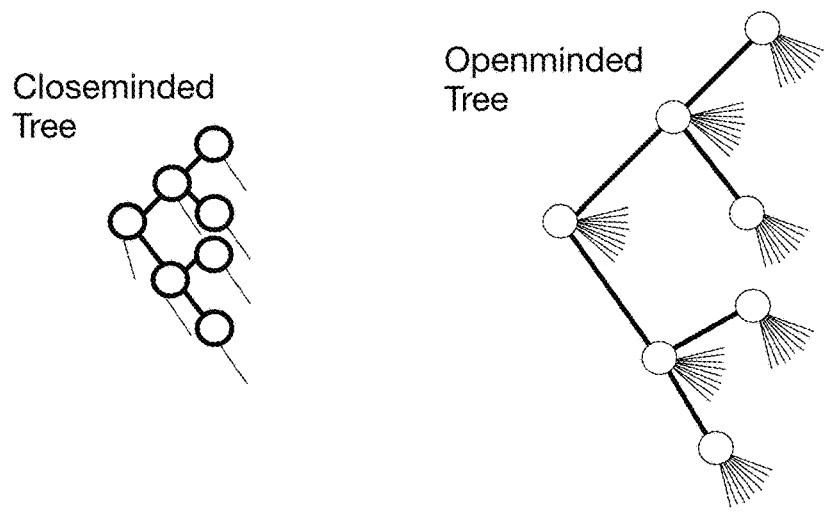

FIG. 70

Method of Calculating Causal Link Canonical Tree Open-mindedness Advantage

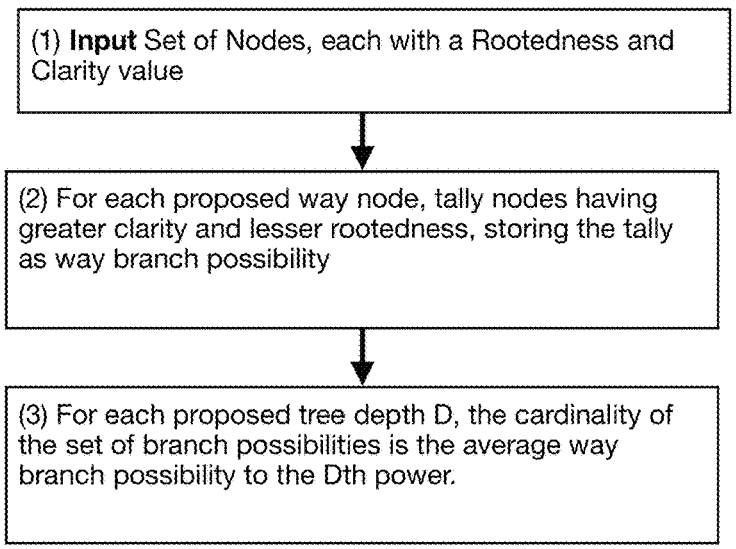

(1) Input Set of Nodes, each with a Rootedness and Clarity value (2) For each proposed way node, tally nodes having greater clarity and lesser rootedness, storing the tally as way branch possibility (3) For each proposed tree depth D, the cardinality of the set of branch possibilities is the average way branch possibility to the Dth power.

Examples of Calculating Causal Link Canonical Tree Open-mindedness Advantage

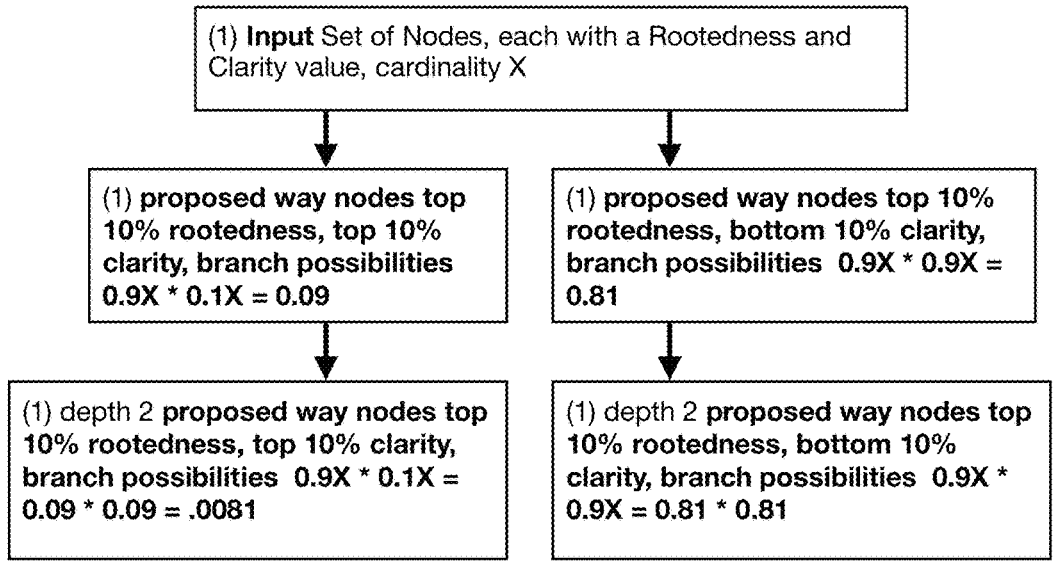

(1) Input Set of Nodes, each with a Rootedness and Clarity value, cardinality X (1) proposed way nodes top 10% rootedness, top 10% clarity, branch possibilities 0.9X * 0.1X = 0.09

(1) proposed way nodes top 10% rootedness, bottom 10% clarity, branch possibilities 0.9X * 0.9X = 0.81

(1) depth 2 proposed way nodes top 10% rootedness, top 10% clarity, branch possibilities 0.9X * 0.1X = 0.09 * 0.09 = .0081

(1) depth 2 proposed way nodes top 10% rootedness, bottom 10% clarity, branch possibilities 0.9X * 0.9X = 0.81 * 0.81

FIG. 71

Example of Causal Link Midline Optimization

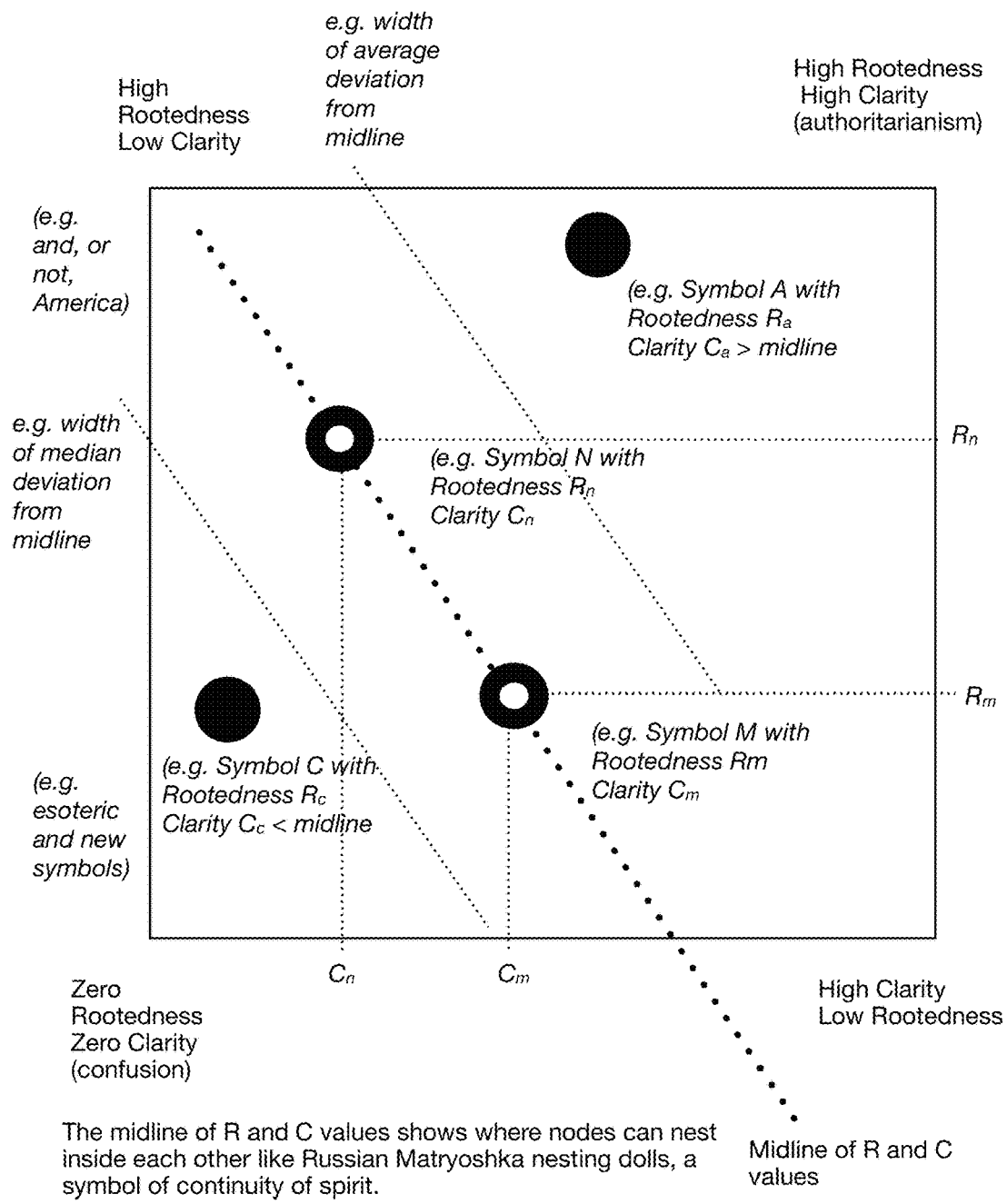

The midline of R and C values shows where nodes can nest inside each other like Russian Matryoshka nesting dolls, a symbol of continuity of spirit.

If all nodes are on midline, all can link.

With an median deviation from midline of D, all nodes with deviation d less than median can link canonically to roughly half the other nodes. A more accurate optimization based on lower rightward shadows cast by each node is possible, by drawing a shadow intensity map over the extremity box, divided into 100 box regions in a 10 x 10 layout

FIG. 72

Method To Compute Openminded Creativity

Example Of Computing Clarity Over A Set Of Symbols

Method Of Investing In Content Producers Using Cognitive Relativity

Example Of Investing In Content Producers Using Cognitive Relativity

Method Of Integrating Local Detailed Knowledge With Global Knowledge Optimizations

Independent Creators For Governance, Appeals and Proof Of Creativity Transaction Validation

RELATIVISTIC FIELD EFFECT METHODS TO OPTIMIZE CREATIVE AWARENESS

RELATED APPLICATIONS

This patent application claims priority to the U.S. provisional patent application 63/151,767, confirmation number 6124, filed on 21 Feb. 2021 by Au, titled "Relativistic Field Effect Methods To Correct Common Flaws Of Awareness" which is hereby incorporated by reference, in its entirety.

BACKGROUND OF THE INVENTION

Just as gravity causes massive distortions such as black holes in four dimensional space time, first described by Einstein's General Relativity, accumulated knowledge causes distortions among the links between symbols of any cognitive space, reducing creative awareness on a massive scales. Just as a black hole swallows up adjacent masses in relativistic space time, on grand scales, runaway authoritarianism swallows up adjacent beliefs in cognitive spaces, limiting thoughts to authoritarian repetitions. In economies, similarly natural runaway repetitions develop into monopolies and monopsonies. On a nano scale, this runaway effect emerges in over-training of neural networks using broad training sets, remedied by hand-splitting of data into smaller training sets. The same natural repetitions of thought which bias neural nets also bias societies to believe in authoritarian or even racist thinking, since unwarranted confidence in unproven assumptions about racial inferiority is supported by group think echo chambers which social media platforms profitably support.

All these problems caused by authoritarianism, monopolies, monopsonies and over-trained neural networks require external solutions to overcome natural hegemonic stagnation. External, ad-hoc fixes include: skepticism about norms, investigation into larger and more diverse causal contexts, challenging norms through intense competition such as warfare, economic Darwinism and anti-trust legislation. Yet none of these prior art external solutions are fast enough or strong enough to prevent authoritarian thinking or even racism, nor do they insure continued creativity toward overcoming the emergences of authoritarianism or racism.

To timely overcome authoritarianism and racism, one must timely detect and correct for distortions in cognitive spaces, and remove such distortions on the same scale and at a faster rate than their emergence. This in turn requires deeper methods to head off the emergence of authoritarianism, deep in the meta-levels of subconscious thought formation, where precursors of thought form links between symbols, before symbols actually acquire authoritarian meanings.

Just as far away black hole formations can be detected by monitoring subtle relativistic shifts in space time, such as spectral red shifts, precursor distortions in cognitive spaces and knowledge bases should be detectable by measuring relativistic shifts in links between the symbols of a cognitive space or knowledge base.

Prior art for ensuring creativity includes genetic and economic natural selection, in which clashes between older authoritarianism and newer authoritarianism are decided in wars and other deadly competition, in which the creativity of newer authoritarianism sometimes emerges victorious. Additional prior art increases the chances that newer authoritarians succeed, in anti-trust legislation and elective democracies which support research into new and more productive knowledge. However, these improvements have yet to overcome the way both new and old authoritarianism takes turns dominating societies, leaving only brief opportunities for creative freedoms to control societies, for instance in general elections.

The fundamental problem remains where authoritarianism is a local maximum for economic efficiency, and support for global optimization of economic efficiency remains elusive. For example, most totalitarian dictatorships survive obvious shortfalls in economic efficiency until losses in wars increase the urgency for regime change.

In prior art, political authoritarianism has been detected at stages far too late, as fully formed dystopian realities, detected as the suppression of millions of peoples views and by threats of annihilation. For monopolies and monopsonies, detection of authoritarianism occurs in anti-trust court cases and by muck raking press. These prior art detection methods are slow, cumbersome and expensive, and could barely keep up with slow speeds of emerging authoritarianism in the pre-social-media age. In the age of social media, authoritarianism grows exponentially faster, far faster than courts of law, traditional journalism, legislation of laws, even faster than executive decrees unless those decrees are made in social media itself such as Twitter.

Consequently, authoritarian social movements have recently exploded in size, dominating political processes. By massing by the millions in social media echo chambers, authoritarians can quickly exceed the persuasiveness of conventional journalism and conventional gatekeepers of trusted opinions. With this explosion of authoritarian persuasiveness, society is so polarized that it marches directly towards the worst of Darwinistic turning points, which are decided by riots and wars in political arenas and trade wars and economic collapses in economic arenas. This is unfortunate, as natural selection itself is no guarantee of human survival, nor is it a very efficient strategy for survival of any system.

For instance, if a supernova explodes within 50 light years of the Earth, humanity will perish unless it can predict this supernova event using advanced astrophysics and prepare to escape from the explosion with advanced starships. Prior to an actual supernova event, excellence in astrophysics and starship construction lack evolutionary survival value, therefore Darwinism will fail to evolve both the predictive astrophysics and the fast starships needed to save humanity.

Since systems of natural selection require competition leading to deaths, civilization in multiple incidents has almost eradicated itself via global thermonuclear war: both during the Cuban Missile Crisis and still later in September 1983 when the Soviet anti-ballistic missile defense system issued a false alarm detecting 5 incoming missiles. We survived only because the Soviet duty officer Stanislav Petrov unilaterally bent his employment contract as far as it possibly could go: his job was to report any missile attacks from the United States, but his official duties didn't spell out how quickly he had to report them. With a background in radar testing and statistical quality control, he reasoned that the odds of the United States attacking with only five missiles was far smaller than the odds that Soviet radar was really glitching. So he waited 20 minutes make his report, during which time if the radar was correct, five major cities in the Soviet Union would be destroyed and any counterattack they could make would be severely compromised. Waiting for 20 minutes gave him time to prove his reasoning was correct and save the world from nuclear annihilation, as well as earn a stern reprimand from authorities over him.

Stanislav Petrov's quick strategic analysis saved the world, but the strategy he pursued lies outside the bounds of both authoritarian and Darwinistic norms. A normal duty officer would simply double check the radar for consistency over five minutes and then report the attack, likely leading to the end of civilization. Indeed Petrov drily noted that "the world was very lucky in was me that time" and his unique experience in actually testing their radar for years led him to a rebellious and open-minded assessment which saved the world.

Thus Darwinism and the closed minded death competitions it requires will likely lead to the annihilation of civilization, and subsequent repopulation of the world with radiation resistance lifeforms, species far more likely to be bacteria and tardigrades than vertebrates, let alone people. This is ironic since natural selection is a crude and harshly punitive process, which as a system should be easy to outperform, since natural selection has major flaws: first, that selections are validated infrequently, and only using the crudest metrics of death or bankruptcy, and second, that there are no required deeper analyses in natural selection, so complex sequences of cause and effect remain invisible to natural selection's analyses, in favor of simpler authoritarian single-step cause and effect thinking. Since natural selections' causal analyses are framed by shallow over-simplifications, natural selection forgoes deeper creative and rational opportunities such as Petrov's statistical analysis which saved the world.

The world's preparations for COVID-19 are another good example of natural selection's systemic ignorance. Since there was no bankruptcy survival value in preparing for Covid-19, necessary global investments were instead allocated away from manufacturing N-95 masks and vaccines, to areas where bankruptcies could be more influential, such as construction, banking and non-medical manufacturing.

However, it is now easy to see that 100 billion dollars spent before the Covid-19 pandemic, to manufacturer N-95 masks for all and speed vaccine development would have saved trillions of dollars in economic activity lost to social distancing, which in the absence of universal protective gear, a vaccine or a cure, was the next best alternative for saving millions of lives. Strategies framed by natural selection only connect on a shallow level of reasoning linking causes and catastrophes, so good intermediate steps to consider N-95 masks became invisible steps, and governments around the world refused to budget 100 billion dollars on personal protective gear and vaccines because they would divert money budgeted for much more visible choices supporting normal Darwinistic competitive goals.

Thus there needs to be some way to make visible the intermediary goals, such as N-95 masks, that are a part of deeper reasons and alternative to the shallow thinking promoted by natural selection.

Excellent examples this deeper reasoning with intermediate goals are associated with "first principles analysis" as described by Elon Musk. A first principles analysis focuses engineering upon specific goals, and these goals are captured by transparent scrum meetings to create subgoals. A first principles analysis thus focuses upon the engineering of beneficial cause and effect relationships, and begins with identifying likely causes connecting to effective goals, and continues deeper to highly detailed levels of cause and effect modeling in which explicit subgoals are linked to effective goals.

For instance, at Tesla a major goal was to reduce the cost of electric cars below the cost of combustion engine cars, as an alternative to a common belief at the time that electric cars would always be more expensive. The only cost which makes an electric car more expensive than an gasoline car is the batteries. Aside from batteries, the cost of an electric car is far less than a gasoline car, so reducing the cost of batteries became a subgoal. The electric motor of an electric car is so much cheaper than the combustion engine and transmission it replaces, that below a specific price point of $100 per kw/hr for the batteries, electric cars can be produced at a total cost lower than combustion engine cars. When Tesla first started to build cars, their batteries sold for over $500 per kw/hour. Most car companies at the time had no goal for reducing battery costs, for they viewed that cost to be permanent. Yet at Tesla, reducing the cost of batteries to $100 per kw/hr became a major explicit subgoal framed by a higher level goal of lowering the cost of electric cars to be less expensive than combustion engine cars.

Further along his first principles scrum analysis, Elon Musk was able to calculate the cost of battery materials at $80 per kw/hr using public spot market raw materials pricing, so a fully automated manufacturing system ought to produce batteries at about $100 per kw/hr, which Tesla is planning on soon achieving, via subgoals which include not only a more automated battery manufacturing system but also a better battery design and chemistry. Reducing costs via battery design and automated manufacturing thus became high priority driver for a cost reductions at Tesla.

A first principles analysis can thus more purposefully guide engineering by showing where true deeper cost effectiveness may emerge, in contrast to traditional engineering where careers are built around defending shallow assumptions based on circumstantial evidence, such as a decades-long battery costs above $500 per kw/hr. In practice, a strategy of first principles analysis with scrum to freely consider explicit subgoals linked to goals by cause and effect makes traditional shallow engineering practices obsolete, just as electric cars will soon make gasoline cars obsolete.

Similarly, Elon Musk has used first principles analysis on the cost of orbital rockets, showing that the cost of fuel is only about 0.5% of an orbital rocket launch. Therefore, fully reusing rockets while minimizing relaunching refurbishment costs would reduce launch costs by 100 to 1. SpaceX is already well along achieving this reusability subgoal, and by re-using 75% of its launch hardware, has become the worldwide leading orbital launch provider both with the largest volume of launches and the lowest launch costs. SpaceX's current subgoals include full reusability and rapid turn-around of launch vehicles. To achieve these design subgoals, they have added a deeper subgoal of faster design prototyping speed.

Thus by using the software development technique of scrum on the mechanical engineering problem of rocketry, Spacex now builds Starship production lines to produce new prototype designs every month, testing twelve times more features and design variations per year than traditional manual assembly research can test per year. Thus early investment in automated production lines has enabled SpaceX Starship workers to solve actual problems five to ten times faster, compared to traditional aerospace companies expending the same costs.

In another example, a first principles analysis of the tradeoffs between stainless steel and carbon fiber led to the surprising choice of stainless steel for the main structure of Starship. Factoring in the superior strength-to-weight ratio of stainless steel over carbon fiber at temperatures of both superheated re-entry heating and frigid interplanetary cold and radiation effects, the familiar traditional advantages of carbon fiber at ordinary room temperature were completely washed out, although this first principles analysis was completed years after SpaceX has already invested millions of dollars into carbon-fiber Starship production. After recalculation, SpaceX then stopped their multi-million dollar investment into giant mandrels for carbon fiber and focused on stainless steel welding techniques. They then found that in addition to superior overall strength-to-weight ratio in mission critical temperature ranges, stainless steel's lack of fabrication curing times and lack of clean room fabrication requirements greatly accelerated the rate at which prototype designs could be built for testing.

There are many other good examples of first principles analysis in leading edge aerospace knowledge. Max q, the moment of maximum air friction during orbital launch, is reached by a rocket traveling up from the earth in 6 minutes. Rockets thereafter travel in a vacuum which greatly reduces air friction losses. Without air friction a rocket can simply coast to the other side of planet: compared to jumbo jets traveling to the other side of the planet all the while consuming massive fuel loads to slowly push their way through massive air friction, rockets traveling in a vacuum travel more then 20 times faster without consuming fuel. SpaceX can so reduce the cost of rocketry by reusable components and cleaner fuels, that it is designing rockets to be used as a first principles alternative to jumbo jet travel.

Air friction is also a root cause behind many other possible transportation vehicles breakthroughs. Using a frictionless airless environment for fast travel is a central theme shared by Starship and Hyper Loop and a seminal idea for high altitude electric airplanes proposed by Elon Musk. Use of the root causality of reduced air pressure to enable multiple positive new outcomes is a hallmark of efficient knowledge arbitrage since new root knowledge gained by implementing one causal tree is naturally covers many other causal contexts.

Thus for first principles analysis with scrum, accurate intelligence gathering about root causalities is required, and for efficiency, identification of root causalities and their diverse possible outcomes must therefore be automated. Consistent with this need for efficient identification of rootmost root causes, at Tesla and SpaceX there's a flattened non-hierarchic reporting structure for such critical information, where anybody within the organization can contact anybody else who needs the information, and the receiving party ignores this critical information at their peril. Unlike authoritarian Darwinistic cultures, where inconvenient truths are suppressed, at these first principle analysis companies, inconvenient truths are given priority over authorities.

However, even with cultural support for first principles analysis there can be significant empirical data collected which may block the proper mapping of root causes. For instance, there is empirical data showing that carbon fiber has statistically proven a stronger strength to weight ratio than stainless steel, over the sample set of thousands of experiments conducted near room temperatures.

This overwhelming evidence that stainless steel has a lower strength to weight ratio at room temperature caused Spacex rocket designers to at to first overlook the comparison of stainless steel to carbon fiber at unusual temperatures so hot they'd melt carbon fiber, but not melt steel, such as crucial orbital rocket re-entry temperatures. Similarly, most rocket designers lacked empirical data on deployment of carbon fiber to the frigid cold or intense radiation of outer space, both of which degrade carbon-fiber's epoxy resins faster than stainless steel. This is a good example of why using empirical and statistical evidence in the long run to assess root causality is always perilous because almost any statistical sample set can in the long run be proven to be too small. Similarly, gut feelings based on limited experiences can also turn out to be faulty when deeper analyses are made over time. After a year of delay, and millions of dollars misspent, SpaceX switched from carbon fiber to stainless steel for their Starship rocket, citing the 'delightfully counterintuitive' advantages of stainless steel.

Thus to avoid these first principles mapping errors over emerging evidence, a universal cross-mapping of all known unique casual paths should be created as large scale knowledge bases, so that prediction, validation and implementation of improvements are not delayed by arbitrarily slow processes such as statistical sample set design, academic peer review of papers, trade secrets or privacy laws which prevent sharing of information. Instead, a cross mapping must automatically operate in real time, as an investment news service, to identify negative causal paths and identify new causal paths to fix negative paths, so as new causal evidence emerges, that new evidence is immediately used to plan and fix negative paths in a global tree of causal knowledge.

Such a global tree of knowledge would be informed by all the current observations of causality links in the world, including observations collected under the influence of Darwinian biases and romanticized attachments to survival of the fittest celebrations. Unfortunately, knowledge influenced by natural selection will be emphasize opinions formed mainly at death or bankruptcy data points, during which human memories are traumatized into being biased, so there will be many adjustments needed before such a global tree of knowledge could be trusted. Further, if these traditional and flawed observations are not removed, many will suspect that any system of rewards based such a universal knowledge tree are a rigged game controlled by whomever traditionally dominates or owns the tree. Some way to remove such flaws would be needed, and given the vast the scale of knowledge, that curation has to be automated.

Here are three common link-level flaws in the topology of knowledge to which natural selection is blind:
1) Improper causal direction,
2) Links based on irrelevant evidence,
3) Links leading to resource allocation into addictive negative causal paths.

The above first flaw occurs when a cause is confused with an effect. For instance, through observation, a child may see that automated street lights turn on shortly before sunset, day after day, and logically conclude that turning on streetlights causes the sun to set. There could actually be an economic natural selection survival value in this confusion, where a preparations such as gathering warmer clothing for the onset of of cold in darkness could be triggered by streetlights turning on, so the false conclusion could easily spread, when reinforced by the utility of such preparations.

Less innocently, cigarette companies have observed that some non-smokers have lung cancer, so for them air pollution was the root cause of the cancer effect, and perhaps smoking is only circumstantially the cause of lung cancer whereas the real cause is air pollution. This false conclusion is well supported by the economics of natural selection which favors cigarette producers. There needs to be a real-time, automated method to suppress these errors in perception. Otherwise, through economic Darwinism, the immense profits paying for ad campaigns generated by cigarette manufacturers will continue to prevent cigarette risks from being understood by smokers. With natural selection operating economics, the cigarette can became a kind of predator that can infect humans with addiction to cigarettes, causing humans to produce cigarettes on a vast scale while also killing millions of humans.

The second flaw occurs when circumstantial or irrelevant evidence is introduced to support cause and effect links, for instance by advertising. In a popular style of jeans commercial, the implied cause and effect link is: wear these jeans then enjoy this cool lifestyle. More insidiously, bigotry develops from isolated cases of people misbehaving, and bigots attribute that behavior to that people's ethnicity using only the one example repeatedly for evidence. Superstition is yet another form of the second flaw. Superstition arises naturally from useful conjecture but lacking any automated way to suppress irrelevance, useful conjectures escalate quickly into superstition and bigotry. In natural selection, there are no survival advantages to removing superstition and bigotry, because struggles to the death often involve trickery where the winner takes advantage of the loser's superstition: perpetuating that superstition ensures a steady supply of victims. On another level of Darwinism, bigotry is often the reason why bigots commit murder, for instance committing genocide to elevate bigotry's popularity by causing people to join the side of the victorious murderers. Natural selection is not deeply thoughtful, and does not promote deeper predictions which predict that those who joined victorious bigots will later be victims of genocide themselves. In Cambodia this kind of genocide developed into a death spiral of the complicit becoming victims until it was halted by outsiders.

Irrelevant evidence is also especially rampant in the form of bullying on the Internet, where false sensational accusations are eagerly read by people looking for a quick thrill, and when click-bait revenue boosts sites publish these lies, so that organizations spreading revenue-generating falsehoods complicity support economic Darwinian top predators of the Internet. In order to prevent this cascade of monetized lies, irrelevant evidence must be suppressed in real time, as soon as it is created.

Addiction itself is the third flaw in natural selection. Darwinian competition unfortunately requires isolation of awarenesses into siloed ruthless competitors. Competitors then naturally take advantage of such isolation where they can, to the immense detriment of their prey, by purposefully addicting victims to habits which make them dependent.

A good example of this, from economic Darwinism, is the predation of opioid manufacturers on pain sufferers. By needlessly prescribing addictive pain killers to suffering patients, trusted doctors became complicit in an economic scheme to maximize opioid company profits. In economic natural selection, such profits are generally laudable no matter who makes them or how they are made. Unfortunately this Darwinian viewpoint failed society as tens of thousands of people needlessly lost their lives to opioid drug overdoses.

Since natural selection cannot operate without rewarding profitable competitors for selfish behavior, there is no Darwinian method to cure this situation. Instead, forces outside of natural selection, such as governments and lawyers, necessarily had to intervene, forcing opioid producers into less selfish actions. The United States has responded to the opioid crisis with a class action legal trial with a three decade span between evidence and court dates, the most complex legal trial in history, and much like with the inefficient earlier cigarette industry class action lawsuits, it is uncertain as to the effect of any remedies lawyers can actually achieve against Darwinism, because the remedies created by governments are slow and easily bypassed by forces of natural selection in the economy.

Economic Darwinism has also inflicted addiction via the Internet. Addictive behaviors have been monetized by platforms such as Facebook and Instagram to the point where most time spent on the Internet is now devoted to some form of addictive behavior. This unfortunate fact is wasting huge amounts of people's time and fills their awareness with myriad useless experiences, causing a sense of burn-out and desperation very similar to drug addiction. Facebook and Instagram are highly profitable, blinding them to the fact that Facebook advertising business model of showing ads to desperately addicted users is detrimental to society. Facebook's response is to claim that the new advantages of Facebook and Instagram communities are so valuable that they outweigh the disadvantages. To counter that profit-motivated argument, one may say that it should be possible to have the advantages of low cost community supporting publication without the disadvantages of addiction. Yet implementation of such counter-arguments faces a high barrier of creating actual profitable alternative social networks without the addictions. Addictions to anger and fear of missing out which have driven social media profits would have to be replaced by other kinds of motivations. Since addictive motivations exist in a powerful bubble of self-reflections, something equally powerful has to burst that bubble. The durability of an addictive bubble is proportional to number of self-reinforcing links to itself, and power of a bubble burster, outside the bubble, is proportional to the number of links to a replacement for the addictive bubble. For this reason, revolutionary social movements stage extensive demonstrations to compete by reinforcing social contacts between their participants, becoming an addiction bubble burster able to compete by quickly acquiring links to match the scale of the bubble of old social order addictions.

When vast monopoly platforms such as Facebook or Instagram become addictive, the initial cost to create a bubble bursting alternative to those existing addictive monopolies is prohibitively expensive: since the addictive monopoly platforms secure economic resources for themselves through predatory acquisitions, to increase their bubbles of self-reflection, and use these new acquisitions to foment an ever higher sense of addictive emotions, such as anger and fear of missing out, an emerging competitor is either unable to compete for users, or bought out by existing monopolies.

To ensure that an alternative non-addictive bubble burster can compete for users, alternatives must support a faster and more transparent way to create new non-addictive links, while suppressing old additive links in real time speeds and social media scale. To do this, a precise method of detecting incipient addictive behavior must step in and automatically initiate an antidote, as well as instantly rewarding others who have created antidotes in the form of bridge-building texting and storytelling. In addition, a non-addictive alternative platform could suppress, penalize or demonetize activities supporting the addiction. However, to balance these negative antidotes, there must be desirable positive outcomes which are offered, such as profitability, entertainment, beauty, empathy, community, or some other social good. Further, to maintain urgency in society, these positive outcomes must not be taken for granted by people, and this sense of urgency must persist on a global scale to insure that it shifts people's thinking.

A global compulsive sense of urgency is also a main feature supporting Darwinism: the great diversity of world species is indirectly the result of independent competitions to death, which harness the will to survive, and in turn harness creative reassessment of the totality of resources available for survival. Economic darwinism is also supported by the creativity resulting from the threat of bankruptcy which forces business owners and directors to reassess their survival options.

For instance, the threat of an Axis victory and subsequent urgency during World War 2 led the government and major industrial companies to employ women in jobs formerly reserved for men, while men were serving in the military. The economic efficiency of women working a greater range of jobs was a discovery brought on by Darwinism.

Advancements such as women working a greater range of jobs should not be dependent on Darwinistic urgency of world war: it should not require destruction on that scale to convince people that women should work a great range of jobs. The discovery of these truths should instead be integral to peacetime economic incentives. The perennial lack of urgency in peacetime therefore requires new methods to increase the urgency of making strategic changes in the economy.

A new peacetime sense of urgency could be constructed by using a first principles analysis to predict and to also verify new social goals, while removing the above three flaws of awareness that otherwise undermine trust in first principles analyses. At the same time, a framework of urgency could support new goals to reduce the time required to validate a first principles analysis, thus supporting a scrum-like fluidity of strategic decision-making.

For instance, by using a first principles cost analysis to focus on manufacturing techniques to increase the number of new major design variations which can be validated, SpaceX has been able to deal with urgent design issues far faster and more efficiently than traditional aerospace managers who overcommit to slowly built static designs, and thereby SpaceX has avoided the expensive and catastrophic design failures such as the Space Shuttle and the Russian N1 rocket. SpaceX's redesign efficiency is key: their corporate culture minimizes the time to validate proposed first principles analyses. In one decade, SpaceX was able to devote more resources to exploring evidence that new techniques such as hypersonic retro-propulsion and computerized precision guided hover-slam landings were more practical than an entire generation of Space-shuttle like vehicles whose popularity was romantically supported by winged airplane designs.

A large scale knowledge base for automatically computing first principles urgency would have to automate these diverse deviations from familiar traditions. An automated system to compute the urgency of causal knowledge development could propose and fund explorations into similarly efficient outliers among economic possibilities. Automated urgency analysis could then take the place of two mechanisms for urgency from natural selection: the adrenal fear of death and fear of bankruptcy. The substitution of finer grained, real time support for automated urgency would far outperform natural selection's coarser decision making, by marshaling all available knowledge instead of confining knowledge into smaller siloed computing knowledge structures. It would also outperform natural selection's efficiency by validating design improvements continuously, instead of only during sporadic death or bankruptcy events.

That said, trust is a major hurdle faced by any large scale automated system for allocating economic resources: historic centralized economic planning systems based on autocracy, oligarchy or communism have failed in a variety of economic death spirals brought on by inabilities to innovate. Perhaps the most egregious of these failures arises from contractions of the ruling class to a pure dictatorships, which may then attempt to control any automated systems for selfish goals. A computer implemented system to automate resource allocations must therefore detect and prevent authoritarian outcomes, including outcomes imposed upon it.

To this end, it may support creativity with urgency around supporting new opportunities to eliminate inequality, through real-time redistribution of resource allocations, guaranteeing that a large percentage, for instance the top most creative 50% of all members receives added benefits of their contributions to society, and the bottom 50% are guaranteed subsistence benefits to provide a safety net for low achievers. Radical transparency made possible by automated publication of reasons for distribution of wealth in a computer automated resource allocation system would reveal injustices while also motivating investors to support justice, thereby eliminating dictatorial tendencies before they have a chance to become addictive.

To summarize: the above three archetypal flaws of awareness are now common because Darwinism driving most knowledge acquisition is limited in a scope by Darwinian competitions which segregate global knowledge into separate competing knowledge bases. Further, Darwinism cannot correct errors in real time because Darwinism relies on death to correct errors, so Darwinian corrections are only sporadic, since constant corrective deaths would cause mass extinctions, resulting in demise of the system as a whole, while in economic Darwinism, non-stop bankruptcy would make most business contracts invalid, stopping the economy as a whole.

Consequently, a better global real time creative economic system that incentivizes creative urgency and first principles analyses is needed to replace natural selection and economic Darwinism. Such a creative system would disintermediate natural selection itself, replacing death and bankruptcy with faster and finer grained knowledge arbitrage, in which the urgency of diversity and creativity are directly supported by rewarding diversity of thought at the granularity of individual symbolic links, rather than waiting for events of coarser granularity such as sporadic death and bankruptcy to increase diversity by rewarding the practice of innovation over the practice of obsolete traditions.

Investments in knowledge arbitrage thus could drive creative diversification processes which increase the survival value of all humanity, without sacrificing huge swathes of society to death and bankruptcy validation experiments. To make investments in knowledge arbitrage fundamentally available to all people, a full spectrum of participation models must be supported; experts and novices, generalists and specialists, rich and poor, educated and uneducated must be supported so all people regardless of background can access and benefit from a global real time creative economic system.

Difficulties in integrating local detail-oriented knowledge with global optimization of knowledge has prevented the above automations, since people cannot quickly verify how proposed improvements fit into a global perspective without automating the local-to-global knowledge integration process.

Another difficulty with globally spanning knowledge bases comes from the sheer scale of general knowledge, which demands tremendous data storage and cpu processing capabilities to update and maintain. For scalability it would be good to decentralize and distribute tasks to utilize many smaller mass produced components to reduce overall hardware costs, just as crypto currency architectures are now trying to do in order to reduce transaction costs. And just as crypto currencies must validate each transaction using a multiplicity of validators to guarantee that no improper transactions can corrupt the ledger, integration of detailed knowledge into a global knowledge base needs to double check and validate changes from a global perspective to ensure that falsehoods are prevented from corrupting the knowledge base. In many cases checking facts for accurate knowledge depends on independent validation of evidence to prevent domino effects, so that validation process is similar in risks to cryptocurrency transaction validation. Both are safer when independence and individuality of validators can be measured.

Despite the scale of these challenges, automation of optimization of knowledge integration is well worth considerable investments, since success would be a cap-stone which would complete needed improvements to our creative awareness, so civilization's road to progress can bypass the inefficient, dangerous detours of natural selection and directly access creative possibilities.

A related scaling problem exists for cryptocurrencies. A dominant cost of cryptocurrency transactions is the cost of validating transactions, to ensure that fake transactions do not enter the transaction ledger. Proof of work and proof of stake are the two most popular methods for reducing the probability of fake transactions. Proud of work makes all transactions computational expensive, so with large numbers of validators, fake transactions are even more expensive. Since a major of validators can rule against a fake transaction, pushing a fake transaction requires control of a majority of validators.

Similarly, proof of stake requires validators to commit their stake in order to qualify as a validator, so they risk loss of stake should a majority of validators rule against their validator. Yet both proof of stake and proof of work can be hacked by putting large resources into operating hacked validators. Since cryptocurrency validators are anonymous, no one can detect whether any set of validators is actually directed by a single hacker. Using sets of millions of validators per transaction is a brute-force approach to security, which slows down transaction rates and increased transaction costs. If validators could be characterized by their independence from each other, while preserving their anonymity, much smaller sets of independent validators could be secure, to increase transaction rates and lower costs.

SUMMARY OF THE INVENTION

The present invention is a computer implemented system and method for integrating local detail-oriented knowledge with global optimization of knowledge by automatically constructing, from narrative input sequences of local detail-oriented data, a massive summary tree of causal knowledge whose subtrees are valued for positive leaf-node causal outcomes. These trees are optimized for creativity to outcompete Darwinistic knowledge, and the present invention optimizes knowledge for greater creativity using an apparatus hereinafter referred to as a thought space, which utilizes tree structured nodes with links between nodes, each node each comprising at least one symbol, to record knowledge in N dimensions where N is unlimited. Thus thought space is natively able to encode higher dimensional nonlinear thoughts as well as deeper thoughts, compared to linearly based knowledge representations such matrices in neural networks, matrices in linear programs, and other languages limited dimensionality representations.

The present invention teaches novel methods to optimize a thought space by enforcing constrains on the links between nodes. One constraint ensures that rootward nodes cover a greater diversity of contexts than leafward nodes, to strongly categorize and inform leafward nodes with a broader basis of meanings. To do otherwise would limit pool of meanings linking to leafward nodes, so that relationships implied by links appear circumstantial and ungrounded. The diversity of contexts covered by a node are measured in the present invention by the empirical cardinality of symbol collocation overall all symbols of a node.

Another constraint ensures that leafward nodes have higher clarity than their linked rootward nodes, so causal paths traversing leafward lead to increased clarity while focusing in narrower categories due to the first constraint above. Thus causal paths obeying both constraints have an inspiring quality of leading to clear and specifically useful outcomes. To do otherwise, allowing clarity to diminish, would lead to confusingly demotivating outcomes. The present invention measures the clarity of nodes by averaging the clarity of each symbol 'A' of a node in relation to other symbols 'B' of the same node, where the clarity relation is computed by dividing the cardinality of symbols empirically collocated with both symbols, by the cardinality of the disjunction between the set of symbols collocated with 'A' and the set of symbols collocated with 'B'.

A thought space optimized by these two constrains has greater creative links available and this can define exponentially larger useful distinct causal trees than a thought space violating these constraints. The present invention teaches that closed mindedness and authoritarianism are products of violating these constraints and open mindedness and creativity are products of following these constraints.

In some variations of the present invention, nodes represent narrative or storytelling symbolic content, so links between nodes represent causal implications of storylines. In other variations of the present invention, nodes really represent symbols within a dictionary, possibly an automatically generated dictionary, so links between nodes connect way nodes along along paths of causal meaning, and branching links represent divergences into polysemy.

The present invention automates quality control in knowledge acquisition by detecting precursor distortions in cognitive spaces and knowledge bases by measuring relativistic shifts in links between the symbols of a cognitive space or knowledge base. In particular, undesirable shifts are authoritarian or confusing, and desirable shifts support positive causal leaf nodes in a causal tree.

The present invention further enables automated creation of the causal trees forming the basis of detection of desirable versus undesirable narrative input sequences, by filtering the possible links between causal nodes to ensure that rootward to leafward links maximize creative possibilities implied by those links, in a configuration where rootward nodes have greater numbers of connections to distinct usages among a usage dictionary of symbol to symbols connections. Enforcing this relationship between nodes increases the creative potential of causal tree, so that for any resource limitations on tree size, the creative potential to achieve desirable leaf nodes is maximized.

On this cognitive meta-level, the present invention is enabled by computing the meaning of symbols from large scale example sets of symbol sequences. For accurately computing the meaning of symbols, these examples sets should be as inclusive and up-to-date as possible, possibly covering sets as large as all social media postings, or even all internet web pages. The truly open-ended large scale of the inputs of the present invention thus requires many compute and storage optimizations to reduce costs of scaling, which are also useful in the present invention.

The present invention also automatically constructs a polysemous dictionary of meanings for any input set of symbol sequences, where sequences can be letters, words, phrases, sounds, a succession of pictures, or any sequential data, or annotated sequential data. This dictionary construction process is unsupervised and is inspired by dream states of the mind where experiences are sifted and arranged into complex maps of meaning, thus internalizing experiences to sift out and convey useful meanings from them. Neurologists have yet to fully understand how experiential meanings are automatically formed into human language awareness, but FMRI scans of neurons associated with words show that neurons associated with a word tend to be close to neurons associated with other words often used with that word. Spurred by this observation, present invention proposes new computer systems with new methods to process usage collocation metrics to measure relativistic gradients in collocation variety, convergence and divergence. Novel methods of cognitive relativity then use gradients of rootedness computed from collocation variety, and gradients of clarity computed from convergence divided by divergence to guide a free-association of symbols into causal symbol trees whose nodes point to individual symbols and whose branches are the polysemous branches of meaning for each symbol, to automatically form a dictionary of casual meanings.

The present invention then uses this large scale causal symbol tree to disambiguate meanings of sequential symbols of input, such as text publications or conversations or sequences of sounds. The present invention then processes these input sequences of symbols into complex causal trees, whose nodes point to sets of symbols and whose branches point to other nodes. Examples of complex causal trees may include, without limitation, summaries of causality implied by sequences of written language, or sequences of sounds or images.

The novel methods of cognitive relativity taught by the present invention are directed towards the optimization of the efficiency of creative thinking, by ordering and prioritizing links between symbolic nodes to minimize the computational effort to find new useful links, defined in terms of causal utility where any subtree of root causes link leafward to subtrees of effects, and the clarity of leafward nodes is higher than the clarity of rootward nodes, ensuring that causal links lead to clarity and not confusion. Within this novel canonical form for causal links, the present invention teaches that links to nodes of excessively high clarity are attractive in the short term for the satisfaction of that clarity, but in the long term such links make further links to nodes of even higher clarity unlikely or impossible. Therefore, to maximize creative potentials, leafward nodes will have higher clarity than rootward nodes, but only slightly higher clarity.

The present invention teaches novel methods to ensure optimal creative awareness: the links between nodes must be validated by links between symbols through the aforementioned dictionary of causal meaning, and the rootward nodes must have greater rootedness than their linked leafward nodes. The validation of links in the dictionary ensures continuity of meaning, avoiding jumps which are hard to follow. The ordering of leafward links in descending rootedness order has benefits arising from combinatorial analysis comparing links made in this order and not in this order, showing that links made in this order lead to a subtrees which have a greater population of symbols to choose from each of their nodes, thus allowing immediate and exponentially faster tree growth than links made in the reverse order.

For the actual computation of rootedness, the present invention is inspired by the free-association aspects of dreaming to compute rootedness based on collocation variety, rather than less general prior art such as hand-built taxonomies.

These are inspirations for the present invention's novel method of using high collocation variety as greater rootedness:

First, consider the whitespace that delimits each spelling in character based languages. The whitespace makes symbols distinct by putting a boundary around it, thus operating as a root cause of each spelling. Similarly, punctuation exclamation marks, periods and question marks operate as root causes of sentences.

Secondly consider low collocation variety, such as a new spellings which can only acquire meaning from the first dozen or so spellings they first appear collocated with. Could these new spellings be root causes? No, because their meanings are entirely dependent on those collocated spellings, so cognitively, those older spellings endow the new spelling with meaning, and so are relative root causes to the new spelling. Over time, new spellings may acquire greater collocation variety than any of the spellings of the collocation context of their first appearance, and so become relatively rootward of those spellings. For example, the word google was a noun meaning a 40 digit number. It's collocation variety was small, because this was a very esoteric rarely used word, with practically negligible use as root causal concept. Later however the Google search portal emerged and its popularity made the word Google appear collocated with every googleable search term spelling, and this huge variety of collocations made Google into a verb. As a verb, Google is moderately powerful root causal concept, producing effects such as all the useful search results it generates, as well as effects such as providing useful information to society, and also less useful effects such as nefarious competitions to control what appears to be the truth as viewed through Google queries.

Now further consider other correlations between rootedness and collocation variety. Do logical operators cause logic? Yes. Do the operands next to logical operators cause logic? No, so operators are root causes relative to their operands, and even when operators are used as operands to other operators, these operand-to-operand links are given new symbolic names such as de Morgan's Laws, both for convenience and clarity, which have less collocation occurrence than the operators with which they are composed. Further, there are far more operands than operators in the language of mathematics, since adding 1 to n successively using the +operator generates an infinite number of counting number operands, so the ratio of operands to operators is infinitely large. Although some numbers such as pi and the natural logarithm e occur more frequently because of useful concepts they represent, so they are relatively root causal to most other numbers.

Not only in the language of mathematics but in the language of physics, a small number of root causes generate all effects, so in causal trees of physics, causal trees are short and bushy, branching out from just a few causes to orders of magnitude more effects: In natural languages informed by physics and mathematics, in sequences of symbols traversing causal paths of reality, a small window size records the relative frequency of root causes proportionally to rootedness. Thus a series of snapshots of symbolic root to leafs paths will capture on average a higher variety of collocation for symbols.

The present invention utilizes the aforementioned metrics of cognitive relativity to further optimize methods to achieve its canonical link orderings, by giving priority to symbols which are central themes to any input subset of symbols. Just as our memories of dreams tend to be dominated by specific central themes, the present invention searches for a sense of a midline formation among an input subset of symbol usages, to stay on-theme and avoid spurious noisy usage data, by choosing symbols most likely to contribute to links having smallest possible increases in clarity and decreases in rootedness.

This increases the creative potential of every path of meaning in the output tree of meaning, by prioritizing the creation of links to favor links which are relativistically well situated to connect to the most symbols. Rather than just attempting to link a set of nodes of a set by trying every node to every other node, the present invention favors a subset of nodes closest to the linear approximation of a rootedness to clarity graph of the set of nodes. This priority increases the creative potential of each link, since each node has been chosen for the greater variety of nodes it could potentially link to in the input set, as well as the greater variety of future nodes it potentially links to in similar sets.

The present invention makes further use of cognitive relativity, to measure the utility of any set of nodes linked into a causal subtree, by calculating the sum of relative clarity differences between each of its rootward and leafward nodes connected directly and indirectly by links, to compute a new metric of open-mindedness. This also favors causal subtrees with more potential to be creatively linked into new causal paths. Positive open-mindedness ensures that the subset portrays causality in with already useful increases in clarity from rootward to leafward nodes. Negative open-mindedness shows that at least some links from rootward to leafward nodes have discouraging drops of clarity, exhibiting either confusion in low rootedness nodes, or authoritarianism in high rootedness nodes. If both confusion and authoritarianism are exhibited, the present invention detect bullying which is an authoritarian reaction to confusion.

Since neither confusion and authoritarianism and especially bullying are optimal for creativity, the present invention uses economic incentives to suppress them and promote their opposite in cognitive relativity: open-minded creativity which for nodes of high rootedness is creative generalization and for nodes of low rootedness is creative evidence. These novel economic incentives include automated social media moderation to suppress postings analyzed into subtrees of negative open-minded creativity, and to transfer economic resources from postings of negative open-minded creativity to postings of positive open-minded creativity, particularly within the same conversational threads. These incentives compensate for the natural tendency of negative open-minded creativity to dominate social media through addictive trolling and doom scrolling habits which generate the most profitable content on the internet, using current click-based Internet ad models.

In the present invention, Incentives would include, without limitation, payments from creators of less open-minded posts to creators of more open minded posts in the same conversational threads. Payment could be funded by either ad revenues or by modest fees collected from creators on a subscription basis.

The present invention also teaches that an internet community of open-minded creative thinking, as automatically moderated by the above methods, would surpass the creative output of the prior art internet communities which allow addictive trolling and doom scrolling content to flourish freely, by concentrating open-minded creative thinking in conversations most likely to resonate with future useful links to the known existing causal trees.

To enable an internet community of open-minded creative thinkers to complete economically against an array of entrenched social media platforms already monetizing internet addictions to inflammatory authoritarian speech, the present invention teaches business methods for monetizing validated openminded creativity to automatically direct cash flows from investments through openminded creative postings, or through the login accounts of the posters creating those openminded creative postings.

The smart contracts which automatically direct these cash flows rewards to people for creating the communal social goods of openminded creative postings, but also validate the communal social good the login accounts they control. Though these rewards for actively creating openminded content, the present invention defines a class of openminded creative assets to which passive investments can be applied and defined returns from passive investments. These passive investments into active creators of openminded content can then compete with other passive investments such as stocks and bonds, by offering an alternative to those slower moving and cumbersome investments vehicles, and by creating a community of open minded creative postings to document all cash flows for transparency.

For example, investors might deposit investments in the accounts of successful openminded creative people 'A' earmarked for funding writing either as more posts made by these people 'A', or passed along from people 'A' to other people 'B' which might be broadly selected as participants in conversational threads with 'A' who have posted openminded creative posts in those threads. Alternatively people 'B' might be participants who follow 'A' on their leaderboard settings, or some combination of the two. To prevent people 'A' from selfishly cashing out these invested funds, the invested funds could not be cashed out, although profits over the fees for writing using the invested funds would be shared 50/50 with the investors, so if the writing is successfully openminded, the both investors and writers share the profits, and the profits can be cashed out by both. Recoveries below the size of the investment would return only to the investors. If those investors originally acquired those funds earmarked for writing, they are returned to the funders and so on until they reached the accounts at the top of the chain which invested their own cash.

When invested funds are passed to other login accounts 'B' as investments, the same restrictions apply. The login accounts 'B' cannot selfishly cash out the investments and must either use them to fund their own writing or pass the funding on to others. Since no accounts along the chain of investments earmarked for writing can selfishly cash them out, and all cash flows are transparent, the present invention optimizes the motivations of writers to produce the social good of open-minded creativity.

When used for binding arbitration smart contracts for delivery of goods and services, the methods of the present invention can be used to settle payment transactions over goods and services by submitting the testimonials in private or semi-private conversational threads, to increase the transparency and honesty of commercial activities without onerous regulations and punitive fines. These private or semi-private threads could be limited to accounts having legal standing in delivery or service contracts, as well as ombudsman accounts selected by those have legal standing. A variety of ombudsman accounts should be available to ensure that the diverse nature of delivery or service contracts can be addressed by experienced and open-minded ombudsmen.

The present invention teaches that by using its novel methods to analyze content, social media portals becomes one of the most efficient ways to gather and publish content of high creativity, whose clarity and open-mindedness will be more inspiring and easier to follow than other less creative content offered on Internet. To compensate creators for high creativity content the present invention transfers economic resources away from creators of low creativity content, to creators of high creativity content, using transactions in fiat currency, private tokens or cryptocurrency. For scalability and resilience, such a large social media site should be decentralized, and its transactions should also be decentralized in a cryptocurrency, having a low cost per transaction. Its novel creativity analysis of content creates a simple way to ensure that creators are independent, since their continued creativity requires divergences away from not only other creators but also themselves over time. Therefore by choosing subsets of transaction validators from high creativity creators, these subsets then have validators with a high degree of independence from each other, greatly reducing the probability of a single hacker controlling them. The more accurate the measure of independence, the less validators are needed per transaction, reducing transaction costs and increasing transaction rates.

By calculating the degree of creativity in text, the present invention connects high creativity of individual texts to the high individuality for the creator of those texts: repetition of familiar texts instead leads to lower measured creativity, so only by success at new independent ways of thinking can a creator earn a high individuality ranking. The present invention chooses validators only from high individuality rankings, so it would be difficult for any single creator to achieve multiple high individuality rankings, since the engrams of a single person's thinking tend to produce the same thoughts, which if repeated over multiple texts, would reduce the creativity of those texts. Thus validators chosen from creators of high individuality will have much less chance of being controlled by any one hacker. Indeed, this method of choosing validators, hereinafter referred to as "proof of creativity" builds upon the inherent uniqueness of creative thought in thought space to ensure that validators are independent. Unlike proof of work and proof of stake, proof of creativity cannot be directly purchased, so proof of creativity is more resistant to hacking of the system by monopolizes.

The present invention also thus teaches how to create a novel crypto currency backed by the value of the creative content indexes by methods of the present invention. Most crypto currencies are backed only by their passwords, and so their only way to increase their value is through scarcity, which depends on demand. Just as with Ponzi schemes, crypto currencies was falling demand can collapse in value. However, a crypto currency backed by the value of creative content provides protection against such collapses, especially when curated using methods of the present invention which select openminded causal paths, since knowledge about causality has a shelf life which can last thousands of years. The present invention supports passive Investments into that creative context through direct investment into specific creators, or indirectly thru leaderboard indices tracking top creators. Similar to the way the S&P 500 composite index fund allocates investments into a current set of top ranking companies, a leaderboard investment fund can allocate incoming investments across the top performing creators. As this list of top creators varies so will the allocation vary, just as when companies on the S&P 500 are swapped in and out depending on their financial performance.

So rather than using a fiat currency such as dollars for internal transactions inside social media platforms of the present invention, in the long run, using measurement of creativity to reduce validation costs, it's more economical and reliable for such a social media platform to have its own crypto currency. In the long run it's also advisable for such major social media platforms to have an open and renewable form of governance, whose voting rights are assigned just like validator rights, by proportion of creativity, to individual content creators. Since such major social media platforms must benefit society as a whole, it's far more appropriate for their voting rights to be assigned to creators who have proven they have the ability to be openminded and creative, and for these assignments to be temporary rather than permanent, so that as new varieties of creativity populate the automated dictionaries, creators most in tune with emerging creative challenges are assigned the most voting rights.

BRIEF DESCRIPTION OF THE DRAWINGS

FIG. 4 shows an Example Of Causal Direction Filter Method Analyzing Sun and Streetlights.

FIG. 5 shows an Example Of Causal Direction Filter Method Analyzing Stationkeeping and Attitude Control.

FIG. 8 shows Acceptable ADS Range Examples (for FIG. 7).

FIG. 9 shows an Example Of the Interesting Evidence Filter Method.

FIG. 11 shows an Example Of Staged Interesting Evidence Filter Method.

FIG. 12 shows an Example Of Addiction Detected By Total Causal Tree Openness Of −4.

FIG. 13 shows Addiction Mitigated By a New Node, Detected by Causal Tree Openness +10.

FIG. 16 shows an Example Of Measuring Addictive Anger.

FIG. 18 shows an Example Of Allocating Credit to Openminded Causal Nodes.

FIG. 19 shows an Example Of Addition Mitigated By New Posts Of Social Media.

FIG. 20 shows an Example Of Measuring Mitigated Addictive Anger.

FIG. 23 shows an Example Of Overcoming Addictive Anger.

FIG. 24 shows an Example Of Measuring Overcoming Of Addictive Anger.

FIG. 26 shows an Example Of Allocating Relativistic Credit To Openminded Sources, Part 1 Of two.

FIG. 27 shows an Example Of Allocating Relativistic Credit To Openminded Sources, Part 2 Of two.

FIG. 28 shows an Example Of Rewarding The Overcoming Of Addictive Anger.

FIG. 29 shows an Example Of Rewarding Relative Openmindedness.

FIG. 30 shows an Example Of A Review Of Cash Transaction.

FIG. 31 shows an Example Of Automatically Moderating A Review Using Open-mindedness.

FIG. 33 shows an Example Of Verifying Transactions With Open-mindedness Criteria.

FIG. 36 shows an Example Of Detecting Terrifying Causality (In FIG. 15 and FIG. 16).

FIG. 38 shows an Example Of Detecting Inspiring Causality.

FIG. 41 shows an Example Of Independent Postings.

FIG. 43 shows an Example Of Independent Postings Credits Flow.

FIG. 45 shows an Example Of Cross Postings Openmindedness.

FIG. 47 shows Examples Of Detecting Misleading Causality Dialogs.

FIG. 49 shows an Example Of Filtering Symbols For Relevance.

FIG. 52 shows Examples Of Pairing Symbols With 'emitted' For Causal Relevance.

FIG. 53 shows Examples Of Pairing Symbols With 'bethe' For Causal Relevance.

FIG. 55 shows Examples Of a Causal Method Of Linking Symbol Pairs For Automated Lexicography.

FIG. 57 shows an Example Of Disambiguating Physics Meanings For Associating Subsets Of Symbols.

FIG. 59 shows Examples Of Automatically Generated Polysemous Meanings For 'Proton', From Sample of 1100 Spellings.

FIG. 62 shows an Example Of Calculating Extra Investment Loss.

FIG. 63 shows an Example Of Calculating Extra Investment Gain.

FIG. 65 shows Examples Of Narrative Causal Tree Metrics.

FIG. 66 shows Examples Of Dictionary Causal Midline Metrics.

FIG. 68 shows Thought Space Relationships Between Rootedness And Clarity

FIG. 69 shows Advantages Of Causal Link Subtree Openmindedness.

FIG. 70 shows Creative Advantages Of Open-mindedness.

FIG. 71 shows a Method Of Calculating Causal Link Canonical Tree Open-mindedness Advantage.

FIG. 72 shows an Example Of Causal Link Midline Optimization.

DETAILED DESCRIPTION OF THE DRAWINGS

Figure 6:
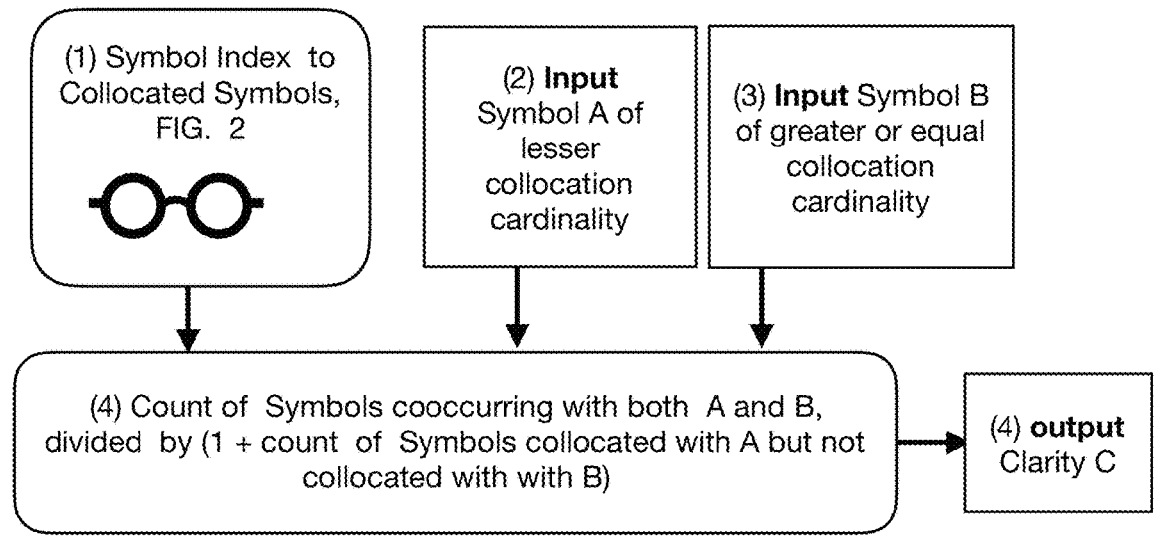
FIG. 6 shows an Example Of A Method To Compute Clarity Via Gradients Of Links Between Two Symbols Over A Bigram (S-2) Collocation Cognitive Relativity Space.

FIG. 6 shows a method for computing the 'clarity' of links between two symbols 'A' and 'B', which the present invention uses for novel methods of automated dictionary construction, as well as novel methods for automatically linking sequences of symbols via their symbolic elements, into tree structures of knowledge. The method of FIG. 6 is based upon symbol collocation data gathered by a large open set of symbol sequences, which defines a symbol space of cognitive relativity between symbols in terms of convergence and divergence of symbols, whose metrics of bigram clarity are computed from lower level metrics of convergence and divergence.

To prevent overtraining from biasing this method, a lower level metric of Convergence is adjusted by a lower level metric of Divergence. Convergence counts how many symbols collocated with symbol 'A' also collocate with symbol 'B'. Divergence is the flip side of convergence: divergence counts how many symbols collocated with 'A' Do Not collocate with symbol 'B'.

When A collocates (or cooccurs) with B in a large variety of contexts, convergence is naturally higher. A table in the lower half of FIG. 6 shows example of metrics from a set of 2 GB of Wikipedia articles written in English. From this input set, there's a cardinality of 470883 other symbols cooccurring with 'and', a large number to be expected, since the conjunction symbol 'and' is naturally useful in contexts with almost every other symbol in English language. Column 'A-and-B' shows that 'and' shares 954 coocurrences with 'nuclear physics', covering most 991 symbols 'nuclear physics' collocates with, shown in column "Symbol A Cooccurences". In column 'A-not-B', the rest of 'nuclear physics' symbols 40 are divergent from symbols collocated with 'and'. Dividing the large 'A-and-B' number by the small 'A-not-B' number plus 1, the method of FIG. 6 produces a large relativistic Clarity number of 22.2683 for the symbol pair ('and', 'nuclear physics'), showing that the meaning of 'and' is relatively clear when used with the meaning of 'nuclear physics'. This method is relativistic because it's based on the relative sizes of convergence to the divergence. Compared to prior art methods, the method of FIG. 6 is more reliable, since it does not require selection of sample sets of similarly sized documents as does TFIDF, nor closure of sampling to prevent overtraining, as required for neural nets. The method of FIG. 6 works with definitions of collocation as simple as "symbols cooccurring within six symbols within input streams."

In contrast to the high Clarity of meaning of 'and' with 'nuclear physics', the relativistic clarity of 'and' with 'or' is lower. This is because although the 'A-and-B' intersection 317222 is large, so too is the 'A-not-B' divergence of 46011, since there are so many symbols cooccurring with 'or' that do not cooccur with 'and'. This results in a clarity of 6.8965, still large but much lower than the 22.2683 Clarity of meaning between 'nuclear physics' and 'and'.

Still lower is the Clarity of meaning between 'nuclear physics' and 'cyclotron'. While 117 of the 973 symbols collocated with 'cyclotron' overlap with symbols collocated with 'nuclear physics', 856 do not, because details about building cyclotrons are not all directly connected to nuclear physics: many involve fundraising, location, engineering design and other less related topics. Consequently the Clarity of meaning between 'nuclear physics' and 'cyclotron' is even lower at 0.1365.

Even lower is the clarity of meaning between 'cyclotron' and the celebrity businesswoman Coco thane. Although 10 symbols cooccurring with 'cyclotron' overlap with symbols cooccurring with thane", having to do with money and locations, 895 do not overlap, causing a really low clarity of meaning between 'cyclotron' and 'chanel' of 0.0112. In contrast the clarity of meaning between 'perfume' and 'chanel' is eight times higher at 0.0916.

In terms of implementation, the present invention uses smaller sets of collocated symbols to drive the analysis of convergence and divergence with larger sets, both for efficiency and greater dynamic range of outputs. For instance, it would loop through the 991 symbols collocated with 'nuclear physics' to check for convergence with the 470883 symbols collocated with 'and' when computing the Clarity of meaning between 'and' and 'nuclear physics', rather than looping through the 470883 symbols collocated with 'and', since the vast majority of these cannot ever be members of the much smaller set of 991 symbols cooccurring with 'nuclear physics', and would thus decrease the sensitivity of the Clarity metric but showing too low of Clarity number.

FIG. 68 shows how the advantages of the novel methods of FIG. 6 can be extended into tree shaped knowledge representations optimized for creativity. As in FIG. 6, In FIG. 68 empirical usages of distinct collocations of symbols with other symbols are tallied, to compute convergence in terms of cardinality of set intersections of collocations, and to compute divergences in terms of cardinality of set disjunctions of collocations. Again, convergence divided by divergence gives rise to a clarity metric. A rootedness metric for each symbol is calculated, based on cardinality of the set of collocations with other symbols. This attribute describes how broadly used a symbols currently is in real usage, and so describes how likely a symbol is to cover other symbols in general. For instance, logical symbols 'and', 'or', and 'not' have very high rootedness, since logic can cover most other symbols.

This ability to cover the meaning of more symbols makes symbols with high rootedness ideal for rootward nodes in casual paths of nodes, since there is more likelihood that high rootedness symbols in such 'cause' nodes can establish meaningful contexts for their leafward 'effect' nodes. Traversing from 'cause' nodes to leafward 'effect' nodes of causal paths is thus had an optimal gradient when the 'cause' node has higher average rootedness symbols than its linked 'effect' nodes. This gradient is thus a constraint which helps define optimal trees of nodes on a causal path, link by link basis.

Figure 76:
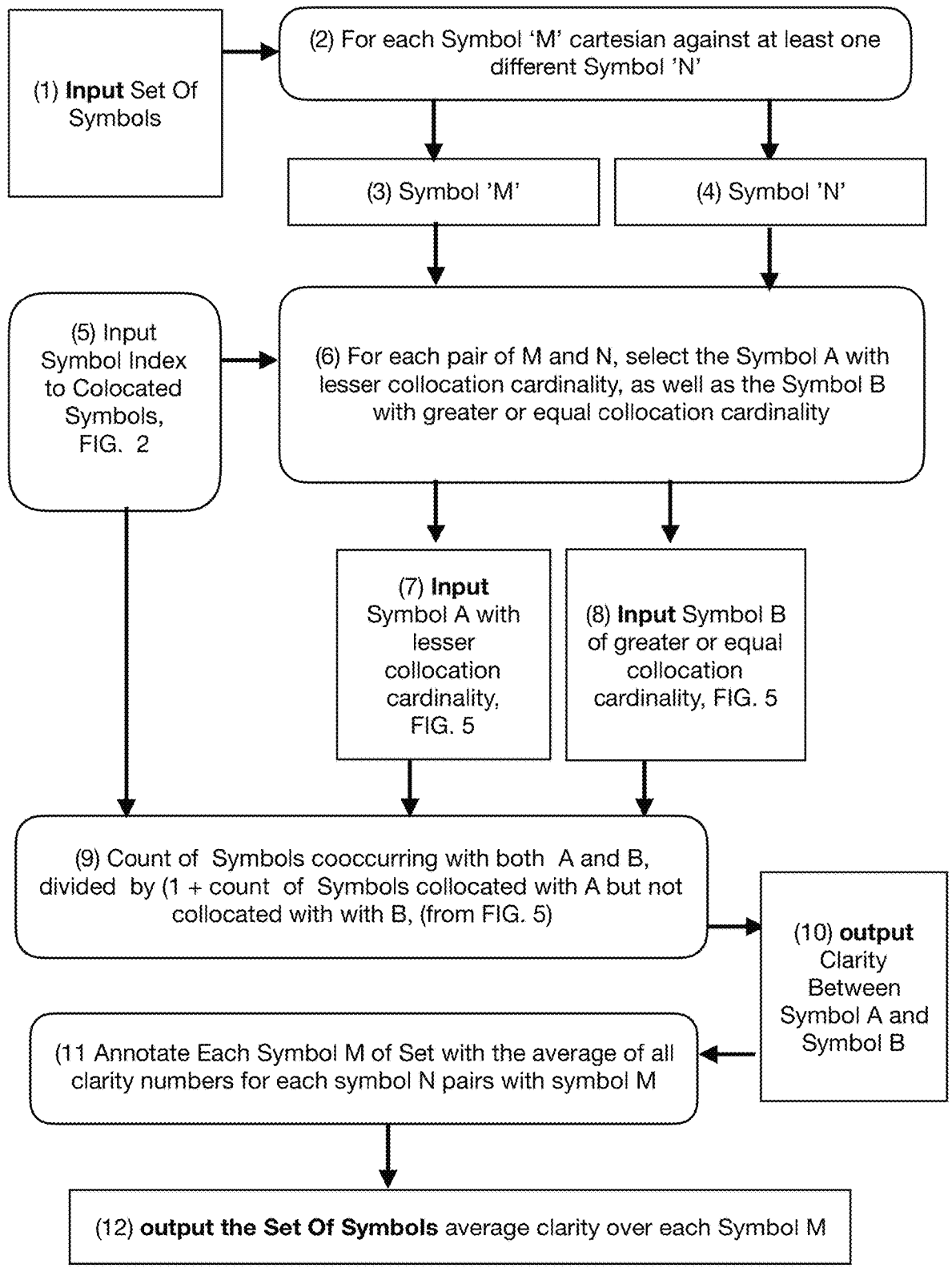
FIG. 76 shows a Method Of Computing Clarity Over A Set Of Symbols.
Figure 77:
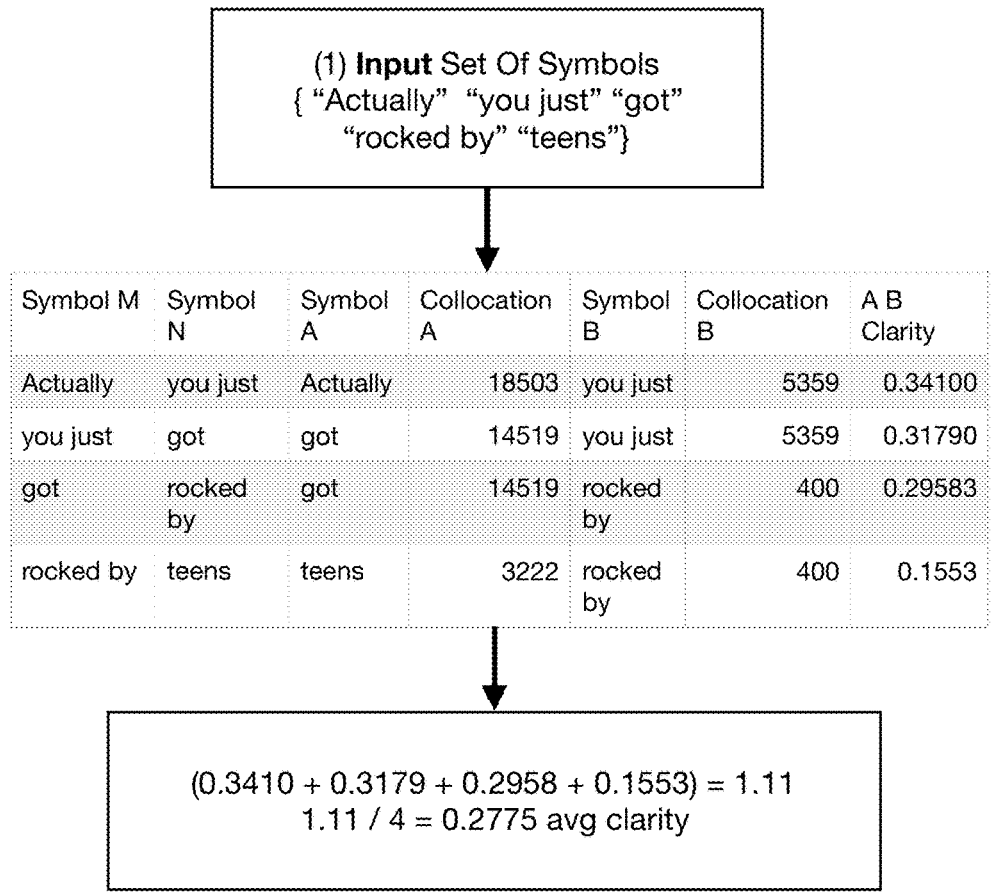
FIG. 77 shows an Example Of Computing Clarity Over A Set Of Symbols.

FIG. 68 also shows another optimal gradient, based on average clarity of nodes. Averaging the clarity metric computed over pairs of symbols of nodes (see FIG. 76 and FIG. 77) each node's clarity is computed. As with rootedness, there is an optimal gradient leading from lesser to greater clarity in 'cause' to 'effect' directions of links, This gradient traverses knowledge to greater clarity, infusing casual paths with an inspiring sense of accomplishment. Doing the opposite, traversing to lower clarity, infuses causal paths with confusion, making them so unclear that they are not useful paths.

Together these two gradients define optimal clausal paths for optimal causal trees of knowledge, in a characterization hereinafter referred to as open-mindedness. Violation of these gradients is hereinafter referred to as close-mindedness. FIG. 69 shows the creative advantages of open-mindedness in terms of the available links for extending casual paths by adding links to a tree of knowledge. An open-minded tree has many more possible links than a close-minded tree. Since an open-minded tree's root nodes have greater rootedness and lesser clarity, there is a greater cardinality in the rest of nodes available to satisfy the two gradients.

FIG. 70 shows in a histogram an example of how rootward nodes with low clarity can link to nine times as many nodes as rootward nodes of high clarity, for a simple flat distribution of average clarity values over the set of unlinked nodes. Below the histogram is as diagram showing how for each node in an open-minded tree there are nine times as many possible links as a close-minded tree, the combinatorial advantage of open-minded trees is exponential, since each node can link to nine times as many nodes, at each link there is nine times as many possible distinct causal paths which can be satisfy both gradient requirements. For a subtree of 27 nodes there is thus 27 times 9=243 times as many possible distinct causal paths for an open-minded tree as a close-minded tree, thus ensuring that an open-minded tree is preferable to a close-minded tree for enhancing creativity in a thought space.

FIG. 71 shows a flowchart for a method of calculating that exponential advantage in creativity, as well as an example of that calculation for a flat distribution of average clarity values over nodes.

When searching for nodes to link which satisfy both gradients, it's possible to exhaustively search through all available nodes. However, with millions of nodes to search for, on behalf of each node, this becomes an n-squared process. It's preferable to do something faster when selecting nodes for open-minded links. FIG. 72 shows how this is possible, by taking advantage of how each node's rootedness and clarity can be drawn in a plane of (rootedness, clarity) coordinates. Each node is in an open-minded relationship to other nodes which are below and to the right of each node in the plane. Thus all nodes located on the midline are in open-minded relationship to each other, and nodes near the midline are likely to be open-minded relative to each other. Computing the midline in a linear approximation, distance to the midline in the plane thus can serve as a filter to choose to most likely nodes to search thru looking for open-minded links. For automated dictionary construction with millions of nodes, this greatly speeds up node linking, reducing it from N-squared to N in running time.

Figure 73:
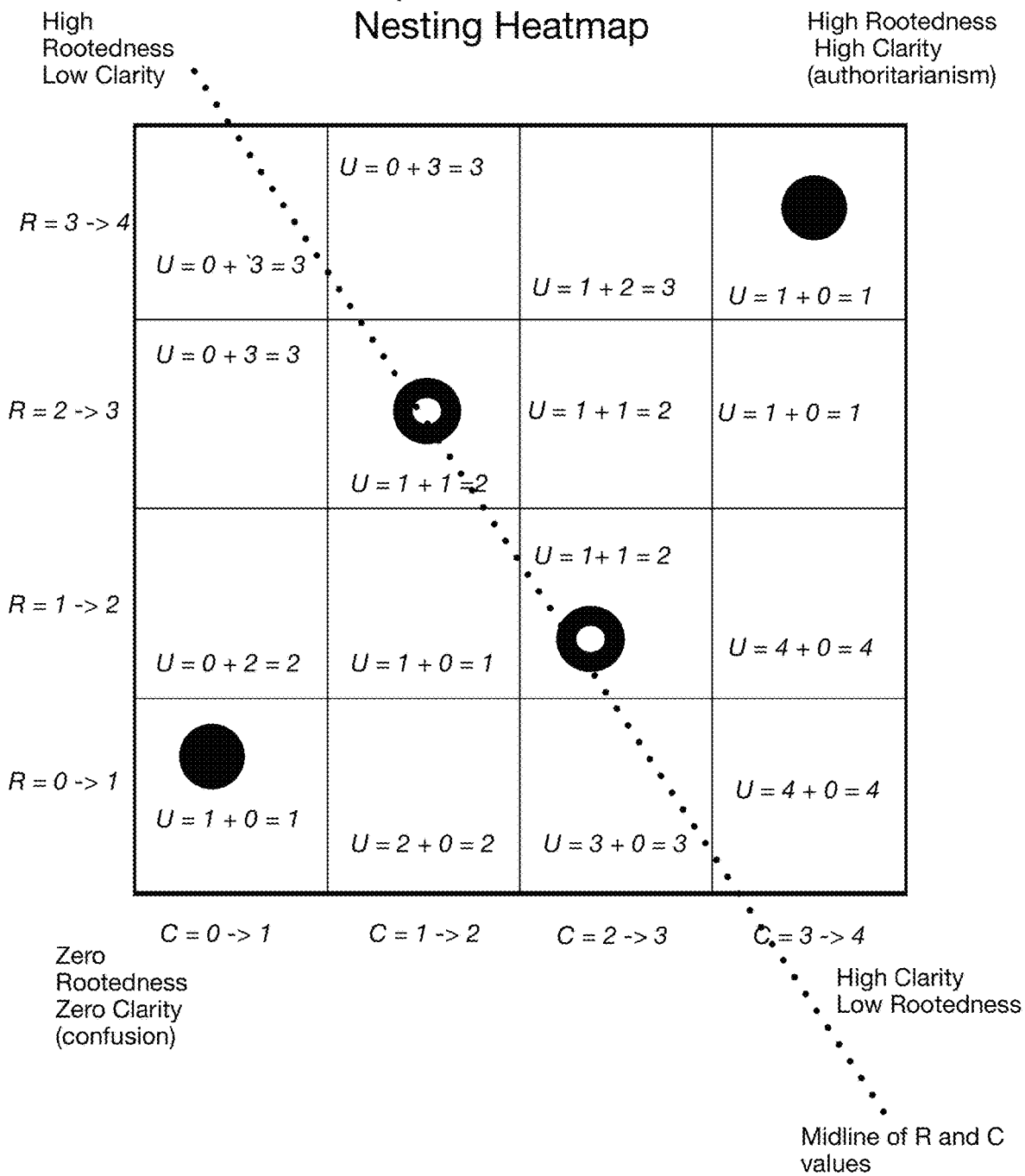
FIG. 73 shows an Example Of a Causal Link Nesting Heatmap.
Figure 74:
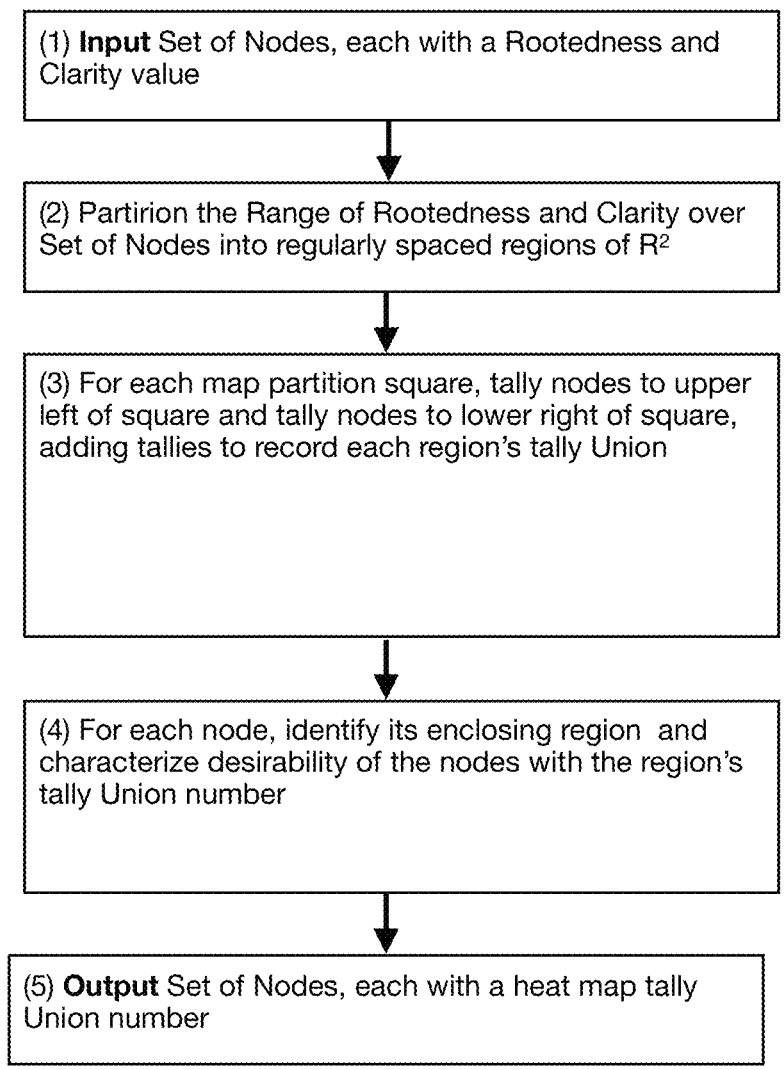
FIG. 74 shows a Method Of Calculating A Causal Link Nesting Heatmap.
Figure 75:
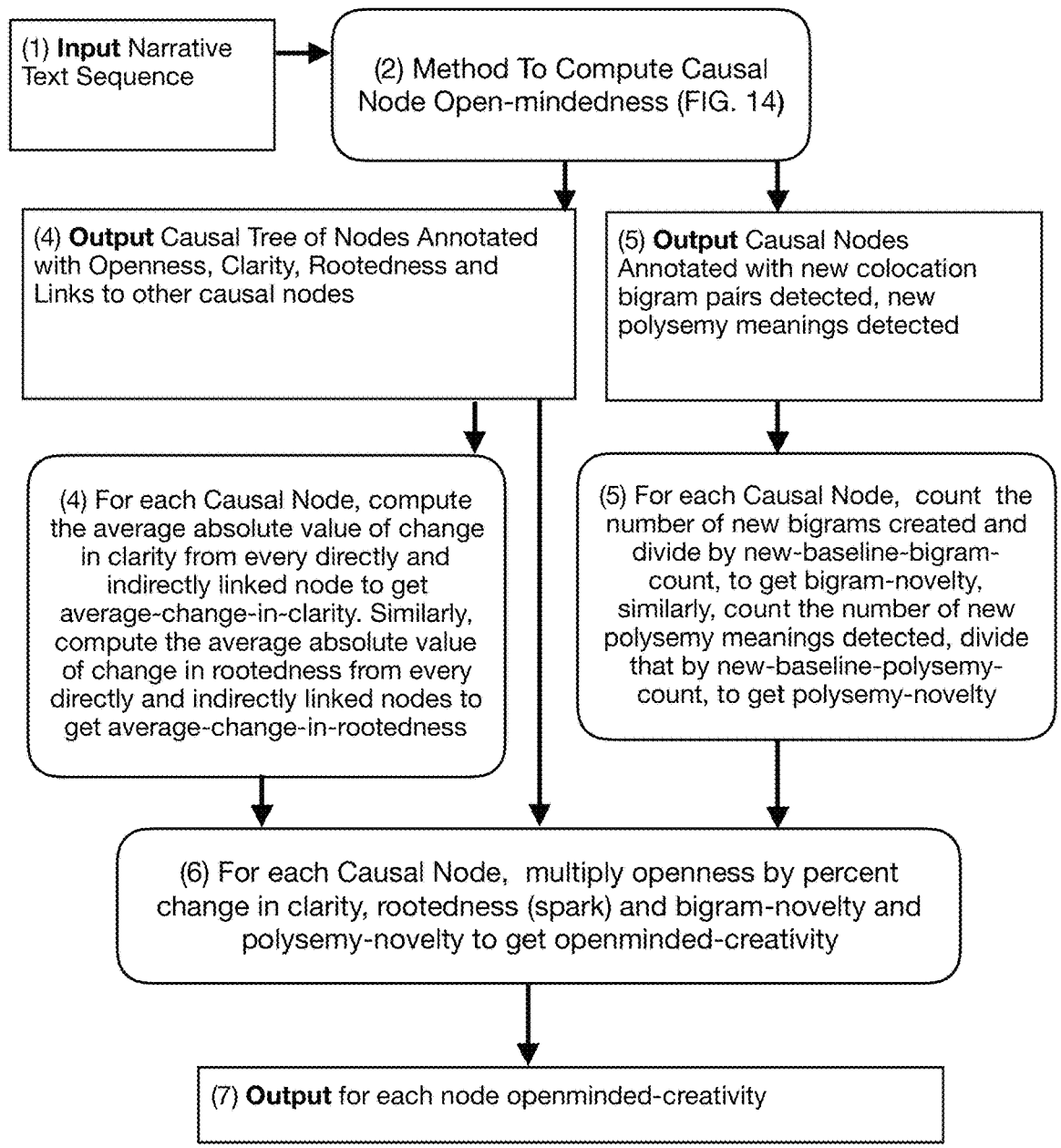
FIG. 75 shows a Method To Compute Openminded Creativity.

Another even more accurate way to find most likely nodes to search thru directly takes advantage of the fact that nodes below and to the right are open-minded when linked. FIG. 74 shows a method flowchart which divides upon the plane of FIG. 73 into evenly spaced regions, which become a heat map of desirability. For each node increments a counter for each region lower and to the right of the node. When each node has incremented each region lower and to the right, the heat map is complete and then for each node, checking the region containing the node for its heat map value describes how likely that node is to be open-minded with other nodes of the input set (1). This is an order N times R method where N is typically large, in the millions, and R is a small number of regions, typically five thousand, so the method of FIG. 74 runs much faster than N-squared.

Figure 48:
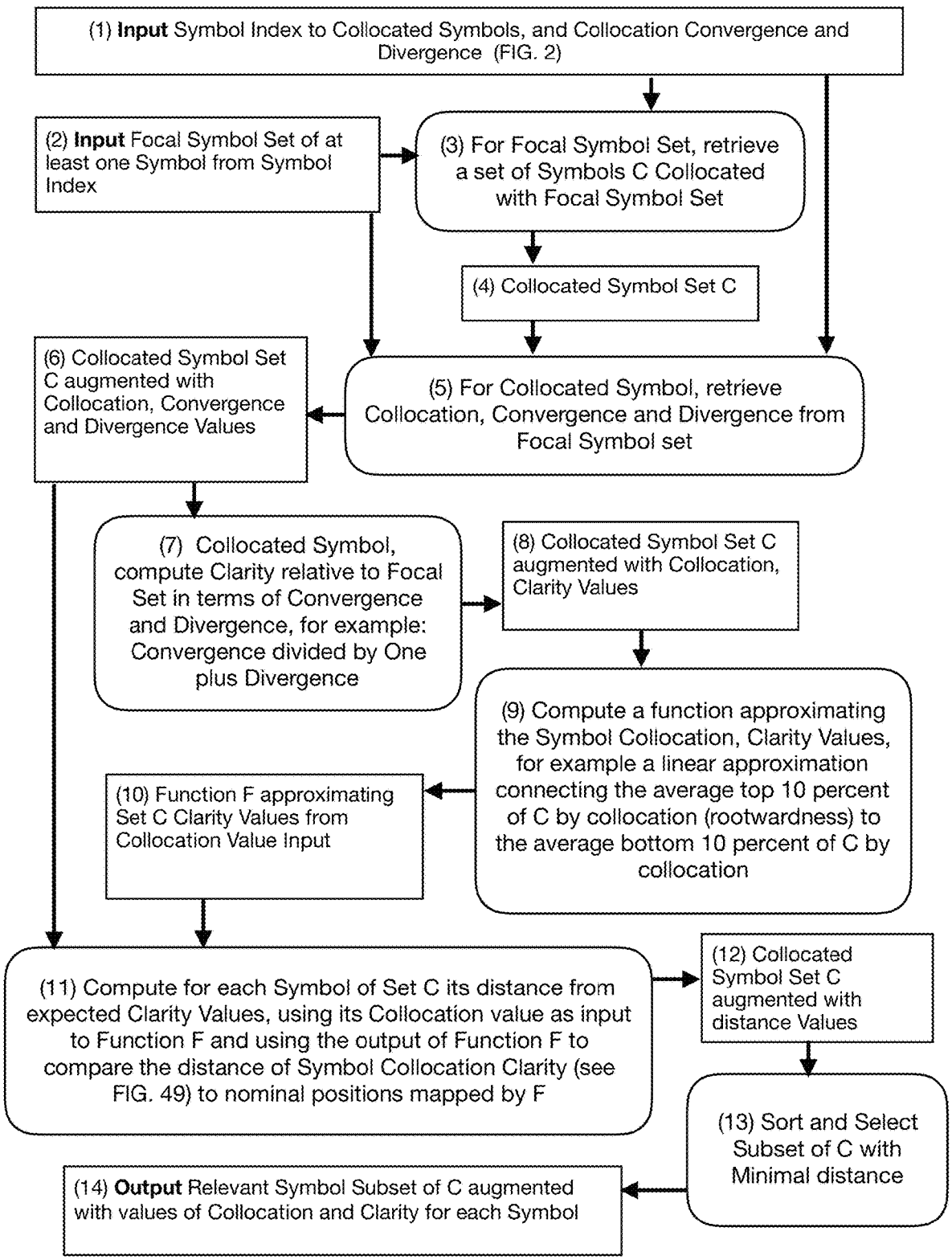
FIG. 48 shows a Topological Method Of Filtering Symbols For Relevance.

Other methods of the present invention extend the method of FIG. 6. FIG. 48 builds upon the method of FIG. 6 to show a method of filtering symbols for relevance, relative to a focal set of symbols, which can be as small as a single seed symbol, for instance, a spelling chosen for automated dictionary construction. FIG. 48 uses input from the same kind of symbol collocation data gathered by a large open set of exemplar symbol sequences, as in FIG. 6. Since so many symbols collocated with any focal set are largely irrelevant to dictionary meanings, it's important to rapidly winnow them out, so deep analysis can concentrate on the more relevant symbols. A simple approach to winnowing might use the Clarity metric of FIG. 6 alone, selecting symbols with greatest clarity with respect to the focal set. However this is only a starting point in the method of FIG. 48, since it has a higher goal of further refining and selecting causal pairs of symbols more likely to combine into useful dictionary definitions of the meaning of the focal set.

To reach this goal, the present invention teaches that consistency in relative differences in one cognitive metrics are often useful in selecting the most useful data for defining causal knowledge. In particular, consistency in relative shifts of Clarity against shifts of collocation cardinality are instrumental in making selections, since the present invention also teaches that openminded causal links in any optimal causal tree should generally have leafward nodes of greater Clarity and lesser collocation cardinality than their linked rootward nodes. This architecture for open-mindedness logically implies the utility of ancillary methods in which data is filtered to select symbols most likely to combine into subtrees of an optimal causal tree. For instance, in FIG. 48 a lower dimensional approximation to a set of candidate data, describing the relationship between clarity and collocation cardinality (rootwardness), is used to winnow candidate data. Candidate data closest to the predominant relationship between clarity and collocation rootwardness metrics is more likely to combine into leafward links of the desired form where clarity rises while collocation cardinality drops, since any links composed of data far from the predominant relationship will exclude most of the rest of the data from linking. For example, in FIG. 49, the focal set consisting of the symbol 'proton' has collocated symbols 'and' and 'or' with super high Clarity, much higher than other collocated symbols of 'proton'. Thus if 'and' or 'or' were to be selected as candidate symbols, no other symbol could qualify as leafward symbols since all other symbols are lower in both collocation count and in clarity. Also, since 'and' and 'or' are much greater in collocation cardinality than the other symbols, no other symbol can be linked rootward of them. With neither rootward or leafward links possible, 'and' and 'or' are clearly unacceptable candidates. Looking further in FIG. 49, the distance of 'and' and 'or' from the linear approximation to the relationship between clarity and collocation cardinality for all symbols collocated with 'proton' is far greater than that distance for other symbols, showing that distance from the line of optimality defined by the linear approximation is a good and efficient way to select candidate symbols. The more distant a symbol is from the line of optimality, the less symbols it can likely combine with, under the relativistic open-mindedness architecture of the present invention.

Although it's more accurate to grind through the full Cartesian set of cardinality n by trying to pair every symbol with every other symbol of the set, a computing a full Cartesian is an n-squared computational load whereas computing distance from a line then sorting by distance is only an n-log-n computational load, so for symbols with high collocation cardinality, particularly for really large input sets (for instance using the entire internet of web page texts as an input set) the method of FIG. 48 is economically very attractive.

Figure 50:
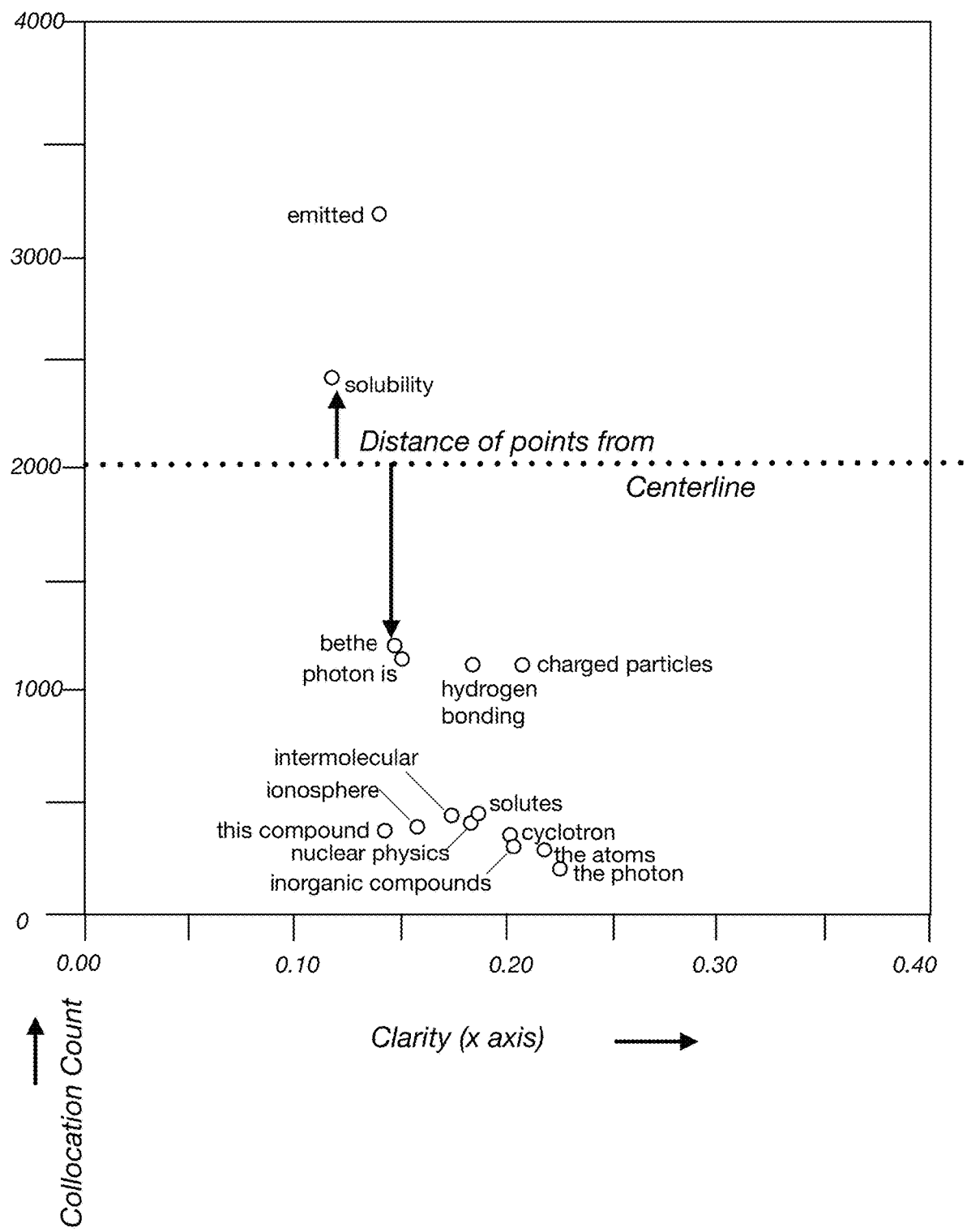
FIG. 50 shows a Topological Mapping Of Filtering Symbols For Relevance.

FIG. 50 graphs the chart of symbols from FIG. 49, excluding outliers of 'and' and 'or' because they would dominate the graph scale so much, that differences between other symbols would be merged. In FIG. 50 the symbols of 'bethe' a prominent nuclear physicist and 'charged particles' are closer to the line of optimality than 'inorganic molecules' because they are closer to being able to link with more of the symbols collocated with 'proton'. Simultaneously they are more likely to combine into valid causal definitions of 'proton', according to the methods of cognitive relativity taught by the present invention.

Figure 51:
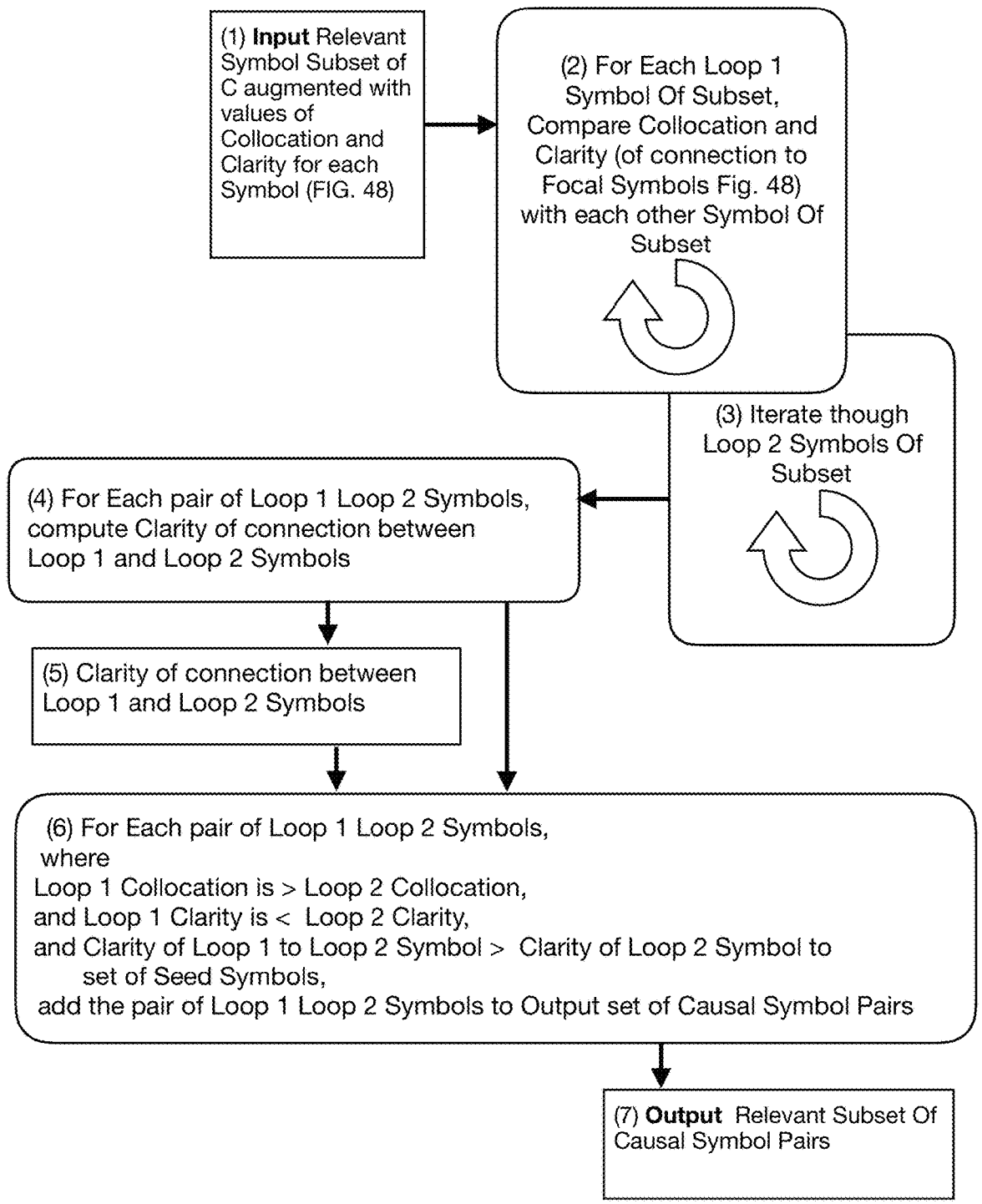
FIG. 51 shows a Topological Method Of Pairing Symbols For Causal Relevance.

Using the output of FIG. 48, the more computationally intensive selection of valid causal pairs of symbols can be accomplished by the method of FIG. 51, which uses the principles of cognitive relativity in step (6) to not only select pairs where the rootward symbol has greater collocation cardinality and less Clarity, but also requires that the Clarity between the rootward and leafward symbols of the pair is greater than the Clarity between those symbols and the focal set. This additional requirement ensures that relatively unrelated symbols are not paired up, and is another example of cognitive relativity, since threshold of the requirement is set by relative Clarity within the context of the focal symbol set, instead of being fixed by inflexible rules, for instance to a fixed minimum Clarity.

For example, in FIG. 52, the selected candidate symbols of FIG. 49 are shown Cartesianed against the selected candidate symbol 'emitted'. For brevity, only listing the Cartesian against a single symbol allows the table to fit in a single page; listing the full Cartesian would require many more pages, but each would only be teaching the same concept. The right hand volume of FIG. 52 shows the outcome of using the method of FIG. 50: 'emitted' only pairs with the symbols 'photon is', 'charged particles', 'electron and' and 'the photon'. These selected pairings are listed at the bottom of FIG. 51.

Similarly, the table of FIG. 53 shows the Cartesian of the symbol 'bethe' as Cartesianed with other selected candidate symbols of FIG. 49. As with FIG. 52 the outcome of using the method of FIG. 51 is shown in the right hand column of FIG. 53: 'bethe' pairs only with 'nuclear physics', 'the atoms' and 'ionosphere'. The ionosphere was significant in Bethe's research in nuclear physics. These output pairings are listed at the bottom of FIG. 54.

In order to automatically generate a causal tree defining the meaning of a focal set of symbols, the present invention concatenates the causal pairs output of the method of FIG. 51, again using the architecture of cognitive relativity to control the selection of data, to avoid meaningless accumulation of links between symbols. Although most causal patterns are transitive to many other causal patterns, a restricted transitivity defined by relative Clarity and collocation cardinality enables the method of FIG. 54 specifically in step (6) to reject spurious concatenation, in another example of the application of cognitive relativity.

The table in FIG. 55 shows the results of applying the method of FIG. 53 to the output data from FIG. 52 and FIG. 53 as well as other causal pairs (not shown) produced by the method of FIG. 51 applied to the candidate symbols of FIG. 49. These results are shown pair by pair in the right hand column of FIG. 55.

Since a concatenation of pairs is only possible when a spelling of a leafward symbol is identical or through morphology substantially identical to the spelling of a rootward symbol of another pair, there are only a few combinations of pairs meeting that criteria. The additional criteria restricting transitivity in step (6) of FIG. 54 require that the gain in clarity across elements of a pair are greater in the leafward pair of the proposed concatenation, showing that Clarity gains are increasing leafward, further confirming the rise in Clarity leafward, and also that this jump in Clarity is within reasonable bounds, showing that no steps in causal linkages have been skipped. Skipping steps in causal linkages is dangerous because the resulting hollow reasoning is likely biased towards jumping to quickly to conclusions, as when superstitions are believed.

Figure 54:
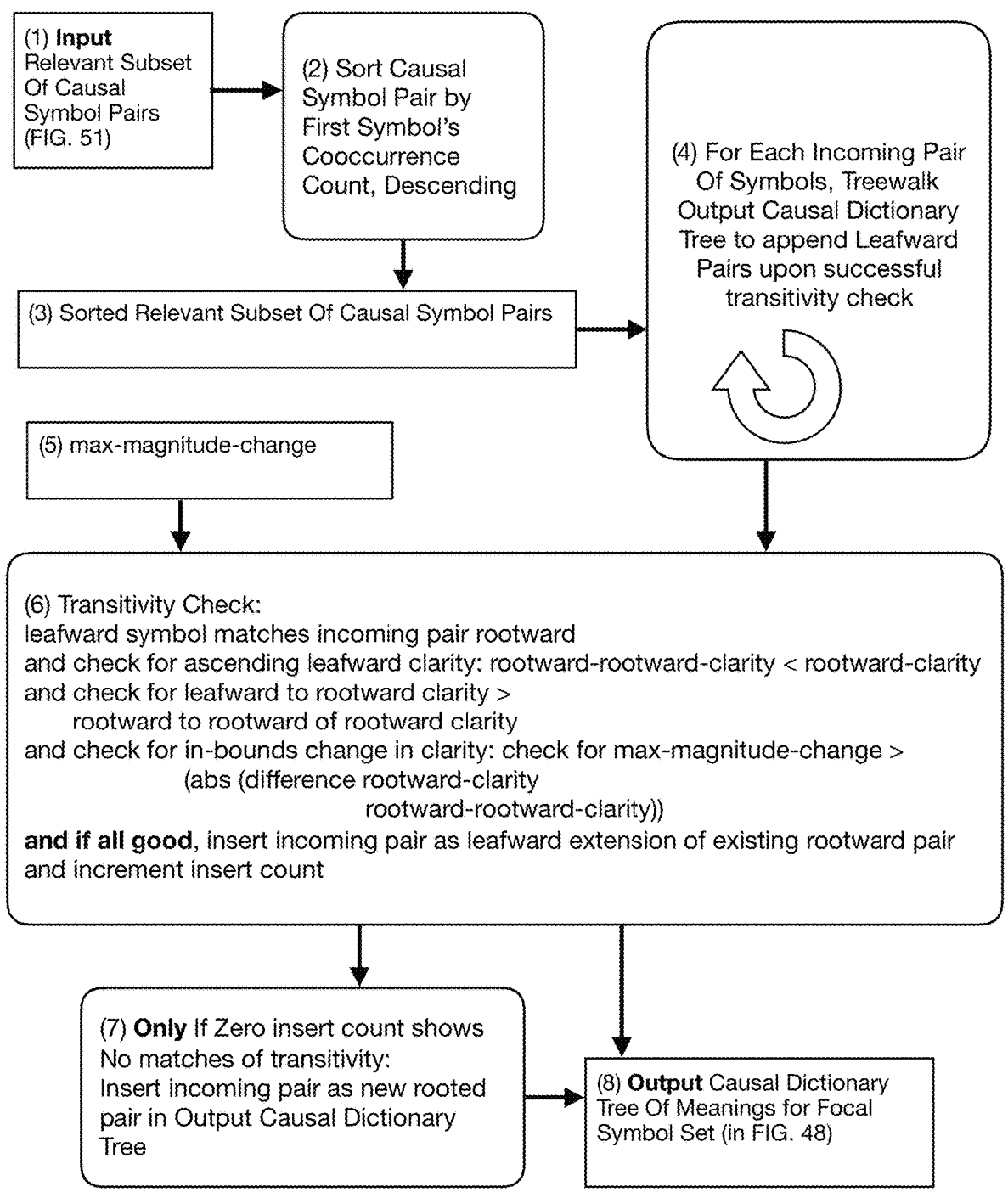
FIG. 54 shows a Causal Method Of Linking Symbol Pairs For Automated Lexicography.

The results of concatenation of pairs selected by the method of FIG. 54 are shown in the automatically generated causal tree at the bottom of FIG. 55. Even pairs disqualified for concatenation with other pairs are still useful since isolated pairs form stub top level branches in the causal tree, and in cases where these stubs share common root symbols, form simple subtrees of common root causes, each a different polysemous meaning of the focal set of symbols. For instance 'the atom' is a common root of 'atomic nucleus' and 'subatomic'.

In contrast, 'bethe' and 'solubility' are separate polysemy branches having deeper meanings since the method of FIG. 54 concatenated pairs to create deeper and more specific meanings. These deeper meanings allow symbols such as 'hydrogen bonding' and 'nuclear physics' to be inferred from their surrounding rootward and leafward symbols in the tree: when the symbols 'solubility' and 'intermolecular' occur in the context of 'proton' it's reasonable to infer that 'hydrogen binding' is also within context. Similarly when the symbols 'bethe' and 'cyclotron' occur within context, it's reasonable to infer that 'nuclear physics' is also within context. These inferences based on surrounding symbols are used the method of FIG. 56 to disambiguate meanings based on surrounding symbols matched from automatically generated dictionaries in FIG. 54.

Figure 56:
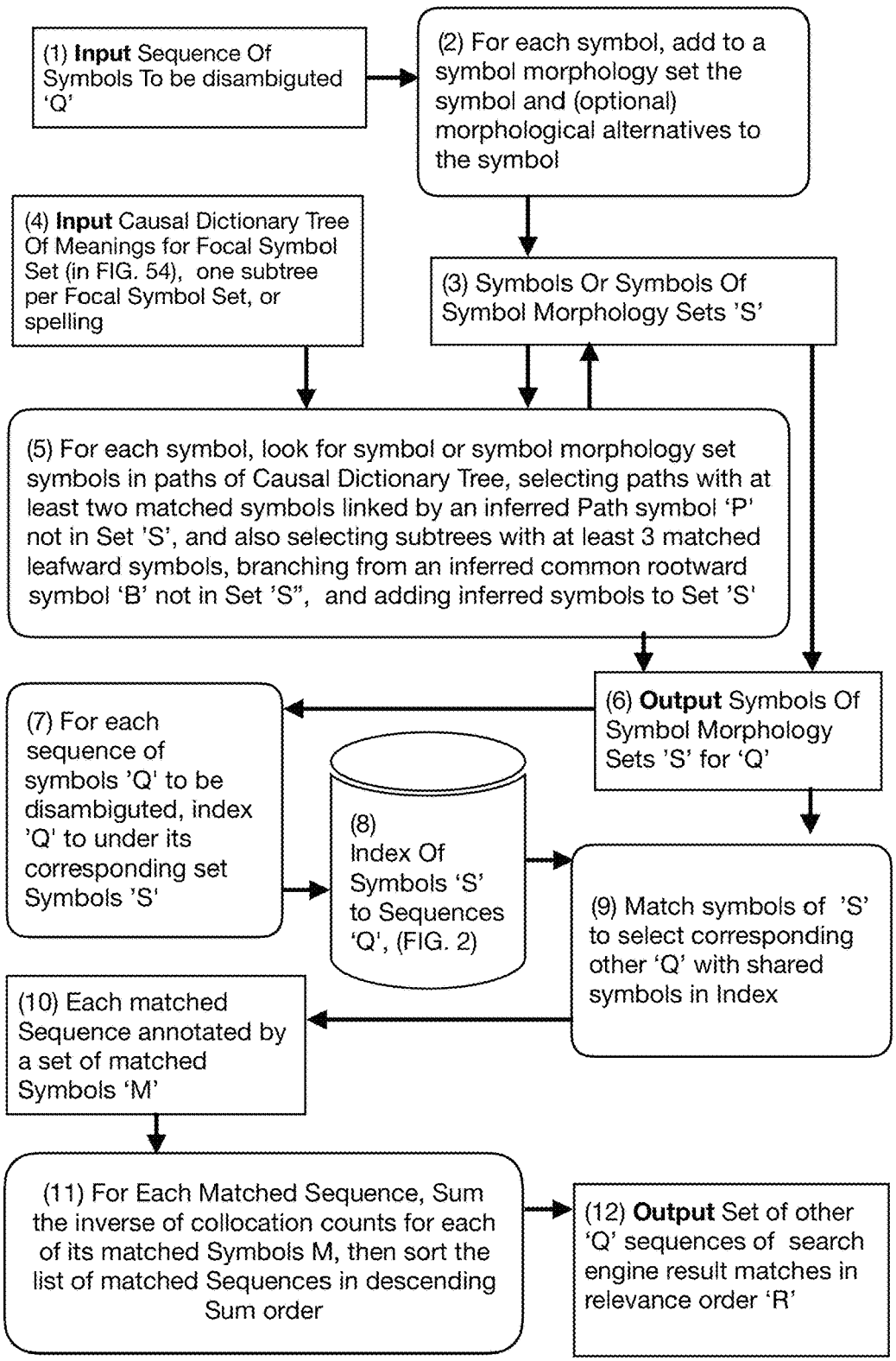
FIG. 56 shows a Method Of Disambiguating Polysemous Meanings For Meaningful Search Of Sets Of Symbols.

For instance, in step (5) of FIG. 56, an inferred symbol connects two matched symbols in a path of the causal tree. Also in step (5), an inferred symbol may be a shared rootward symbol of three or more matched symbols. The accumulation of inferred symbols then can drive the accumulation of further matches to the Symbol set 'S' resulting in cascades of further accumulations of inferred symbols. When all possible cascades have been computed, the resulting set of Symbol 'S' can be indexed as keys pointing to the meaning of the sequence of symbols 'Q'.

To compute the closeness in meaning of a sequence 'Q' of symbols to any other sequence 'Q' of symbols, the set intersection of respective symbols 'S' of their meanings can be measured for shared meaning by summing the inverse of collocation cardinality for each shared symbol, in the intersection, to reduce the weight given to highly collocated symbols such as 'and' and 'or'.

FIG. 57 shows an example of text sequence 'Q' symbols where the inferred symbol is 'nuclear physics' and the rootward matched symbol is 'bethe' and the leafward matched symbol is 'cyclotron'. The bottom of FIG. 56 shows a table of the resulting symbols 'S' augmented by the inferred symbol 'nuclear physics' and with the inverse of collocation cardinality significance of each symbol listed in the right hand column of the table. This right hand column shows that 'for' and 'had' are least significant and that 'nuclear physics' and 'cyclotron' are the most significant.

Figure 58:
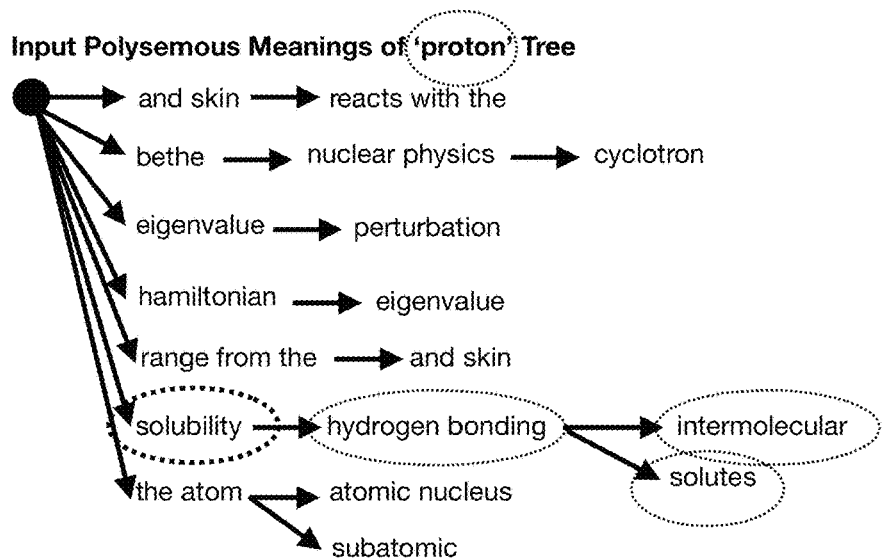
FIG. 58 shows an Example Of Disambiguating Chemistry Meanings For Associating Subsets Of Symbols.

FIG. 58 demonstrates an example of a different text sequence of 'Q' symbols, where the matched symbols are 'intermolecular', 'hydrogen bonding' and 'solutes' which all share a common rootward symbol 'solubility' in the input causal tree meaning of proton which also is matched in the set of 'Q' symbols. Consequently the method of FIG. 56 step (5) infers the symbol 'solubility' and adds it to the set of symbols 'S' to be indexed as the meaning of 'Q'.

To give an overview of the polysemous meanings automatically defined by the methods of FIGS. 48, 51 and 54 for the symbol 'proton', FIG. 59 shows the distinct paths through the automatically generated causal tree, showing how major branches in polysemy are automatically defined for concepts of chemistry and physics, which also distinguish biochemistry under 'amino' experimental physics under 'emitted'. The use of this fractal-like method to generate subtrees vis concatenation in the present invention enables unlimited distinctions of polysemy to be defined automatically, and with sufficient compute resources, to be defined in real time, unlike prior art lexicographic methods.

Together with the disambiguation method of FIG. 58, the present invention is capable of linking sequences 'Q' on the basis of shared meanings created in real time, which is essential for working with memes and other symbolic meanings created in real time on the internet.

Figure 3:
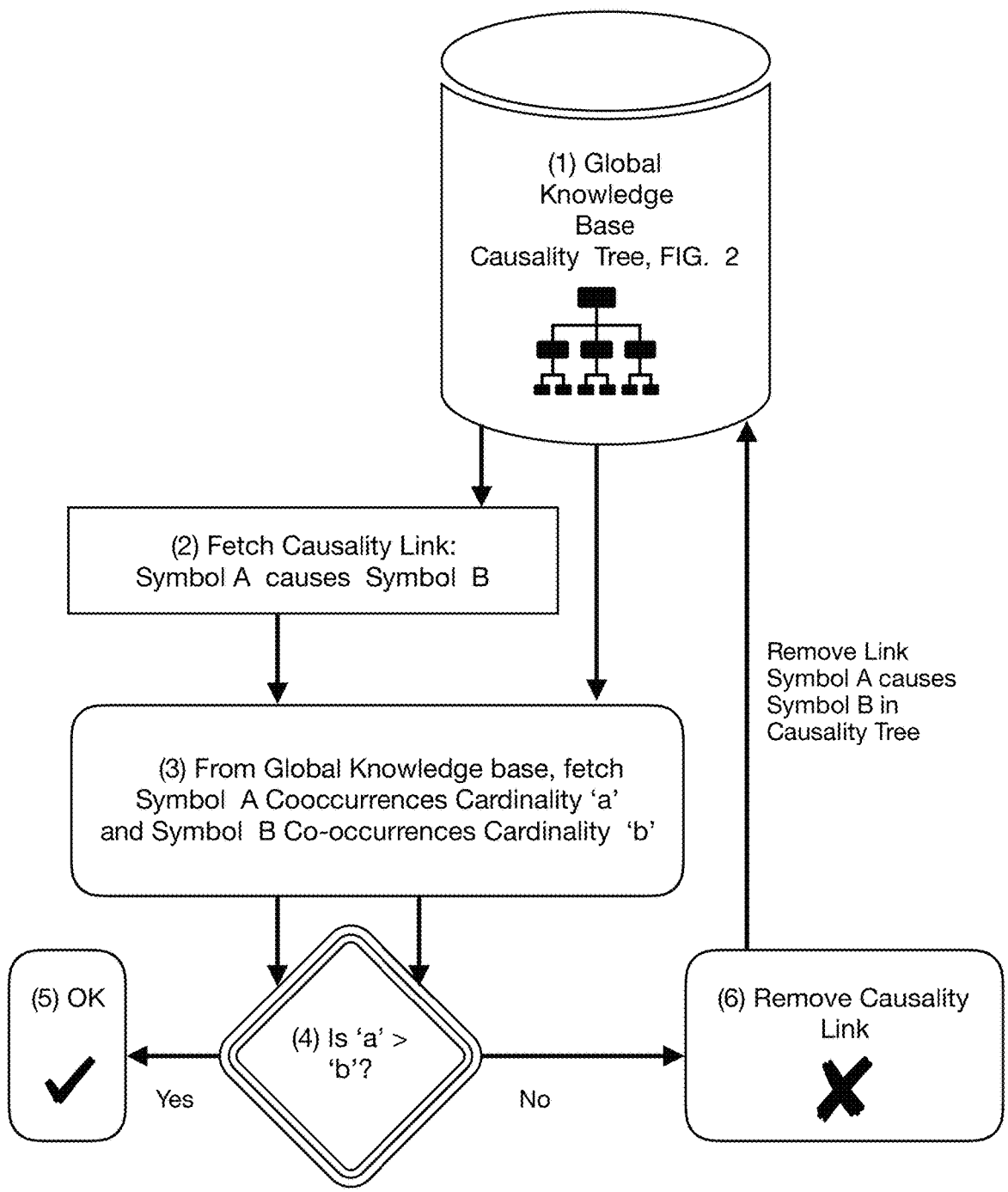
FIG. 3 shows a Causal Direction Filter Method.

Circling back to reiterate foundations of automatic methods to infer causal direction from sequences of symbols, FIG. 3 shows a simple filtering method to determine which of two associated symbols are the cause of the other symbol. This simple method and variations of this method are some of the novel methods of which in turn enable the present invention to automatically construct complex structures such as dictionaries, summaries of documents, news leaderboards, and to incentive creativity through social media, to compete with existing social media monopolies. Other novel which contribute to the present invention's ability to compete with existing social media monopolies are listed in FIG. 1.

FIG. 3 is an accurate and flexible method, since most symbolic concepts, especially root causal concepts, are highly transitive and can be combined with most other concepts: this overwhelming transitivity of concepts toward linking into causal chains give broad utility to the method of FIG. 3, since the observed cardinality of collocation with other concepts is a reliable performance indicator of the overall rootwardness of a concept symbol. FIG. 3 enables an open set of all concept symbols in a language to be fully ordered into list of symbols sorted by rootwardness in descending order, and all pairs of symbols describing cause to effect links can on the basis of FIG. 3 to have a more rootward symbol as cause and a less rootward symbol as effect, within the pair itself. FIG. 3 further provides a well-ordering of the set of causal pairs. Further, any path in a well-ordered causal tree where the root nodes are root causes and paths through the tree are root causes linking to leaf effects, in a chain of cause effect pairs, such a tree can be well-ordered over all its paths to have the more causal nodes with higher collocation cardinality than less causal nodes, so that traversing any path in root to leaf order, the traversed nodes have descending collocation cardinality.

In FIG. 3 the flowchart shows how to curate causal links in the knowledge base (1) but the general form of the method of FIG. 3 handles links between any kind of symbolic data, such as links between sequences of symbols or just links between individual symbols.

FIG. 4 shows examples of collocation cardinality used to compute the relative rootwardness of sun versus streetlights. As an example of FIG. 3's ability to reject circumstantial evidence, the higher collocation cardinality of sun in the method of FIG. 3 rejects causal links where streetlight cause the sun to set, but accepts the causal links where sun setting causes street light to come on.

FIG. 5 shows another example of collocation cardinality used to compute the rootwardness of 'attitude control' relative to 'stationkeeping'. In this example 'attitude control' is computed to be more likely the rootward cause of stationkeeping than the other way around: stationkeeping is only one specific outcome of the general concept of attitude control, which motivates many other effects such as trim control in aircraft and rockets and even voter opinions in politics.

The rootwardness as computed by collocation cardinality thus measures the raw power of a concept to motivate or effect a wide variety of other outcomes, which in turn is a basis of the present invention's novel metric of open-mindedness.

FIGS. 12 and 13 outline and clarify the topology of changes in conversation which signals a conversational turn towards open-mindedness and empathy. In FIG. 12, a simple form of narrative close-mindedness is shown, using just two nodes A and B. In this example, A and B are linked by whatever coming symbolic meaning they share, and the average symbolic collocation cardinality of A is higher than B, so by the method of FIG. 3, node A is linked rootward of node B. Since the clarity of node B, (assessed by sentiment measuring or grammatical quality metrics) is lower than A by 2, the open-mindedness of the method of FIG. 14 is negative 2, showing addictive or close mindedness behavior in the conversation.

The relative drop in clarity from root to leaf node can be reversed by new nodes linked to a close-mindedness causal tree. FIG. 13 shows a new node C leafward of Node B. Node C has a Clarity of 6, so high that it is higher than either Node A or Node B clarity. Thus when calculating the difference in Clarity between new Node C and the other nodes, the sum of open-mindedness accumulated in the causal tree gains 2 from the difference between Node A and C, gains 4 from the difference between Node B and C, and from the links summed for Node C, a gain of 6, for a total improvement of 12 which overcomes the prior open-mindedness deficit of 2, leading to a new causal tree total open-mindedness of 8.

This kind of improvement is possible in conversational threads where people diligently steer the discourse in the direction of honest exchanges which make empathy possible. In order to effectively link new nodes to existing nodes the new nodes have to address the same topics as the old nodes, linking by criteria in the method of FIG. 56. When new nodes have greater clarity, they must also focus on specifics with lower collocation cardinality, which then serve as solutions and clarity about outcomes. When the new nodes have lesser clarity, they must have higher collocation cardinality, to serve as honest contextualizations of problems. In both cases, cognitive relativity guides the analysis of the causal tree to enable the present invention to select and reward openminded improvements of conversations, node by node.

Figure 14:
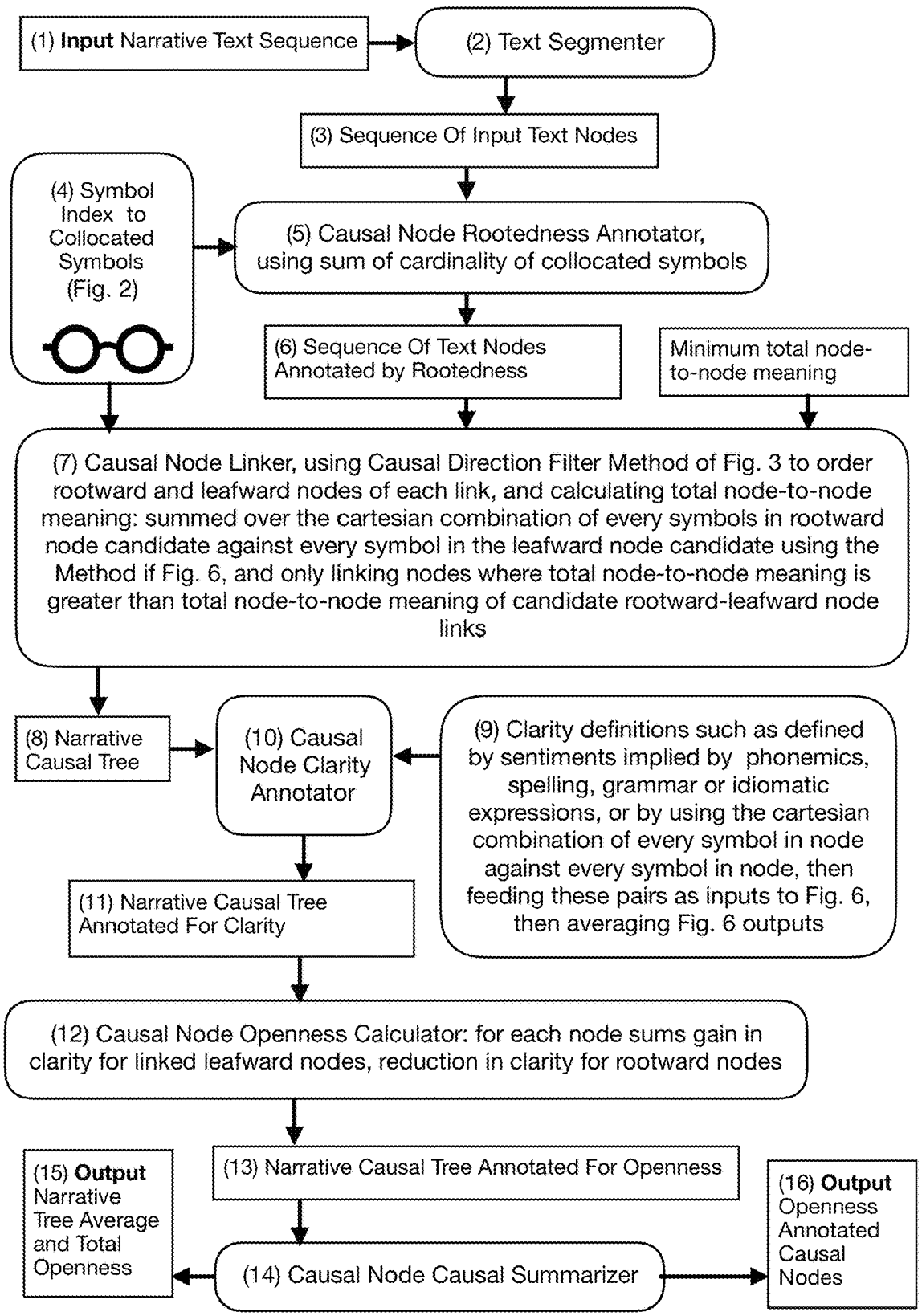
FIG. 14 shows a Method Of Computing Causal Tree Openness.

FIG. 14 shows a method to compute open-mindedness, an the antidote to the addictions of trolling and bullying on the Internet. In the present invention, open-mindedness is computed as another variation on cognitive relativity metrics, this metric computed over terms of sequences of symbols, which partitioned and concatenated into a causal tree, leafward nodes always have less rootwardness than linked rootward nodes, and for openminded links in the leafward nodes also have greater Clarity. Clarity in for open-mindedness is computed in terms of positive sentiment or phonemic clarity or grammatical clarity, or some other computable measure of confidence attributable to a sequence of symbols. In most examples open-mindedness shown herein, the Clarity was computed from a variety of phonemic sentiment or similar measures tracking spellings, and weighted to produce an overall Clarity metric for each subsequence of symbols, which are concatenated as nodes in a causal tree, by linking nodes for matched meanings as in FIG. 56.

Total open-mindedness of an entire causal tree can then be computed, for an input set of sequences of symbols from a partition of a larger sequence of symbols: the gain in Clarity from rootward to leafward nodes in the causal tree are computed, node pair by node pair, and then summed over all node pairs to compute overall open-mindedness of the input sequence of symbols.

Figure 15:
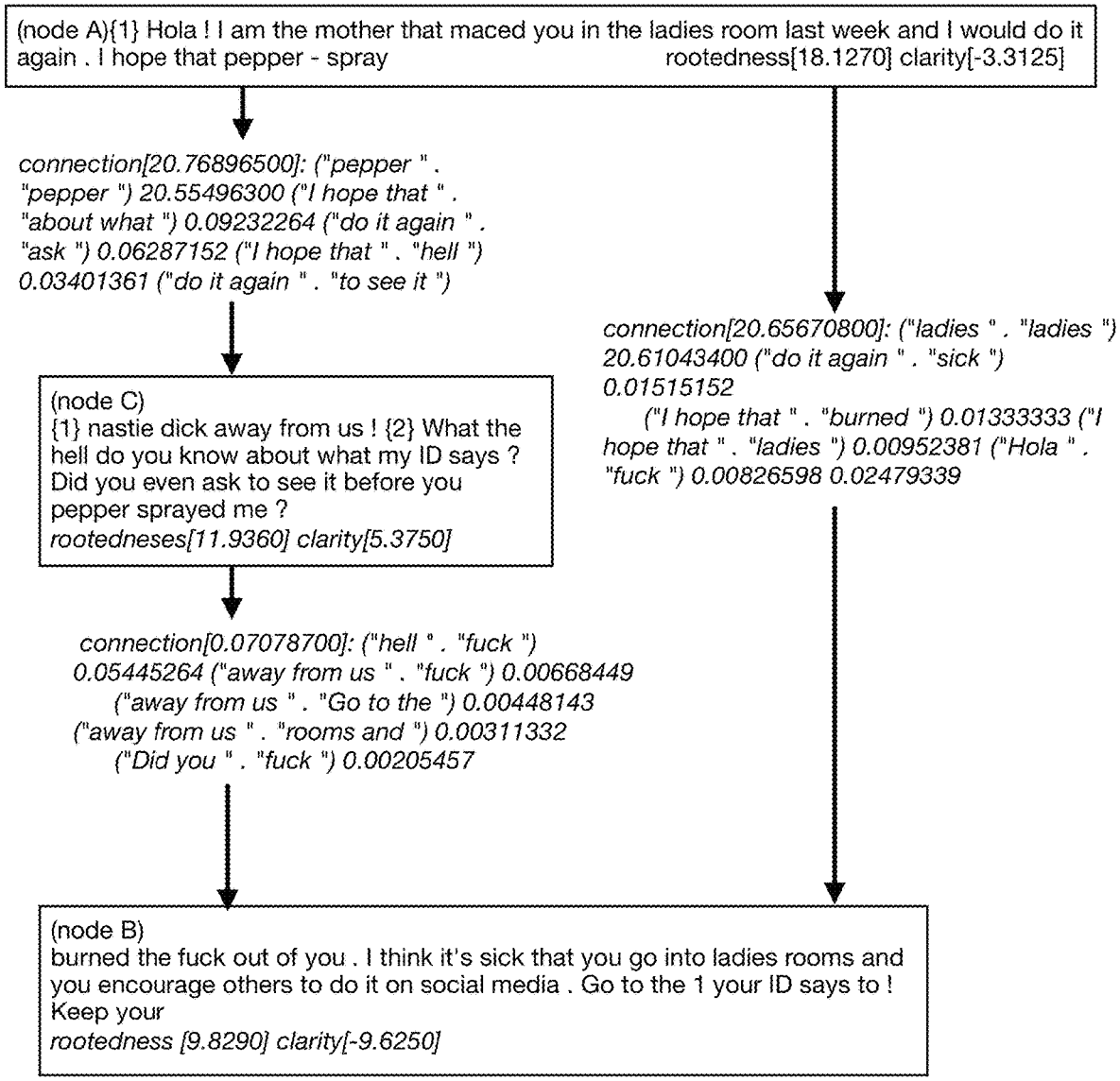
FIG. 15 shows an Example Of Addictive Anger On Social Media.

FIG. 15 shows an example of the first portion of this calculation, using narrative sequence of texts {1} and {2} as the input larger sequence of symbols, then dividing narrative texts into three nodes each holding a subsequence of the larger narrative sequence. In this example, the segmentation was done to favor a canonical average segment length with variations to reduce meanings spanning segment boundaries; many other segmentation metrics could work, such as grammar based segmentation or even crudely fixed length subsequences, which are quickest to compute but tend to separate concepts into nodes unnecessarily.

These 3 nodes are then linked by shared meanings as by the method of FIG. 56, and the links are arranged in descending average collocation cardinality order of rootwardness as shown by the method of FIG. 3.

The resulting causal tree can then analyzed for overall open-mindedness, as shown in the example of FIG. 16. The difference in clarity between every rootward node linked to its directly linked and indirectly linked leafward nodes is summed. When its total sum of leafward node clarity minus rootward node clarity is negative, that node has negative open-mindedness, and when that sum is positive (so that leafward links lead to nodes with higher clarity) the open-mindedness of a node is positive. Thus for the 3 nodes partitioned from the narrative sequence, node A is mildly positive and Node B and C are strongly negative, so that the overall narrative is strongly negative in open-mindedness.

Since the rootmost node is positive and leafward nodes are negative, this leafward pattern of descent into negative open-mindedness in FIG. 16 is typical of addictive abusive trolling on the internet, where a keynote node pulls readers into the thread on a positive note, which then descends into competitive negativity. Since the present invention's automated moderation of internet social media must succeed on a tweet by tweet basis, accurate open-mindedness metrics at the node level enable the present invention to attribute addictive behaviors and good behaviors to individual posts made on the internet, within each conversation thread. Having distinguished between good and bad posts, the present invention then rewards posters who bravely put in the hard work to post encouraging comments that move the conversations towards empathy and healing, thus deserving praise if not financial rewards for their efforts.

FIG. 19 shows two new nodes D and E which have improved the conversation of FIG. 15 exactly as outlined above in FIG. 12 and FIG. 13. Node D has a relatively higher average collocation clarity, but also a relatively lower clarity, so it's text "Did you even ask to see it before you pepper sprayed me? Did you know I was wearing contact lenses and spent and spent the next ten minutes trying to wash the pepper spray out of my eyes?" is a good way to reframe the conversation with an honest description of a problem.

The new node E has relatively lower average collocation cardinality and relatively higher clarity, so it serves as an honest if misguided solution to the problems:
"The acids get ground into my eyeballs. You deserve every minute of that agony, you dangerous creep."

FIG. 20 shows the node by node calculations of open-mindedness of the causal tree of FIG. 19. By adding nodes D and E to the earlier causal tree of FIG. 15, the total open-mindedness of the causal tree has increased from −16 to positive 65.

By continuing to add nodes, the conversation can progress towards even greater honestly and empathy, as shown in FIG. 24. The additional texts in FIG. 23 result in more nodes added, which automatically creates a causal tree with so many nodes they cannot be fit into a single page as was FIG. 19. However, FIG. 24. lists the new nodes F, G, H, I, J and K, and show how the strongly positive open-mindedness automatically calculated for these new nodes greatly contributes to the overall open-mindedness of the conversation. Not only that, but the new nodes have additional open-minded values of clarity and collocation cardinality to the earlier nodes, and since they are indirectly linked to the new nodes, these earlier nodes each tend to have increased openminded as well. Through deeper indirect links, there emerges a network effect of cascading increases in open-mindedness, to a really large value of 627.875. This large increase shows how metrics using cognitive relativity can efficiently reinterpret mood changes in conversations, to automatically identify when conversations turn from destructive to constructive dialog (or the other way around).

This powerful automated method to characterize conversation at a granular level of short sequences of symbols mapped to causal tree nodes enables the present invention to address one of the most pressing problems of social media, which is the automated moderation of incoming content postings which too often have trolling, bullying and lies supported by large scale low cost publication and reposting.

Since the methods of the present invention apply to sequences of symbols, whether these symbols are words, ideograms, or meaningful pictures, the multimedia content of social media could be moderated to determine its contextual open-mindedness automatically in real time. Any recognizable meaning in any picture, cinema, soundscape or other medium of communication can be analyzed in terms of collocation convergence and divergence (and the other metrics of the present invention) although texts are generally less resource intensive mediums for such analyses.

Since there is a latent social good associated with honest conversation about people's needs and solutions for obtaining them, the present invention utilizes its metric of open-mindedness to automatically identify and reward specific instances of open-mindedness. Since this metric is accurate at a fine level of granularity, roughly the same level as individual comment in conversational threads of social media, the present invention utilizes this metric to automatically moderate social media postings on an individual basis, thus overcoming the vast economic gap in prior art between the low cost of posting and the high cost of moderation, which has led all social media platforms to skimp on moderation, with disastrous social consequences, especially the spread of hate speech into echo chambers of prejudice.

Figure 17:
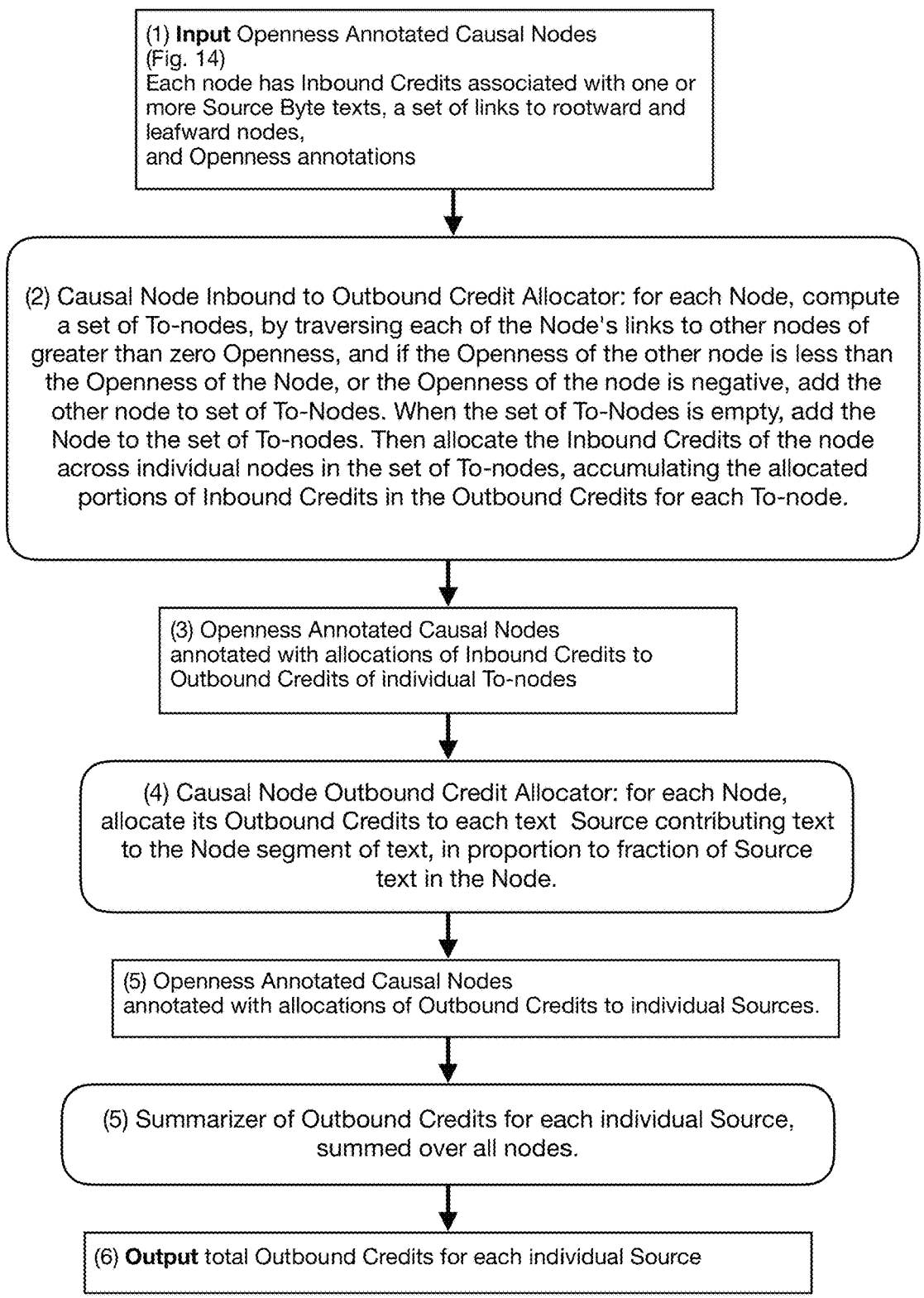
FIG. 17 shows an Method Of Allocating Credit To Openminded Causal Nodes.
Figure 21:
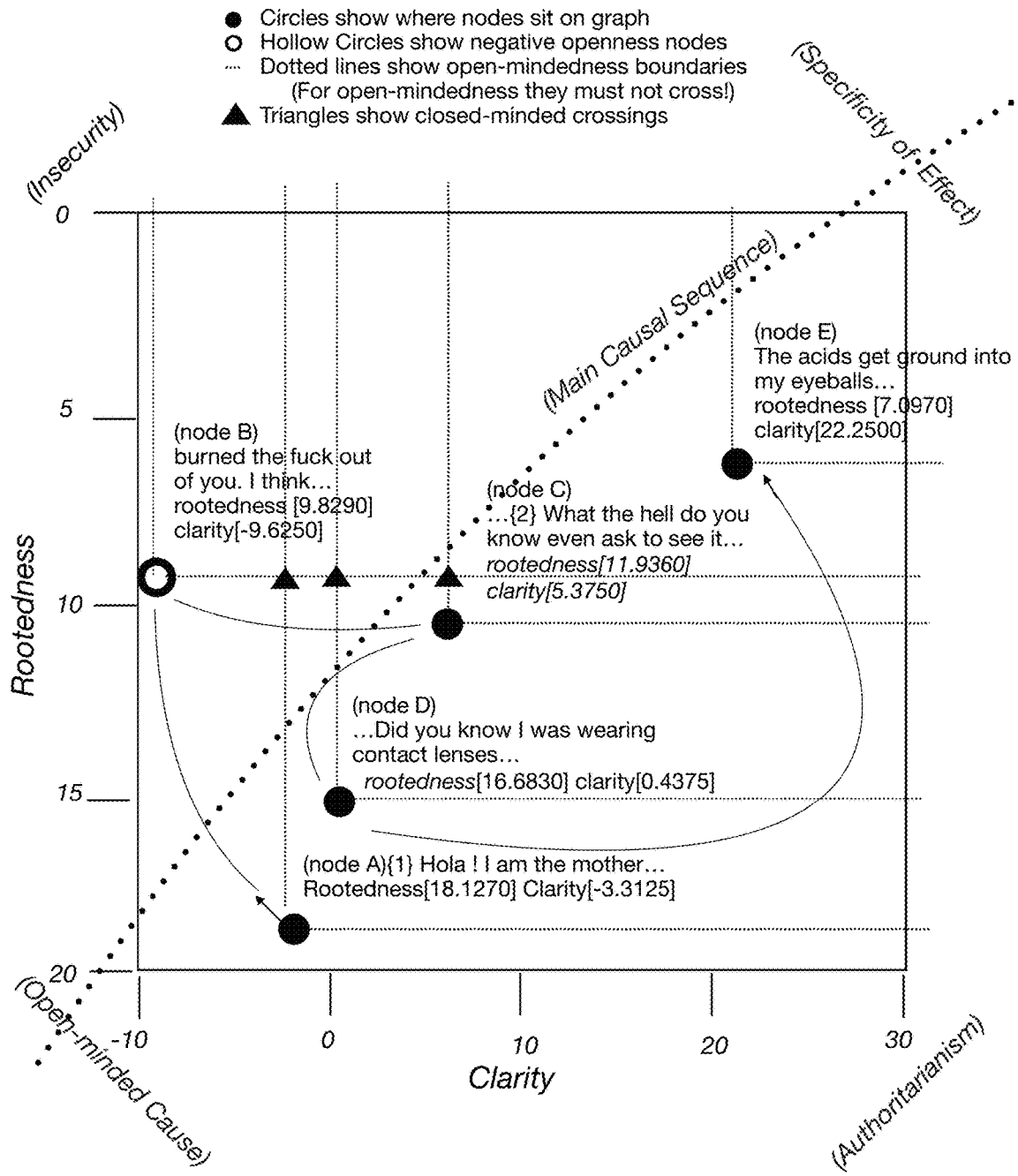
FIG. 21 shows an Example Of a Graph Of Mitigated Addictive Anger.
Figure 22:
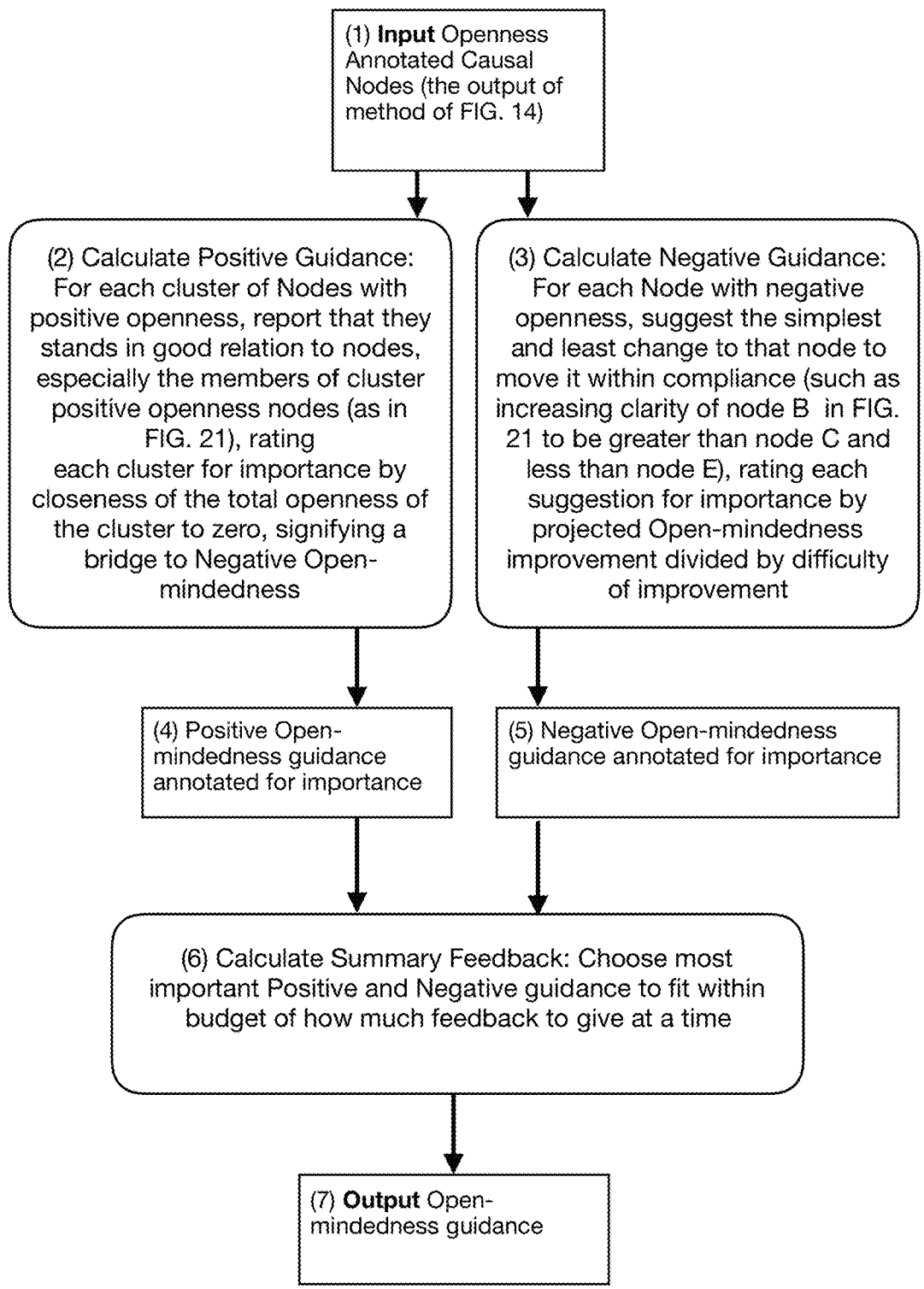
FIG. 22 shows a Method To Output Guidance To Authors.

The method of FIG. 17 shows how credit can be allocated for good open-minded postings and credit can be subtracted from individuals making addictive close-minded postings. This method automatically financially encourages the production of postings which would otherwise downed out by close-minded posts which are efficient clickbait in the echo chambers of today's social media. There are many other ways the present invention automatically moderates text, but FIG. 17 shows a method which closely approximates a marketplace for ideas as well as investment incentives for people making postings. The method of FIG. 17 also works with an implied volume based fee associated with postings. While this fee could be like a tiny postage fee for mailing a letter, it could also in other implementations be subsidized by any business with an interest in open-mindedness, such as high quality internet portals hosting the postings, businesses described in the postings, or association promoting ideas described in the postings.

In FIG. 17 step (1) the fees or subsidies associated with postings are passed in as credits to be assessed or allocated among the posters submitting each posting. Since the incoming credits are proportional to the length of each post, FIG. 17 uses a { } notation to identify which bytes of content are associated with specific posters. For instance, {1} denotes the start of text from poster 1, the mom who sprays mace, and {2} denotes the start of text of the person whose gender is mistaken by the mom. Since the boundaries of segmentation of nodes is ordered by subject clustering, nodes frequently will have texts from more than one poster. In some variations of the present invention this could be avoided by segregation of nodes within content from individual posters, to avoid attributing open-mindedness to multiple posters per node, however this simplicity may reduce the accuracy of mapping subjects matter to nodes, as causes in the causal tree of analysis.

In FIG. 17 step (2) credits are allocated across the same node links and indirect node links over which relativist open-mindedness is computed, with special care to allocate according to relative open-mindedness of nodes: nodes with negative open-mindedness become donors of their credits to nodes with positive open-mindedness. Further, when two linked nodes have positive open-mindedness, the credits flow to the less openminded node, in order to reward nodes which are only slightly positive in open-mindedness. This rewards nodes which are valuable bridges to the close minded nodes of the set, which otherwise would be separated by a wide gulf in open-mindedness from highly compensated positive open-mindedness nodes. Another reason for rewarding these edgewalker nodes walking the positive edge bordering negative nodes is that there is risk for successfully walking the positive side without falling into negative territory and losing all credits, since nobody can predict what the other posters will reply with, especially when using subject clustering for segmenting node boundaries. This prevents posters from posting the same high collocation cardinality, low clarity content everywhere, to try to scoop up as many credits as possible, a dumb approach to conversations that would quickly devolve into rewarding empty aphorisms taking over most conversations.

FIG. 18 shows a simple obvious example of credits flowing toward poster {1} because only the Node A posted by her has positive open-mindedness. Since poster {2} only contributed to negative open-mindedness Node C, poster {2} gives up all her credits for her short post to poster {1}. This transfer of credits may be delayed during the conversation, particularly if there is no pause in postings, because as subsequent nodes are added as in FIGS. 23 and 24, the posting of {2} turns towards consistently positive open-mindedness, causing the transfer of credits to turn towards {2} and away from {1}. As a real time moderation feature, the net flows of credits from poster to poster in a conversational thread could be displayed in real time but the actual credit flows could be settled later settled as a delayed 'mark to market' transactional transfer of real credits after a long pause perhaps of a day of time after the thread has gone quiet.

FIGS. 26 and 27 show the node by node accounting which transfers credits in the extended and much more openminded conversational thread which began with the same first three nodes as FIG. 18, and includes the more openminded nodes D and E. Instead of the lopsided transfer of credits only to {1} shown in FIG. 18, credits are more equally shared in FIGS. 26 and 27, although it leans away from {2} because of the negative open-mindedness of {2} in Node C. If {2} had refrained from posting negatively in Node C, then the share of credits would have shifted more towards {2}.

FIG. 28 shows how further shifting towards {2} occurs when {2} continues to post more open-minded nodes which dramatically increase the empathetic tone of the conversational thread. With most nodes now having non-negative open-mindedness, Node G posted by {2} collects the lions share of credits since Node G has the smallest open-mindedness greater than zero. This shifts the share of credits to favor {2} for the empathic edgewalking in the Node G posting: "Sorry I lost my temper. I'm glad you reached out. I was so tied up washing out my eyes and talking to . . . "

Figure 25:
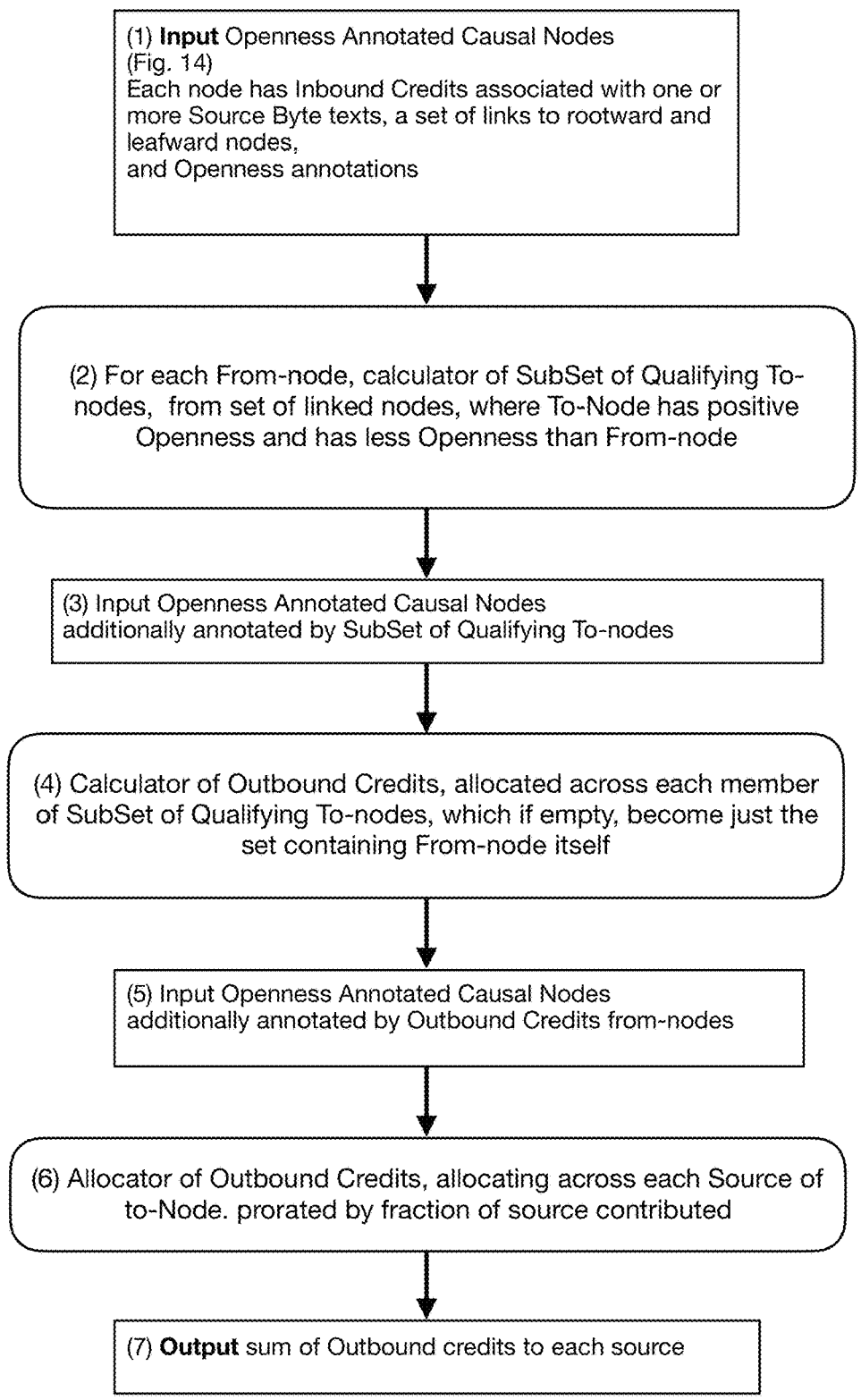
FIG. 25 shows a Relativistic Method Of Allocating Credit To Openminded Sources.

FIG. 25 shows a restated flowchart of the method of FIG. 17, using a set builder notation which some implementors may find easier to read than the narrative notation of FIG. 17.

FIG. 29 shows an example of how automatically and accurately the metric of open-mindedness can use cognitive relativity to moderate a conversational thread of social media. In this thread, four posters each submit just one post each, with a net flow in credits toward the least positive openminded post above zero open-mindedness, in this case, from AOC. The thread itself has a total net positive open-mindedness, so it's a good example of discourse which would be useful to publish to a wide audience. In contrast, FIGS. 15 and 26 show a conversational thread with a net negative open-mindedness, which would be better to keep a private thread only viewable by its participants or closer associates of the participants, until the thread has a chance to turn positive as it does in FIG. 28. In the interim, net negative threads can still allocate credits, so there may be economically fruitful efforts by participants to compete to gain credits as well as ultimate win wider publication of the thread. Unlike the economic Darwinism of prior art social media platforms, the winner of an open-mindedness competition is not determined by advertising dollars, nor suitability for clickbait, nor addictive trolling behaviors, nor popularity of mass delusions. Instead, the metrics of cognitive relativity which support the open-mindedness of the present invention ensure that authoritarian thinking in any form is minimized, even when discussing issues which have not yet been understood by anybody anywhere, since the present invention directly optimizes the cognitive process by which open-minded research is conducted, rather than waiting for some trusted authority to hand over completed research. By forcing conversational threads to directly engage in research, the present invention cuts out the dangerous lag between research consumption and research completion caused by economic Darwinism, by promoting and rewarding open-minded research, so that open-mindedness is a perpetual mental state.

Long ago, pre-internet standards for slow peer review of research were congruent with the high publication costs of information, due to the slow and expensive processes of paper publications. With all digital publications disseminated through smartphones, there are no travel or warehousing expenses for information, so there is no longer any economic reason for completing research before distribution. Instead, facts as they emerge can and should be researched and integrated into useful knowledge in real time. To prevent expenses associated with reading half baked research, the present invention restricts wider publication of authoritarian or confused research until it is upgraded, all the while providing direct economic incentives to make these upgrades.

The automated moderation of consumer goods forums and product and services reviews accumulated via social media is one of the most significant arenas that can be made economically more efficient by the present invention. Rather than allowing unmoderated posts of product reviews, and allowing fraudulent posts to be purchased for less than a dollar each, so that roughly 20% to 30% are fraudulent, the present invention teaches that the competition between vendors' posts defending a product and consumers' posts complaining about products can be arbitrated in real time by allocating credits determined by relativity of open-mindedness. In this case, the credits are fees which are a fraction of the purchase price of the product, so there can a significant economic value to allocating credit flows via open-mindedness criteria.

Figure 32:
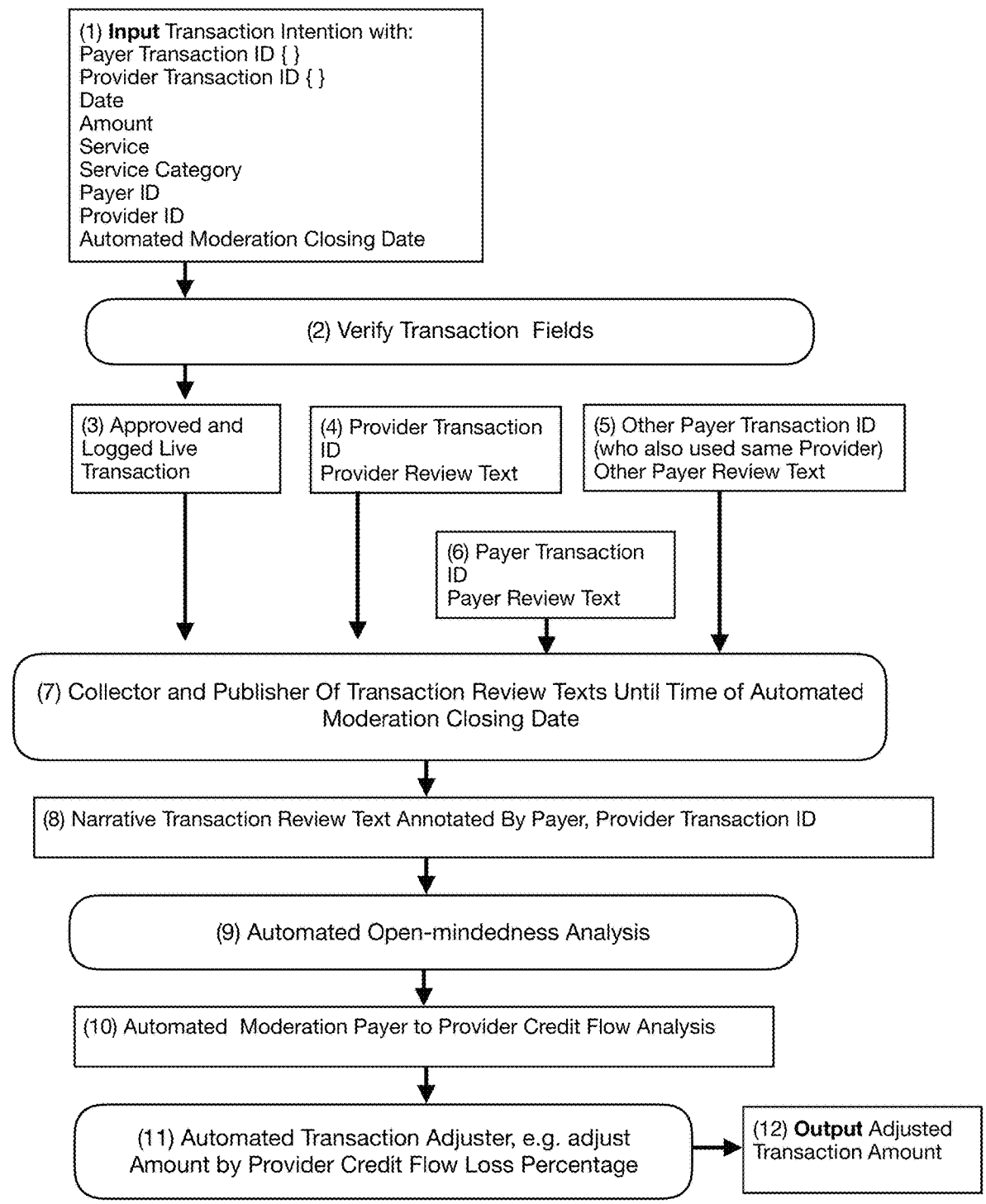
FIG. 32 shows a Method To Verify Transactions With Open-mindedness Criteria.

FIG. 30 shows an example of a dispute between a restaurant manager {2} and a customer {1}, which illustrates how this competition for credits can automatically arbitrate disputes. In this conversational thread, the initial complaint by customer is handled by a well meaning sounding generic response from the restaurant manager, which when pressed, hardens into a dismissive nullification of the kind typical of authoritarian thinking. FIG. 32 shows how this example of discourse can be measured node by node for open-mindedness, to measure which of the posters is being more openminded.

The restaurant manager response has one positive Node (8): "{2}safe distancing. We can certainly understand that not everyone may be happy with this policy, which is why we have signs posted everywhere" however the other nodes posted by the manager are predominantly negative in open-mindedness. In contrast, the customer has a mix of positive and negative nodes, and both the two edgiest the edgewalker positive nodes come from customer{1} such as Node (10): "{1}response from management: Signage on the 20% automatic gratuity was nowhere to be found. Menu ? Table", so most of the incoming credits are transferred to the customer {1} whose responses are more openminded, thus providing more authentically useful information than the manager's responses. The path to truth must always be paved with useful information, so the transfer of credits towards customer is beneficial to readers of restaurant reviews. Although the whole truth does not necessarily emerge in any product reviews, especially if reviews are forgeries, it is much more expensive to forge reviews if truthful details are more quickly produced by honest parties: when deep details are involved, believable fiction is generally harder to generate than believable reality. Consequently a competition to produce deep details will tend to favor the truthful party when the reviews and responses are moderated by the present invention, to reward the more authentic openminded responses.

FIG. 32 shows a method by which moderation of reviews can be fully automated by the present invention, using a fraction of the transaction cash flows to reward transaction parties proportionally to the open-mindedness of their responses. The risk of using open-mindedness to arbitrate the settlement of large transaction outstanding cash amounts is mitigated by the open-endedness of conversational threads, which allow numerous responses to be posted, in which immediate feedback about close minded responses will signal to close minded parties that their close-mindedness is a losing proposition with the context of the automated arbitration system of the present invention.

In FIG. 32 step (1) the credentials of the parties as well as payment amounts are used to bind the parties into the arbitration process of FIG. 32, so that by step (7) the postings from conflicting parties, including authorized representatives of those parties, who may serve as advisors and counsel to this arbitration, are all contributing towards a total reckoning of relative open-mindedness, which sets a final judgement amount proportionally favoring the more open-minded party, in step (11). The final output of FIG. 32 causes actual partial or complete refunds to occur if customers are the more openminded party, or additional charges to customers, such as damages, if the binding in step (1) includes potential liabilities assumed by the customer, such as liabilities for damages to rented cars, for car rental contracts, or similar business to consumer contracts.

The automated arbitration of FIG. 32 is not intended to replace civil rights or other larger legal rights in society, since there may be inequities which cannot be cured by the limited number of participants available in a conversational thread closed by step (7). To cure larger inequities of the economy, the leaderboard and bounty methods of the present invention identify and fund the curing of major social problems. These major problems may also be cured in court systems since the use of FIG. 32 for arbitration does require the surrendering of all rights: for instance, the right to participate in class action suits can be explicitly retained as a deterrent against repeated abuses of the system of FIG. 32, for instance by hiring companies to produce fraudulent reviews so numerous that they overwhelm the ability of injured parties to respond. The method of FIG. 32 regardless can automate most arbitration between parties who operate in good faith but may not fully understand the other parties' viewpoint: the party that is more diligent about understanding the whole situation will be automatically and properly compensated in such cases, and their contribution to that knowledge can be reposted for others to see, and become informed.

To reduce the likelihood of fake reviews, the window of time allowed for posting reviews can be limited to an interval of a few hours or days from the closing of an economic transaction, with permission for follow-up reviews granted subject to checking for citation of changes in circumstances since the original review (not shown).

FIG. 33 shows the restaurant bill of the dispute from FIG. 30 automatically adjusted by the method of FIG. 32. Since the balance of open-mindedness leans towards the customer but the manager also posted some open-mindedness, the bill is partly but not totally reduced.

As noted above, the remedies of adjusting bills and damages amount between contractually bound parties cannot be expected to cure larger problems such as racism, ignorance and war. For that, mappings from individual mistakes must connect to problems at detailed levels across larger patterns that cry out for rectification, bending the arc of history automatically and speedily towards justice. For this, the leaderboard methods of the present invention use methods to detect both desirable and undesirable outlier causal details, to bring to bear community resources to expand the prevalence of the desirable and to reduce the presence of undesirable causal effects.

Figure 34:
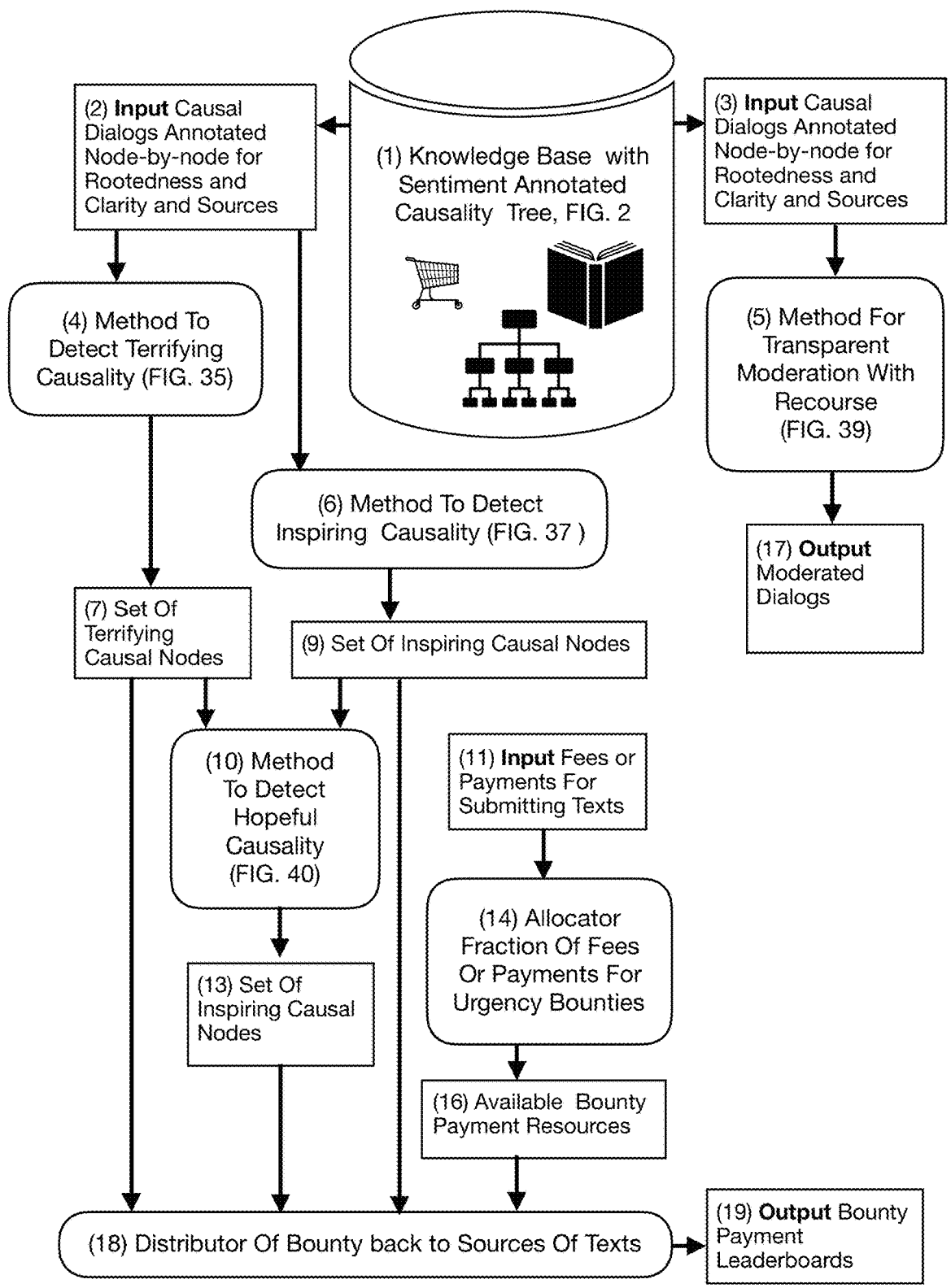
FIG. 34 shows a Method To Generate Urgency Leaderboards.
Figure 39:
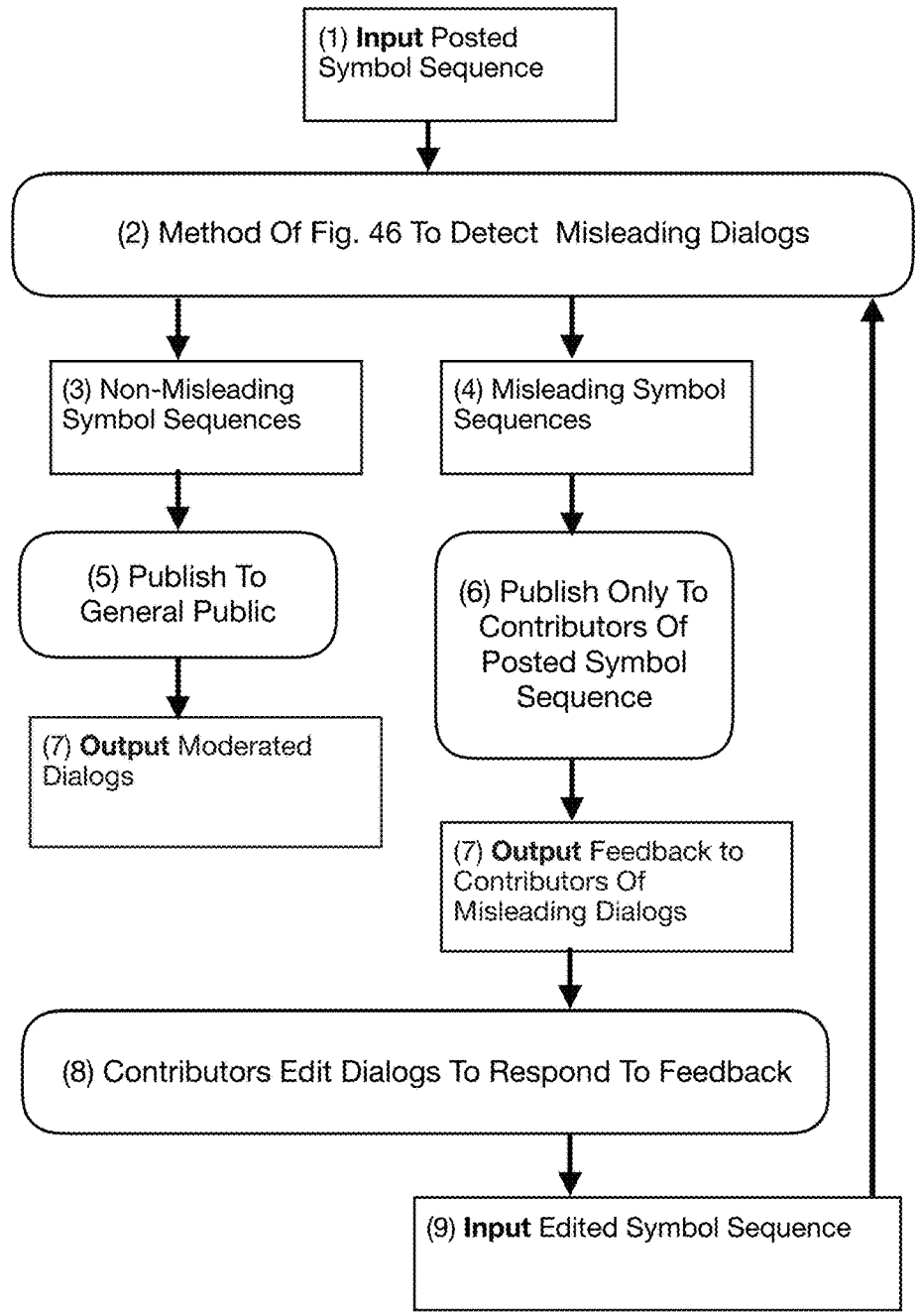
FIG. 39 shows a Method For Transparent Moderation With Recourse.

To automate these leaderboard methods, FIG. 34 calls detector methods of FIGS. 35, 37, 39, and 40, whose outputs drive actions of social media moderation in step (5) which calls the method of FIG. 39, to automatically make close-minded postings less easily seen, by making them only visible to participants who have wrote them, replied to them, or searched for them.

In step (18) and (19) bounties can be set, to both encourage solutions to particularly egregious problems, or to extend particularly inspiring causal patterns, which are funded by steps (14) and (16), as a small fractions of cash flows which fund the overall system.

Figure 35:
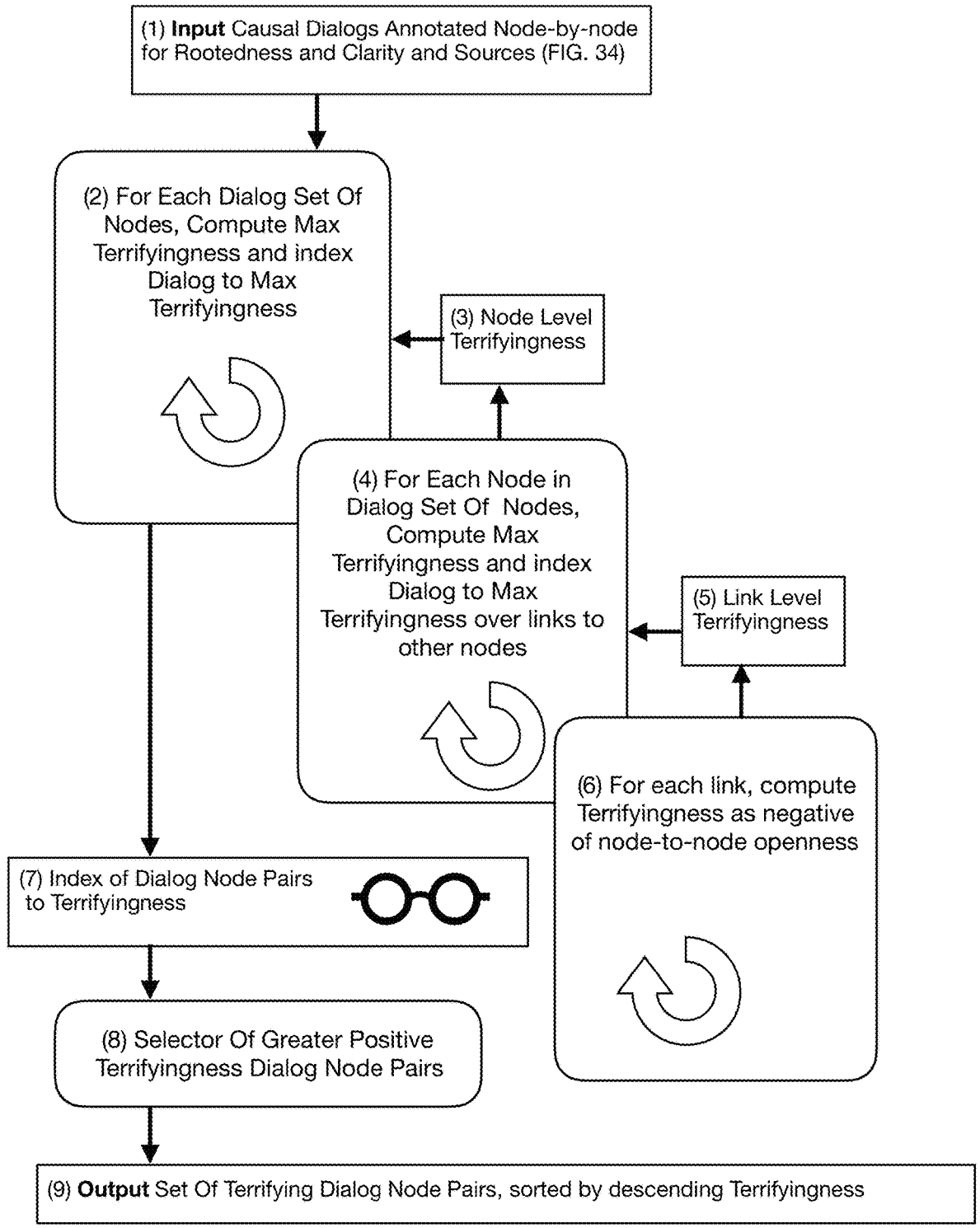
FIG. 35 shows a Method To Detect Terrifying Causality.

Step (18) rewards inspiring postings (or people who posted them directly, as well as rewards people who pose openminded solutions to problems identified by the method of FIG. 35.

The method of FIG. 35 produces an index of linked node to node pairs from dialogs, or conversational threads, in which the relationship between the most close-minded nodes, which have the most negative open-mindedness. FIG. 36 shows an example of the most closed minded node pairs from the conversational thread from FIG. 15. In this, it is the close mindedness on the relationship between Node A and B, as well as between Node B and C, that is most egregious, and most needs a cure. The urgency of the cure can be exposed by the leaderboards of the present invention. the leaderboards can also exhibit any new nodes of the conversational thread which come closest to curing the close-mindedness.

FIG. 36 shows an example of how two pairs of terrifyingness nodes are selected from the example of a three node closed-minded conversational thread in FIGS. 15 and 16. In this example, step (4) of FIG. 35 has identified two pairs of nodes which have the leafward node clarity lower than the rootward node of the pair, so that negative open-mindedness is computed. The degree of terrifyingness is the absolute value of the negative open-mindedness, so that the pair of nodes (A,B) have terrifyingness 6.3125 and the pair of nodes (C,B) have terrifyingness 15. These pairs of nodes could then be reported on a leaderboard sorted by descending terrifyingness, such as FIG. 1 (13) and possibly with bounty posted as in FIG. 34 step (16).

Figure 37:
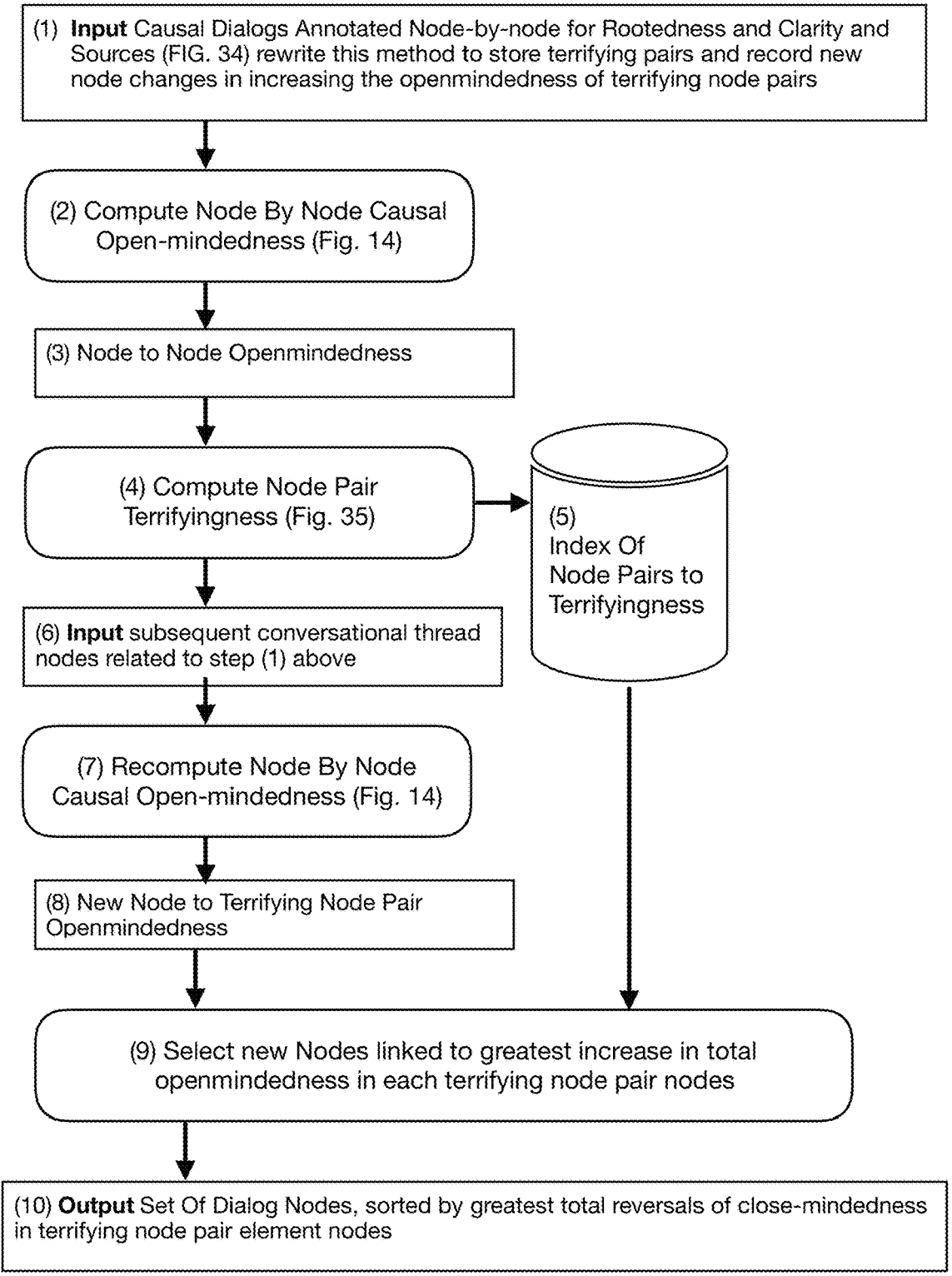
FIG. 37 shows a Method To Detect Inspiring Causality.

Since it's so important to encourage the curing of close-mindedness, the method of FIG. 37 selects nodes which have transformed closed-minded conversational threads via recontextualization into openminded threads, by increasing the overall net open-mindedness of previously net close-minded nodes. Using the method of FIG. 35 to identify the need for a cure, as terrifying node pairs, the method of FIG. 37 can then identify new nodes which may cure the terrifying node pairs.

The example FIG. 19 shows how the addictive conversation of FIG. 16 can be less addictively rude, and also show large shift toward open-mindedness which the method of FIG. 37 seeks. Using the method of FIG. 37 to compute the shifts in open-mindedness of problematic terrifyingness nodes, the new Node D fails to cure anything and actually worsens things by decreasing open-mindedness. However, the new node E greatly increases open-mindedness of Nodes A, B and C, simply by being authentically honest:
"{2} The acids get ground into my eyeballs. {1} You deserve every minute of that agony, you dangerous creep."

This shift toward open-mindedness is just a small step: to see an example of a full cure it can lead to, see in FIG. 24 the really positive open-mindedness of every node except Node C, after the recontextualizing from new nodes G through K have significantly shifted the relative meaning of prior nodes, so that they link by overall openminded relationships via the new nodes G through K. This kind of really large shift towards open-mindedness is what the present invention encourages with leaderboards and bounties for recontextualizing close-mindedness. In leaderboards of the present invention, new nodes G through K would be highly visible in leaderboards and rewarded by bounties.

While the method of FIG. 37 is excellent for promoting nodes within the same conversational thread, usefully combining nodes from different threads to amplify open-mindedness requires more search engine indexing than the indexing required in FIG. 14 which is a sub-method of FIG. 37. By automatically combining nodes from different threads, the present invention extends the utility of open-mindedness from single thread to the broader set of multiple threads.

In FIG. 14, it is accurate to link nodes based on the clarity method of FIG. 6, but this takes advantage of implicit connectivity between nodes by virtue of being the in the same thread. For nodes originally in disparate threads, the method of FIG. 56 must also be used to select candidate node links, to link only nodes which describe the same subject matter.

Figure 40:
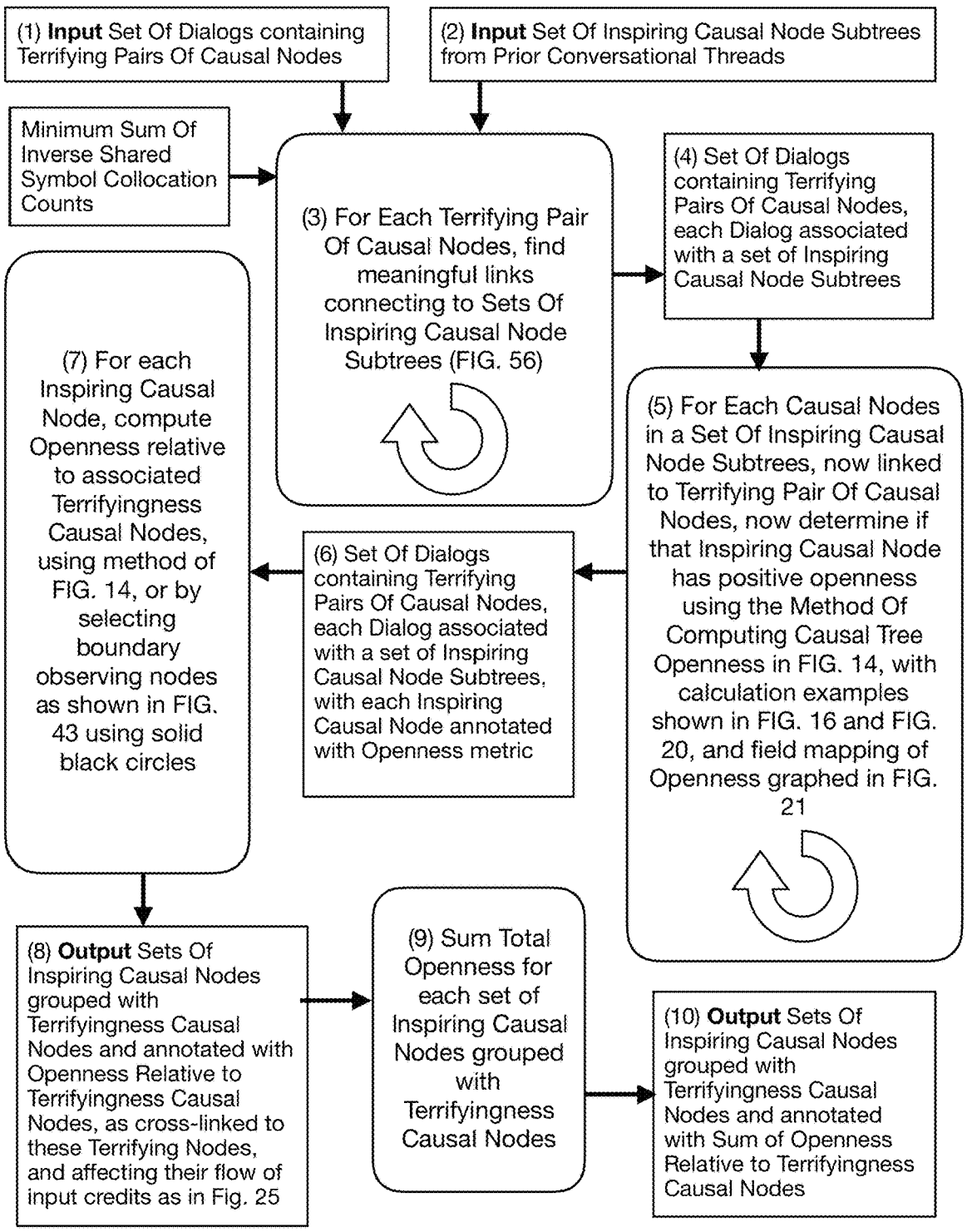
FIG. 40 shows a Method To Detect Cross-Posting Open-Mindedness.

To combine nodes from different threads to amplify open-mindedness, FIG. 40 shows how the present invention uses an index to shared meaningful symbols in step (3), using the method of FIG. 56 to filter links between nodes based on minimal Sum of inverse collocation counts, to increase the likelihood that two nodes from different threads are conversing about same topic. Since so many nodes may in fact be conversing about the same topic, FIG. 40 step (5) efficiently winnows the candidates for combined open-mindedness, using metrics of cognitive relativity which restrict candidate node combinations to pairs of nodes where the node with higher rootedness (in terms of average greater collocation count of its symbols) is also the node with lower clarity (in terms of sentiment clarity, grammatically clarity or other metric of clarity).

Figure 42:
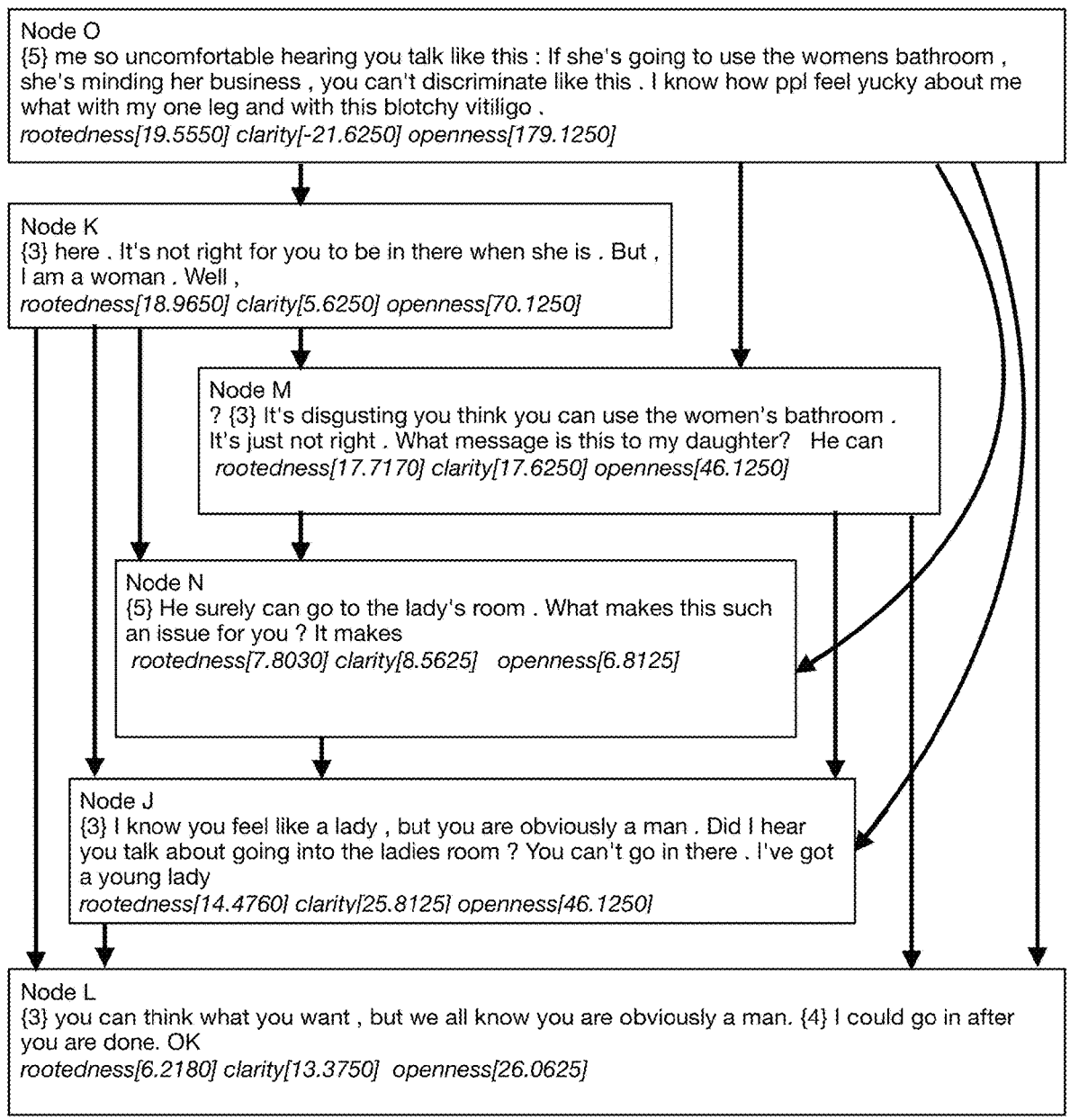
FIG. 42 shows an Example Of Independent Postings Analysis.

As an example of a different thread conversing about the same topics as sources {1} and {2} of FIG. 16, FIG. 41 shows postings submitted by sources {3}, {4} and {5}. FIG. 42 shows the results of cognitive relativity analysis of FIG. 41 postings, using the method of FIG. 14. Since the nodes J, K, M, N, O all have positive open-mindedness within their own conversational thread context, and they converse about the many of same topics as FIG. 16, it's beneficial to see if any of the nodes of FIG. 42 could increase the open-mindedness of nodes of FIG. 16. One way to quickly winnow nodes of FIG. 42 to pick out nodes which may be beneficial to FIG. 16 is to check on the results of the method of FIG. 25 analysis shown in FIG. 43, where Node O has the highest openness of 179.125.

Figure 44:
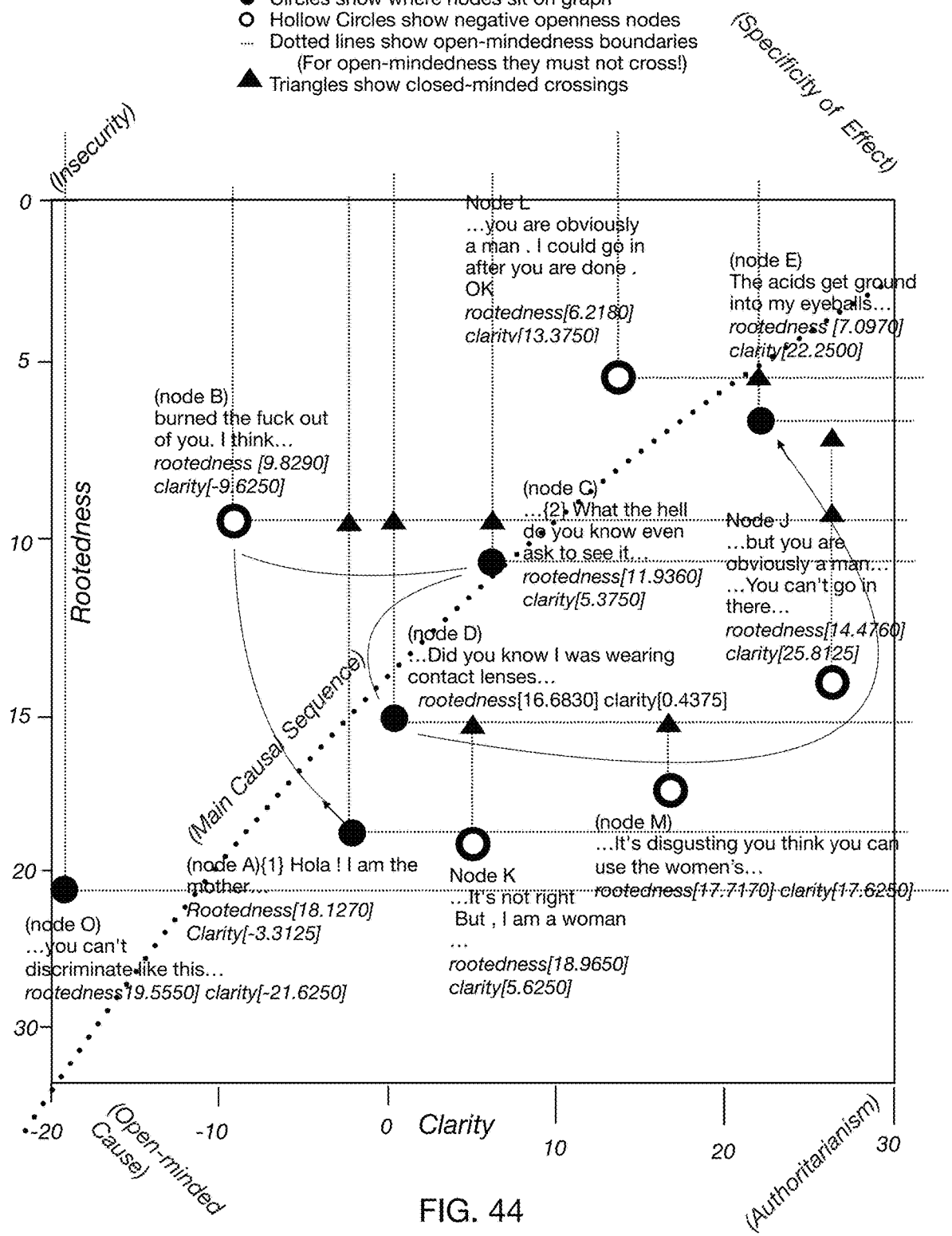
FIG. 44 shows a Cross Postings Open-mindedness Cognitive Relativity Graph.

Another way to pick out nodes which may be beneficial to FIG. 16 is to compute an indexed analysis of nodes with higher rootedness and lower clarity. FIG. 44 shows a graph of these cognitive relativity relationships for FIG. 16 and FIG. 42 nodes, with Rootedness plotted on the vertical axis and Clarity plotted on the horizontal axis. Since computing the relative rootedness and Clarity for the cartesian product of itself of any large set of nodes of cardinality N will need N-squared comparisons, for N in the billions (for instance all the nodes generated in the last year on a social media platform), a billion-billion comparisons would be needed, which is computationally very expensive. Looking at the graph of FIG. 44, it's easy to see that the nodes most violating the requirement of higher rootedness and lower Clarity involve the least number of triangular intersection points with other nodes (close-minded crossings) and that the nodes along the "main sequence" nearest the most common rootedness to Clarity ratio of the population are also the nodes least likely to involve triangular crossing points. This "main sequence" can be computed as a linear approximation (or any lower order algebraic approximation) to the population of nodes, and then nodes with minimal distance to the "main sequence" can be selected as candidates for computing the relative rootedness and Clarity, to quality pairs of nodes as candidates for cross-thread linking for open-mindedness. Although this winnowing is not shown, it's an almost identical process to the winnowing described by the filtering method of FIG. 48 and the FIG. 48's example graphed in FIG. 50 for pairing and linking of symbols for automated dictionary construction in the method FIG. 54.

In the present invention, just as its automated dictionary construction benefits from the efficiency of winnowing links between symbols, the automated causal tree construction of open-minded cross-thread causal knowledge benefits from the efficiency of winnowing links between all causal nodes.

FIG. 44 graphs an example of detailed calculations of relative rootedness and clarity for many nodes which can be skipped by the winnowing process of computing the distance to the main sequence dimensionality reduction of the population of nodes, For instance, as graphed in coordinates of rootedness and clarity, Node B is farthest from the "main sequence" in FIG. 44, so the candidacy of Node B can be curtailed so none of the five calculations involving Node B in FIG. 45 need to be performed, as part of any full node-to-node cartesian analysis.

Returning to the leaderboard method of FIG. 34, in its step (5) moderates dialogs or conversational threads via the method of FIG. 39 which is important to distinguish from prior art moderation criteria. Transparency, fairness and recourse for people who are moderated are all necessary to avoid prior art drawbacks to moderation. The method of FIG. 39 provides immediate transparency since the reasons for accepting or suppressing wider publication of postings can be reported by the method of detecting misleading dialogs in FIG. 46 on a node by node basis in a few seconds after a posting is made. Thus, guidance to authors can be given on a node level with instructions to rewrite to make sequences of symbols less authoritarian or less insecure, depending on which side of the "main sequence" the node strays, as calculated in FIGS. 26 and 27, and graphed in FIG. 44: authoritarian nodes are flawed by excessive clarity whereas insecure nodes are flawed by insufficient clarity.

This guidance can be automatically generated and presented in the very same window used to compose postings, so authors can edit and resubmit postings in real time to quickly get their postings approved. Since no phrases are banned, nor topics suppressed by the method of FIG. 39, authors have real freedom of speech, as long as they abide by open-mindedness and thus neither waste goodwill with authoritarianism nor waste bandwidth and patience of readers with writer's insecurities. In FIG. 39 steps (6,7,8) not only authors but groups of contributors can receive this immediate guidance, so the effort of overcoming of publication objections can be a group participatory effort, in which authors can be supported by their local community of collaborators.

Figure 46:
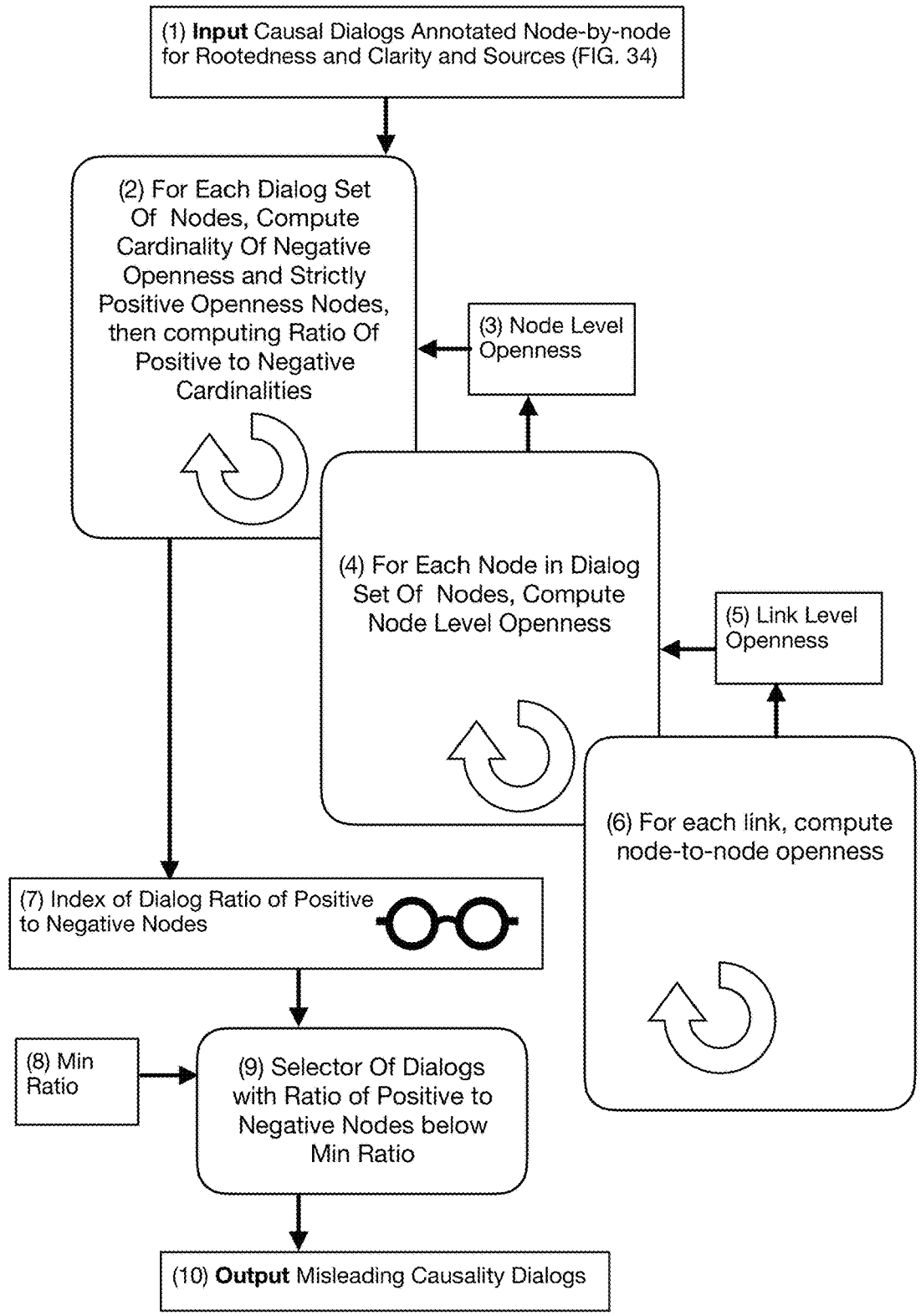
FIG. 46 shows a Method To Detect Misleading Causality Dialogs.

Although the examples given for methods of FIGS. 39 and 46 are short Twitter sized postings, the same methods of the present invention are equally useful for automated publishing and automated quality control of longer sequences of symbols, such as magazine articles, blog posts, and even textbooks and novels. For some longer works, chapters may individually be processed as independent threads, and cross-thread open-mindedness methods such as FIG. 40 may be used to calculate overall open-mindedness of the longer work.

When sequences of symbols are music or graphic arts, the automated publication and quality control methods of the present invention are also useful for publishing music and films: the problem of reading film scripts and drafts of novels has swamped the capacity of script readers and editors, ever since expanded literacy and access to production gear has made more and more people into context producers.

Figure 7:
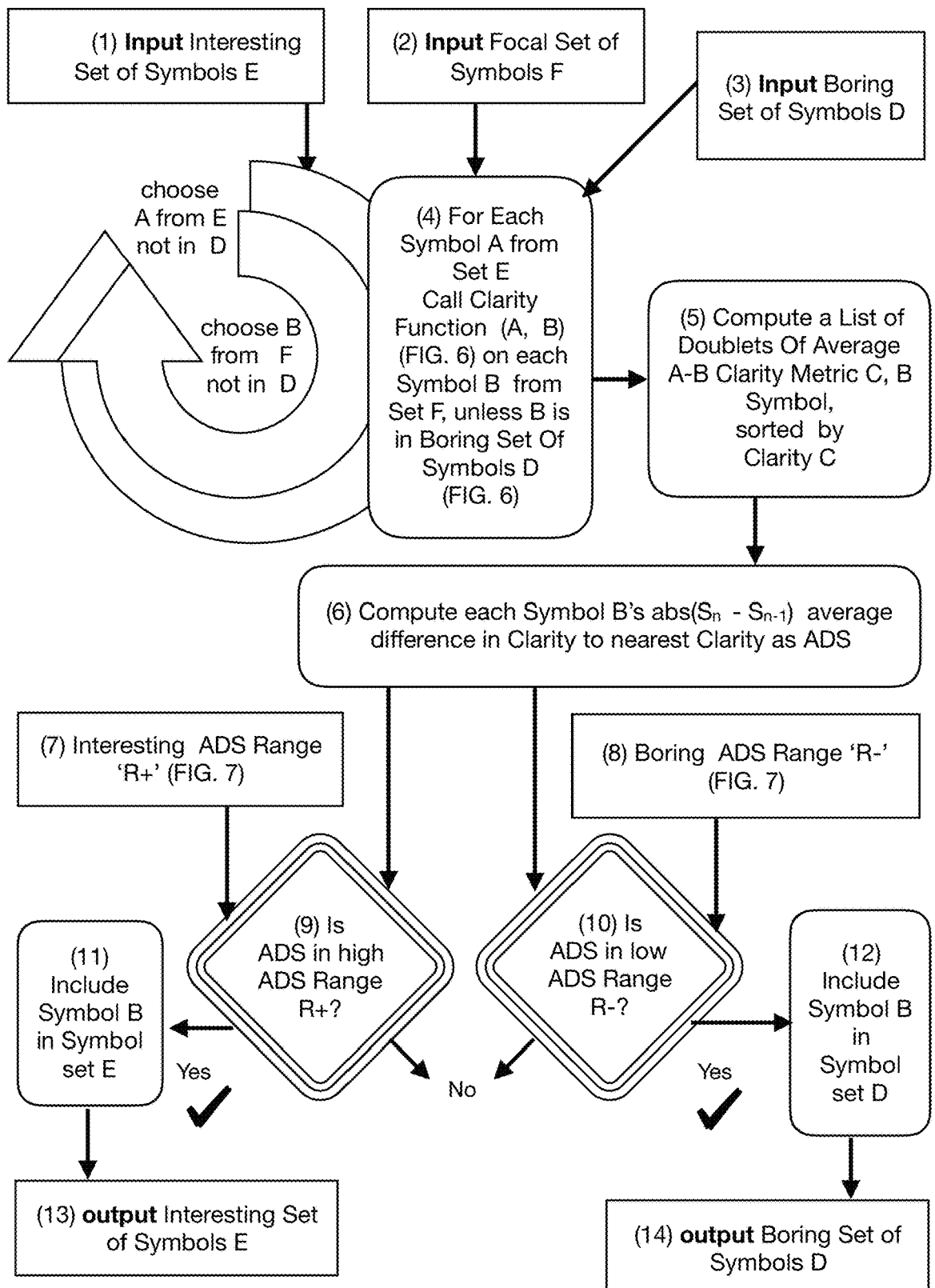
FIG. 7 shows an Interesting Evidence Filter Method.

Further recognizing the importance of entertainment to the goal of securing people's attention, the present invention includes an "interesting evidence filter" in FIG. 7 to enable leaderboards to elevate content which is more interesting, and thus acquire more viewers. In the present invention, Interestingness is another metric based on cognitive relativity, which is orthogonal to dimensions of open-mindedness: interestingness has no fundamental correlation to open mindedness, so it can be used to spice up leaderboards with no loss of open-mindedness.

FIG. 7 makes use of these underlying natural conditions: the large scale repetition of symbol collocations in popular postings publications creates a mental convergence of those symbols in the human mind, corresponding to tightly clustered collocation clarity metrics as computed by the method of FIG. 6. When mapped on a one-dimensional continuum, these tight clusters are evidence of overused knowledge and hackneyed traditional story narratives. On the other hand, the symbols along the sparser regions of this continuum are the interesting outliers. To separate overused symbols from interesting symbols, the distance between the clarity metrics attributed for each symbol, relative to a focal set of symbols determines the interestingness of a symbol relative to a focal set.

FIG. 8 gives examples of categories of interestingness in terms of ranges of distance between clarity metrics. These categories rate interestingness, but not correctness, accuracy or other measures of knowledge convergence, since interestingness is far more a measure of divergent thinking than convergent thinking.

FIG. 9 shows a specific example of spelling symbols linked by collocation to the symbol "Kwajalein Atoll" in a symbol collocation knowledge base automatically generated from Wikipedia articles. In this example, the outlier symbols are Kwajalein Atoll itself, SpaceX, and hydroxylammonium, which are categorized into the Interesting Symbol Set E. On the other end of the scale, Boring symbols such as "the launch was" and rocket launch competitors to Kwajalein Atoll of Soyuz and Vandenberg are listed.

Figure 10:
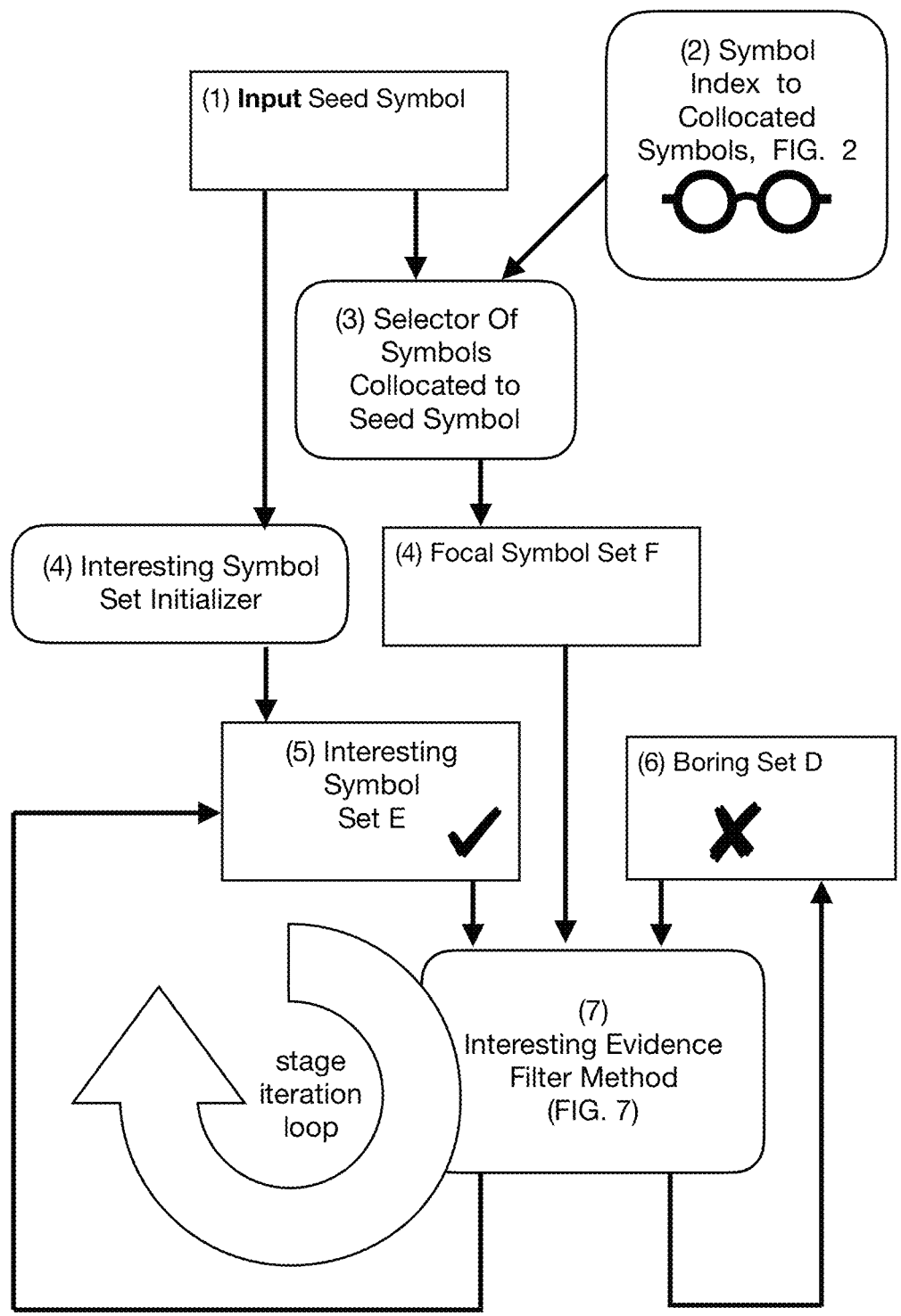
FIG. 10 shows a Staged Interesting Evidence Filter Method.

To identify interesting symbols even more accurately, FIG. 10 shows a multi-stage version of the method of FIG. 7. At each stage, the most interesting symbols output by FIG. 7 are accumulated in the focal set, thus creating a new, more interesting focal set augmented by (5) Interesting Symbol Set E to drive FIG. 7 to find even more interesting symbols.

FIG. 11 shows an example of two-stage output of interesting symbols. The first stage produces the interesting symbol of SpaceX, which added to the set of focal symbols consisting of the single seed symbol "Kwajalein Atoll" are input to FIG. 7 to produce a new Interesting Symbol Set E consisting of Kwajalein Atoll, Spacex, Elon, and "several times" which alludes to the many times SpaceX failed to launch before eventually succeeding in the world's first private rocket launch to low earth orbit. By using the multistage approach to measuring interestingness, content for leaderboards in the present invention can be automatically selected for greater interestingness, so users looking for news and interesting stories can more easily click on them. Thus the novel interestingness metric enables the present invention to compete more effectively with existing social media monopolies.

Considering that success of the present invention depends upon its ability to compete with Facebook, Google, Twitter and similarly large monopolies, the many variations of computational cognitive relativity taught in the present invention are all necessary for success. Major acquisitions such as Android, Applied Semantics, Youtube, DoubleClick, Waze, ITA Software, Android, WhatsApp, Instagram, AdGrok, Vine, TellApart by these social media monopolies has show the strength of combining many disparate attention gathering portals into a single business model, to increase the overall time spent looking at ads they serve.

Beyond the synergistic effect of diverge attention gathering methods, the present invention makes use of the synergistic effect of trust, and of investment. Linking all these synergies are the trusted transparent methods based on the novel metric of open-mindedness, particularly the allocation of credits to openminded sources. FIGS. 14 and 25 transparently enable people to trust the fairness the system, at least to the point of hoping it is better to work with the system rather than apart from it. It is these fair allocation of credits which makes the FIG. 60 method of handling investments so powerful in the present invention, since the standard fee allocation which covers the moderation and indexing costs of posting content becomes a baseline for the calculation of investments into postings. As the method of FIG. 25 allocates baseline costs, some sources will receive more and some less of the inbound credits allocated as part of the rewards system of the present invention.

These beneficial rewards associated with inbound credits can be easily multiplied, without forcing all contributors to pay the increase. Instead, contributors who wish to invest additional sums of cash into their own postings can submit a multiple of the standard fee as additional investment. When doing so, the gains and losses associated with standard fee, as examples shown in FIGS. 26 and 27 are baselines for calculating percentage gains and losses of the additional investment. Thus the FIG. 27 contributor {1} "winner" has a gain of 86.16 credits over input of 379 credits, and also has a (100 times (86.16 divided by 379) percent gain of 22.73%. If that contributor had doubled their standard input to 758, the extra 379 credits would also show a gain in value of 22.73%. Similarly, if the contributor {2} "loser" had contributed extra investment along with their "losing" posting, they would suffer a loss of the same percentage that their losing post lost of its posting input credits.

This ability to wager on one's open-mindedness is a benevolent competition, which over many conversational threads will lead to a more civil and productive discourse, bending the arc of history towards justice, through the power of automatically moderated conversations. Further, the mind opening method of cross-posting open-mindedness of FIG. 40 enables rewarding of open-minded postings though redeploying them in subsequent independent conversational threads to improve future threads.

Thus a well-written submission can in the future reap rewards from many subsequent threads, so long as the well-written submission open-mindedly improves threads dealing with the same issues. By default, once the original submission's input credits are exhausted, no investment basis is at risk, so no further rewards can be earned by the posting. However, if the contributor invests additional cash into the old posting, that additional cash is at risk, so subsequent links automatically created by the method of FIG. 40 can increase or decrease that invested cash, depending on how the old posting relates to new nodes, through cognitive relativity open-mindedness.

For nodes which the contributor has great faith in, a reserve can be arranged to resupply additional reinvestments in the node, each of a size identical to the original standard input credits. In some implementations, the reserve could be replenished by earnings from the system allocated to the contributor, so the time horizon over which gains in investment from a single node are possibly unlimited so long as that node continues to be more edgily open-minded than all most other new nodes it is linked to.

Figure 60:
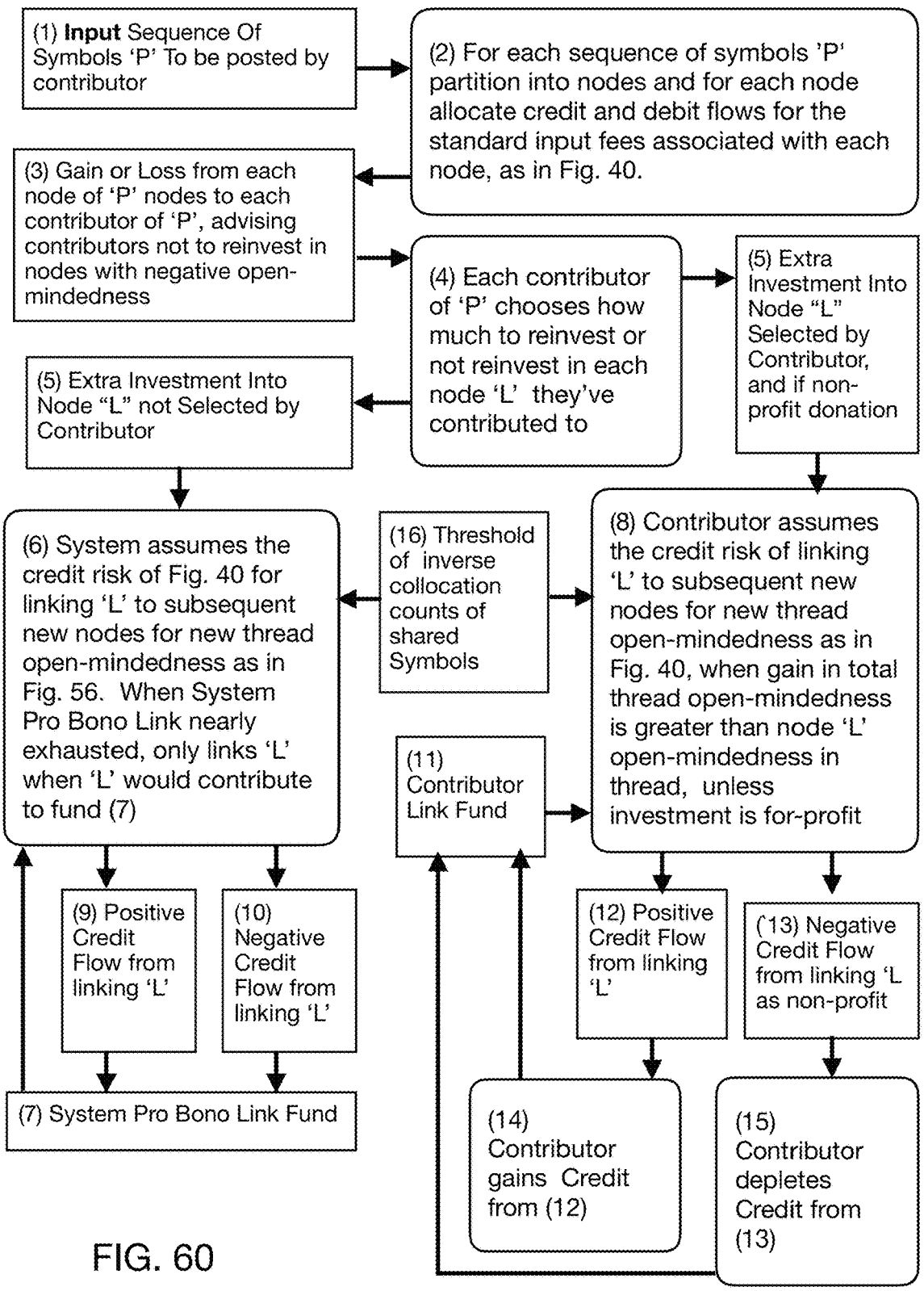
FIG. 60 shows a Method Of Handlings Extra Investments Into Postings.

The method of FIG. 60 details the steps of this investment method. In step (1), the input sequence of Symbols 'P' is posted, with annotations indicating which Symbols are from which posting contributor, with the standard per-byte fees paid for posting. This input (1) is passed to the method of FIG. 40 in step (2) to subdivide 'P' into nodes and allocate credit and debit flows of input fees to each node, and then allocate each node's credit and debit flow on a pro-rata basis to each contributor of that node. At that point, feedback is given to each contributor as to whether it's likely that further investment into nodes is advisable, based on the open-mindedness of the node as computed in FIG. 40: nodes with negative open-mindedness are not likely to gain any credit flows when combined with future threads' conversational nodes, because negative nodes are likely to be far from the "main sequence" of rootedness in relationship to clarity of most nodes, as shown in the graph of FIG. 44.

Regardless of advice, in step (4) of FIG. 60, each contributor is allowed to choose whether to reinvest in particular nodes 'L' which they contributed to, where each node 'L' is a based on a subsequence of Symbols from the partition of 'P'.

Should a contributor choose to reinvest more than the standard per-byte fee amount associated with their portion of 'L', the surplus will be held in reserve to be applied to subsequent cross-thread linkages, so each multiple of the standard fee amount pays for 'L' to be resubmitted multiple times to future conversational threads which are meaningfully close enough to form node-to-node causal links using criteria as described in the method of FIG. 56 step (11), where a threshold value for linking is compared to the inverse of collocation counts for each matched Symbol shared by link candidate nodes. In FIG. 60 this threshold is shown as step (16) to determined which new nodes link to 'L', using fee submissions from System Pro Bono Link Fund (7) or linking nodes invested by contributor Link Fund (11) as designated by contributor in step (5).

Investments designated by contributor in step (5) can be designated as 'for-profit' or 'non-profit'. In the case of 'non-profit' the contributor believes enough in the open-mindedness benefit of the message of node 'L' that the contributor is willing to donate the invested money towards placing that message in future conversational threads, to boost the total open-mindedness of those threads, even when the net credit flow to the node 'L' is negative, thus depleting the Contributor Fund step (11) which funds the investment for the contributor for the node 'L' in the amount of standard input fee. In cases where neither the total open-mindedness increase nor the net credit flow to 'L' is positive, the link to 'L' would not be made, since there is no open-mindedness benefit to individual contributor nor to the communal thread of conversation. Thus, in place of prior art advertising spending, the investments made by contributors as 'non-profit' can help spread the message in a node 'L', but that spread is constrained by the requirement of relativistic open-mindednesss, so that close-minded or insecure or authoritarian messages cannot spread, no matter how much is spend to spread them.

Just as Google AdSense enabled tightly targeted ads to be sold on a per-impressions basis, so small specialty items could afford to advertise for the first time, by avoiding showing the ads to people who had no interest in them, the present invention even more tightly targets 'non-profit' messaging, by using the polysemous meaning filter of FIG. 56 to ensure that node 'L' is a topic of the thread, and further tightening the targeting by using the method of calculating cross-posting net total gain in open-mindedness as in FIG. 40 to ensure that node 'L' is beneficial for the open-mindedness of the thread, before allowing it to link to the thread. In doing so, the authoritarian, bullying ad campaigns funded by ad agencies to create fear of missing out are blocked and filtered out, and even well meaning ads which are too pollyanna to speak directly to the issues of a thread are discouraged by assigning them high placement costs, as shown later in the example of FIG. 62.

The contribution option of 'for-profit' investments, in FIG. 60 step (5) and (8) enables a more timid approach to investing in ideas, since only links where both the conversational thread total open-mindedness and net credit flow to 'L' are positive, so the value of step (11) Contributor Link Fund will either rise or stay level. At any time, the contributor has the option to unilaterally withdraw funds from the Link Fund (11), so investments can be unwound at any time with ease, unlike the unwinding of securities which must be sold to a third party at a negotiated price. Thus over time, investments into pure ideas through the present investment can be both safer and more convenient than investments into currencies, stock, bonds, crypto-currency or commodities. A contributor can thus invest in an idea, using their own words or pictures, sounds or symbols of their own choosing, and reap the rewards of open-minded placement in future conversational threads, no matter how far in the future. Also, they can unwind that investment at any time, with no downside risks since the funds can be held in step (11) of FIG. 60, free of holding fees, until they can by profitably linked in future threads.

The System administered branch of FIG. 60 step (6) enables the System to increase the quality of conversational threads system-wide, by funding the linkage of node 'L' type nodes wherever they most increase the open-mindedness of new conversational thread nodes. Some of these new links will result in credit flows towards 'L' and some will result in credit flows away from 'L', so the positive flows can be directed into the System Pro Bono Fund in step (7), while the negative flows can deduct credits from the same Fund (7). To keep the System Fund (7) solvent, the System can automatically avoid linking that would result in negative flows, until positive flows have again replenished the Fund (7).

Figure 61:
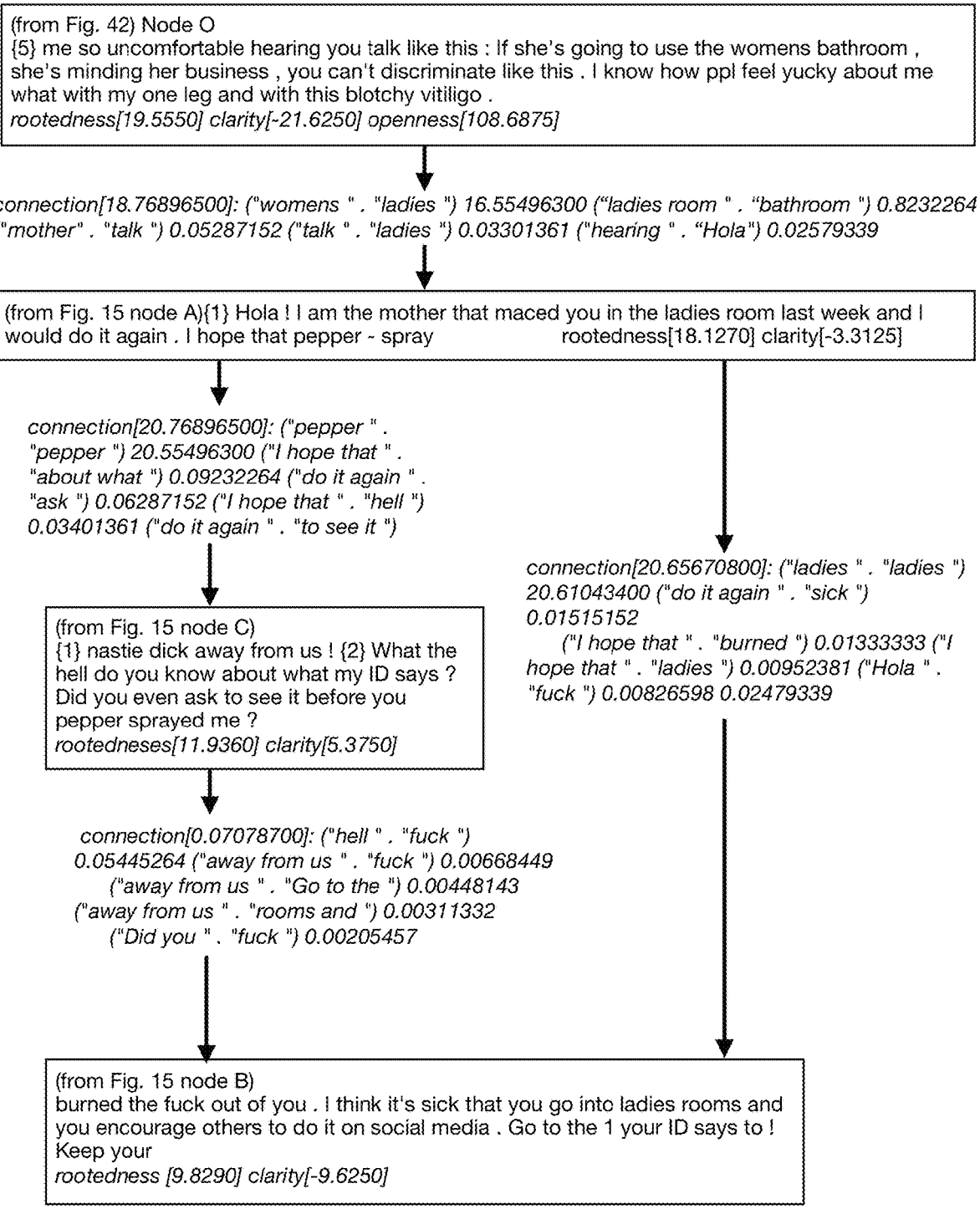
FIG. 61 shows an Example Of Rewarding Extra Investments Into Postings.
Figure 64:
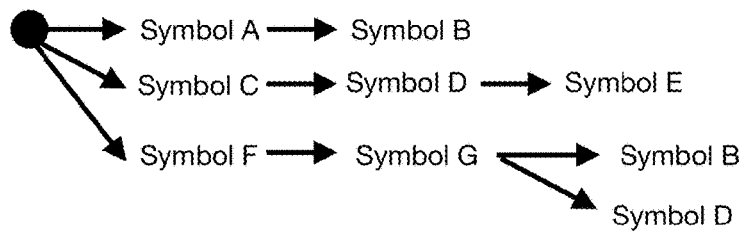
FIG. 64 shows Examples Of Dictionary Causal Tree Metrics.
Figure 67:
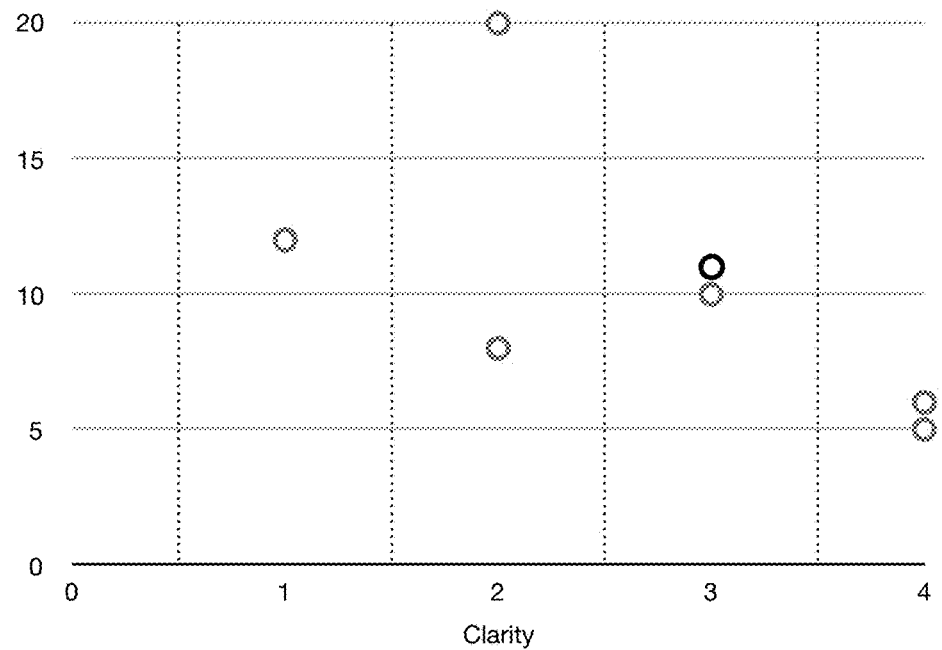
FIG. 67 shows an Examples Of Narrative Causal Midline Metrics.

FIG. 61 shows an example of the Node O from FIG. 42 after linking to the conversational thread of FIG. 15. Since the rootedness of Node O is higher than all the nodes of FIG. 15, and the clarity of node O is significantly lower than all the nodes of FIG. 15, Node O sits in open-minded good relationship to all the nodes of FIG. 15, in terms of cognitive relativity as taught by the present invention: the relationship between Node O and every node of FIG. 15 is open-minded, and this dramatically shifts the total open-mindedness of the thread from −18.9375 to a strongly positive 346.25. In terms of automated moderation and publishing, the presence of Node O reshapes the driving context of FIG. 15 into a context of higher altruistic principles.

FIG. 61 shows an example of the Node O from FIG. 42 after linking to the conversational thread of FIG. 15. Since the rootedness of Node O is higher than all the nodes of FIG. 15, and the clarity of node O is significantly lower than all the nodes of FIG. 15, Node O sits in open-minded good relationship to all the nodes of FIG. 15, in terms of cognitive relativity as taught by the present invention: the relationship between Node O and every node of FIG. 15 is open-minded, and this dramatically shifts the total open-mindedness of the thread from −18.9375 to a strongly positive 346.25. In terms of automated moderation and publishing, the presence of Node O reshapes the driving context of FIG. 15 into a context of higher altruistic principles.

If Node O were funded by the System in step (6) FIG. 60, this deficit would be funded by step (7) Pro Bono Fund, and justified by the greater size of openness gain over the whole conversation, compared to the deficit for Node O. If Node O were funded by Contributor as 'non-profit' in step (5) FIG. 60, this deficit would be covered by step (11) Contributor Link Fund. On the other hand, if Node O were funded by Contributor as 'for-profit' the link between Node O and FIG. 15 nodes would not be made, since it would be a link causing a withdrawal from Contributor Fund step (11).

FIG. 62 shows a slightly different outcome from FIG. 61, in which a slightly different version of Node O gets a positive credit flow from linking to FIG. 15 nodes. By slightly changing the text of Node O, to raise its clarity to −8.4375, but also lowering its rootedness to 3.2700, Node O shifts to the "main sequence" of nodes from FIG. 15, but also has less of a commanding position for reframing the context of FIG. 15 around high altruistic principles. In this lower position, Node O still increases the total open-mindedness of FIG. 15 from −18.9375 to −5.5000 for a lesser net gain of around 13, but at the same time, credit flows to Node O are strongly positive since its openness among FIG. 15 nodes is only 8.5625, so it gets most of the credit from the FIG. 15 nodes. This version of Node O, which differs only by the omission of the word 'blotchy' from the text, is thus a way to improve the conversational thread of FIG. 15 without deficit funding, indeed actually generating investment returns for either the System or Contributor.

The one word the difference between the FIG. 62 version of Node O and the FIG. 63 version of Node O begs the question of how to automatically publish moderated edits of Node O by automatically changing the text of O from the FIG. 62 version to the 63 version. The omission of the word blotchy is within fair use, with the ellipsis, of being a fair use quote of the original version of Node O. An automated system could simply try, via trial and error, various shortened fair use versions of the original text, until one with the desired beneficial thread total openness increase is found which also has positive or at least less negative credit flow.

Further, the question of the materiality of the Clarity difference between the FIG. 62 and FIG. 63 versions is also important, since only a single word was dropped and the metric of Clarity increased dramatically. In both FIGS. 62 and 63 the Clarity numbers of nodes were calculated using phonemic sentiment analysis, which assesses the sound of "leg and with this . . . vitiligo" to be clearer than the sound of "and with this blotchy vitiligo". The dictionary meanings of blotchy and vitiligo, by contrast, are strongly connected and the Clarity number between these two words (using the method of FIG. 6) is quite high, at 1.4, using the same bigram collocation space that generated the examples in FIG. 6. So if the method of FIG. 6 were used to average the Clarity of all symbols of a node, by cartesian pairing all combinations of symbols against the other symbols of the same node, then inputting all these cartesian pairs to the method of FIG. 6, and averaging each of the outputs from FIG. 6, and using that average as the measure of Clarity for the openness computation method of FIG. 14 at step (9) in place of the phonemic clarity, there would be a more lexical sense of Clarity than the phonemic sense of Clarity which produced the results of FIGS. 62 and 63. In working with scientific literature, this vocabulary based-approach informed by large lexicons would be more accurate, but for social media posts, where what sounds correct is often accepted as correct, even if deeper reasoning shows it to be wrong, the more obvious and humanistic phonemic approach would be more accurate.

Figure 1:
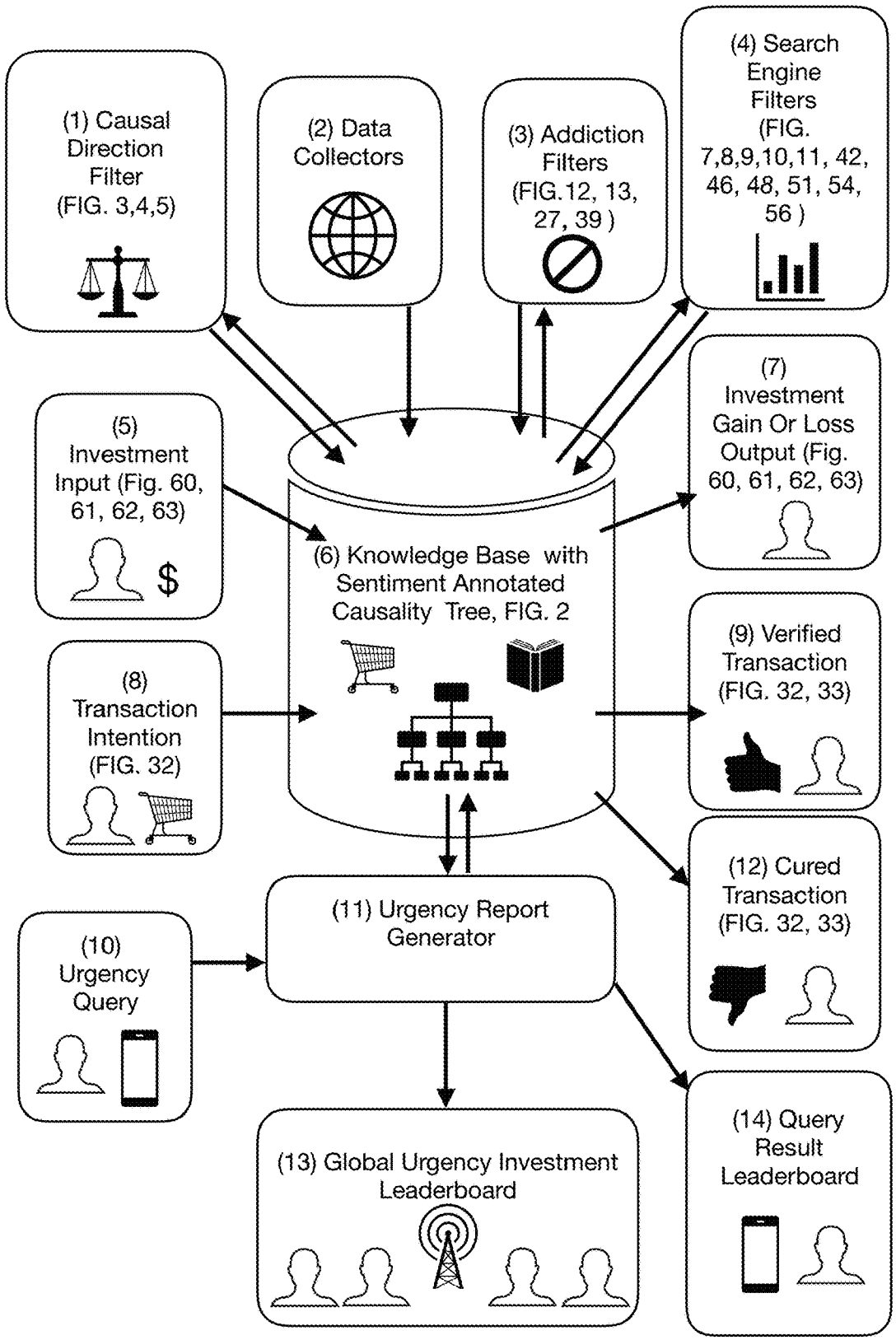
FIG. 1 shows Self-correcting Economic Goals Adjustment System.

FIG. 1 shows the overall system and methods of the present invention, which is arranged to compete effectively with existing monopolies such as Facebook, Google, Twitter, and other monopolistic social media platforms. Just as each of these platforms increases its value to customers by carefully integrating its services and products to reduce the odds that customers ever leave the platform, whatever their social media needs are, the present invention ties-in various essential services and products to cross-leverage, through various cognitive relativity metrics, a seamless community walled-garden social media experience which includes novel open-minded versions of advertising, investment, entertainment and journalism opportunities for both content creators and content consumers. Through (8) Transaction Intention and (9) Verified Transactions components, FIG. 1 also enables the walled-garden community to protect consumer and business owner rights, and trust in those rights, by providing an automatically moderated public forum for fairly settling disputes using metrics of open-mindedness.

Figure 2:
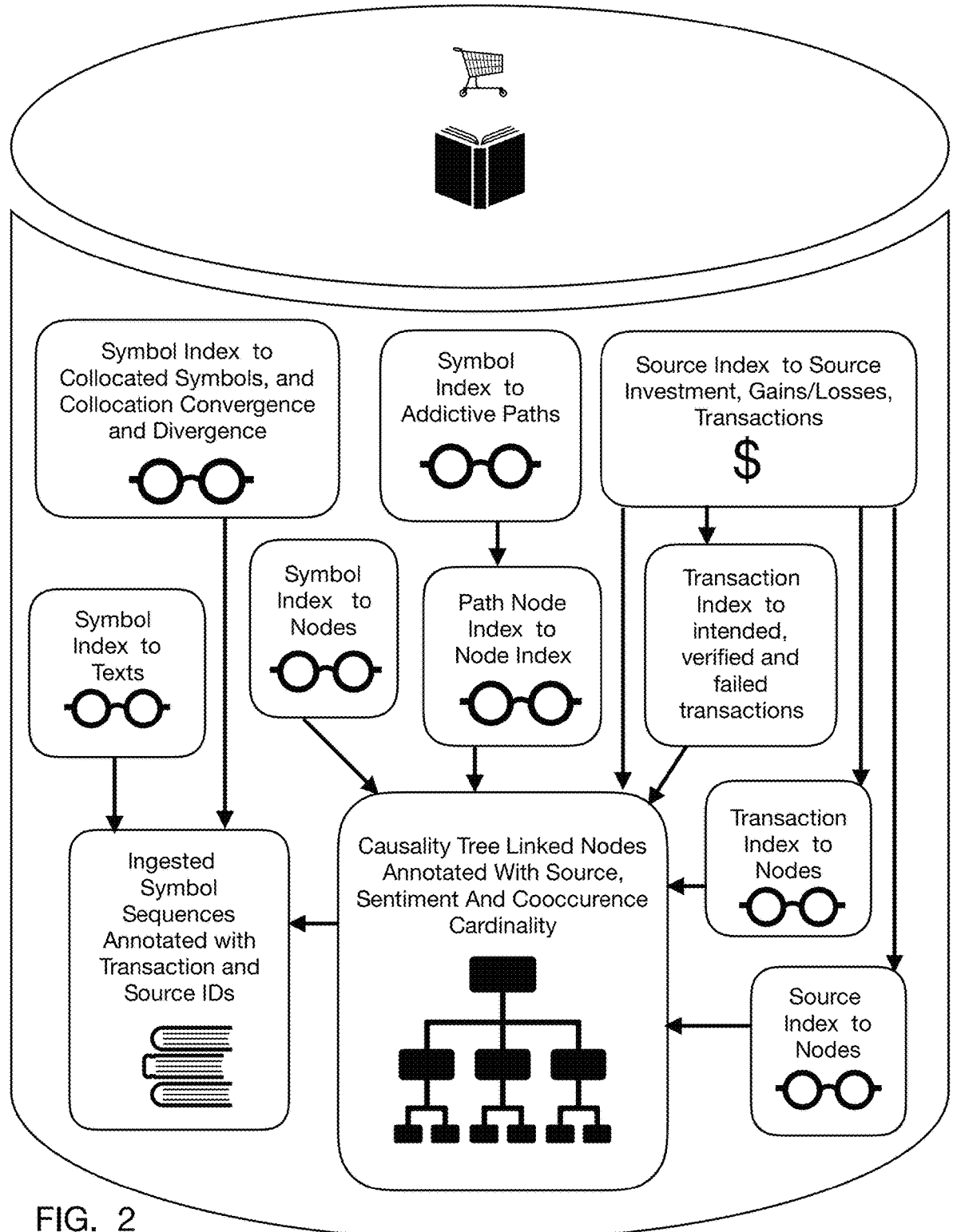
FIG. 2 shows a Global Knowledge Base With Causality Tree.

All the data of FIG. 1 is centralized in a knowledge base shown in FIG. 2. This central knowledge base approach to publishing knowledge arbitrage investments enables the present invention to outperform traditional financial instruments such as stock and bonds, by providing details about specific concepts and causal nodes which are invested in, thus basing investments on much finer details than traditional instruments, just as Google AdSense provides more specificity than traditional television and newspaper advertising. The present invention enables investments made into specific individual ideas and concepts, as posted in the investor's own descriptors. So long as these posts bear fruit in subsequent conversational threads, leading to greater open-minded of discussions, the poster's investments will bear fruit. Bypassing the cumbersome structures of stock issuance and corporate governance, the present invention gives individuals of society some direct tools for allocating economic resources following the latest available knowledge arbitrage data, which in turn correct the three common flaws of Awareness generated by natural selection processes.

Figure 78:
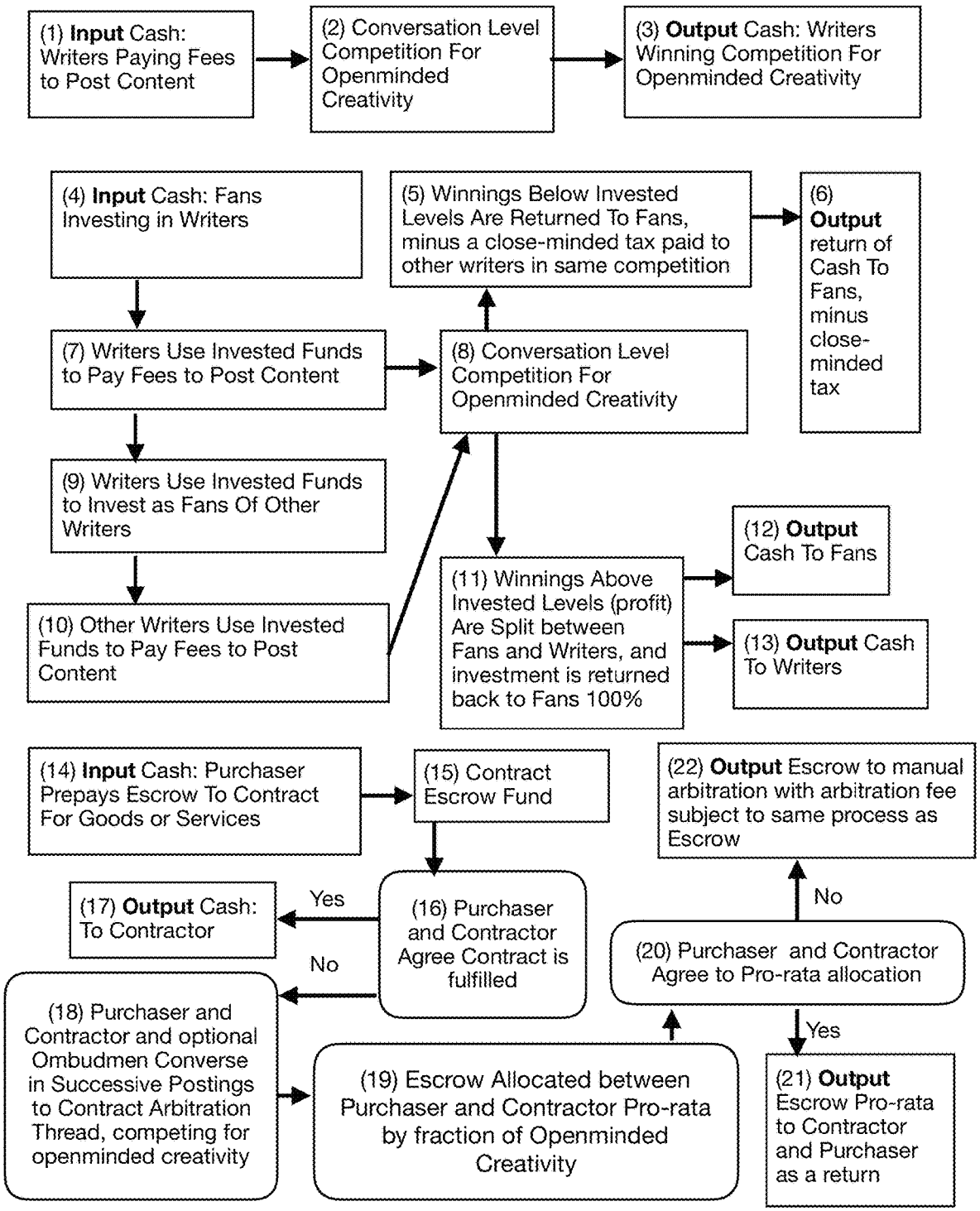
FIG. 78 shows Examples Of Cash Flows For Incentivizing Openminded Creativity.

Since development of the central creative knowledge base of FIG. 1 is a social good, the present invention teach many methods for supporting, subsidizing or investing in that development. FIG. 78 shows three general but thematically related methods and their cash flows. Step (1) is a creativity contest which rewards high creativity writers. Step (4) is a passive investment method for 'Fans' to invest in their favorite writers, by subsidizing the postings of these writers in step (7). When successful at competing creatively with other writers, these postings each profits which are split between fans that subsidized them and the writers that created the content, in step (11). On the other hand, these passive investments are at risk since writers who fail to compete creativity in conversational level Twitter-like conversation threads, step (6).

A third way the development of the central knowledge base of FIG. 1 is supported is in the field of smart contracts and Yelp-like reviews on contractual fulfillment, shown in FIG. 78. Step (14) shows the initiation of smart contracts, for instance a restaurant dinner bill, which can be reduced for negative reviews which are also open-mindedly creative, in competition with positive responses from providers such as restaurant managers, for example as shown in FIGS. 25, 30, 31 and 32. Should the negative reviews be more creative than the responses, the smart contract awards a discount to the customer as automatic compensation, in step (18) and (19), in pro-rata allocation. Should this be acceptable, the payment for services is automatically adjusted, in step (22), and if not, another arbitration level takes over in step (18) again, where an ombudsman now participates in the conversation and guides the conversation to a pro-rata allocation all can agree on. All content created by theses arbitration conversations become part of the knowledge base, sorted by creativity for future references, recording a deeper understanding of the smart contracts, just as Yelp records a better understanding of which serviced providers are best. The present invention however enables automated moderation of those understandings.

Figure 79:
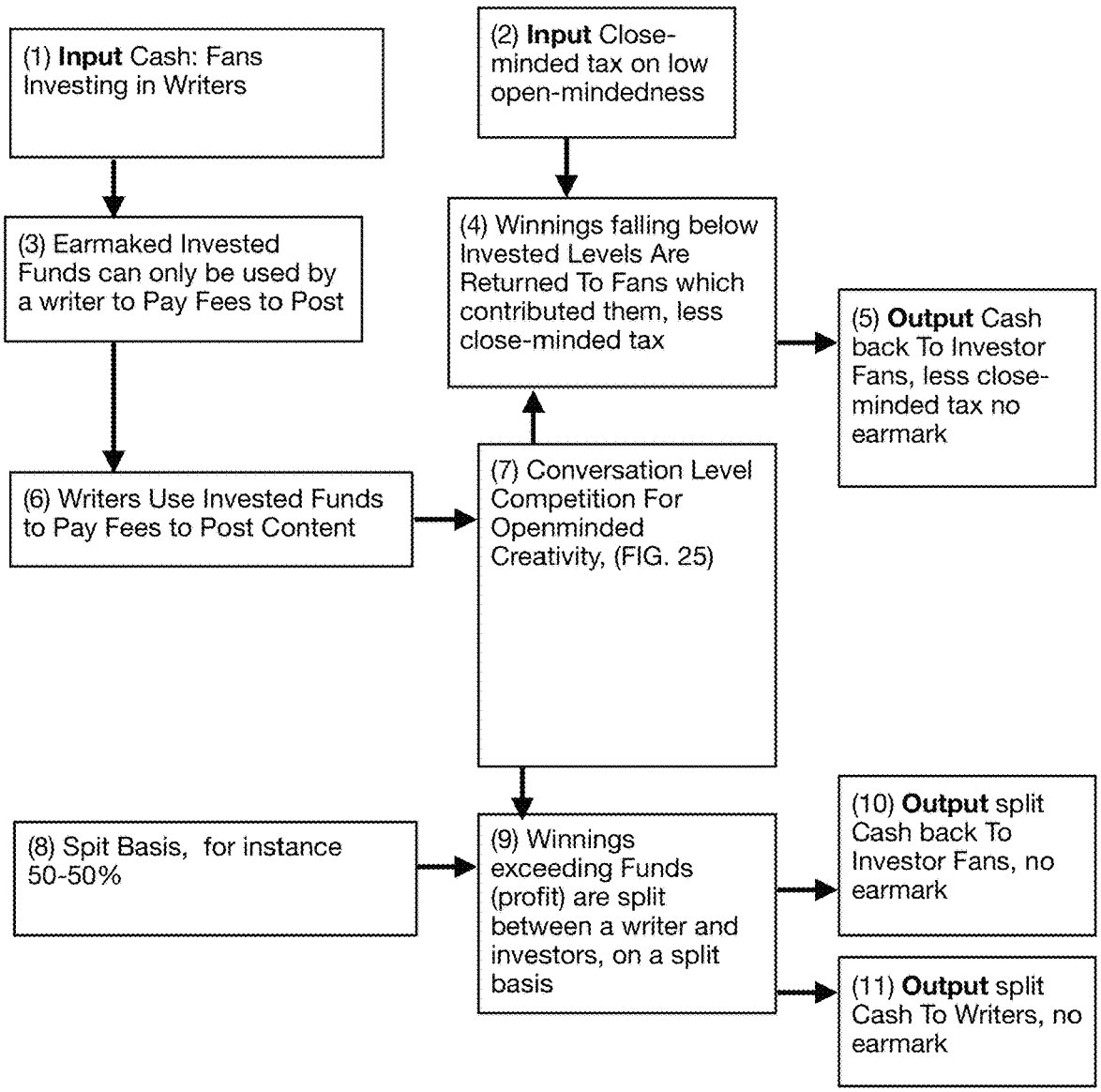
FIG. 79 shows a Method Of Investing In Content Producers Using Cognitive Relativity.

The present invention uses the method of FIG. 25 to extend passive investment options: FIG. 79. Step (1) accepts passive investment from 'Fans' to pass on to 'Writers'. In a simple smart contract, as step (3) shows, this investment cannot be spent on the writers themselves, but only on their postings in the system of FIG. 1. Should the postings succeed in conversational level competition of the method in FIG. 25, the profits are split between writer and fan, and the whole investment returns back to fans, in step (11) and step (12). However, if the postings fail in competitions, the passive investment is at risk and suffers losses, which become profits to the other writers in the same conversations of FIG. 25. In FIG. 79 these losses are referred to as the close-minded tax, and the reduced cash investment is then returned back to fans less that tax in step (5).

Figure 80:
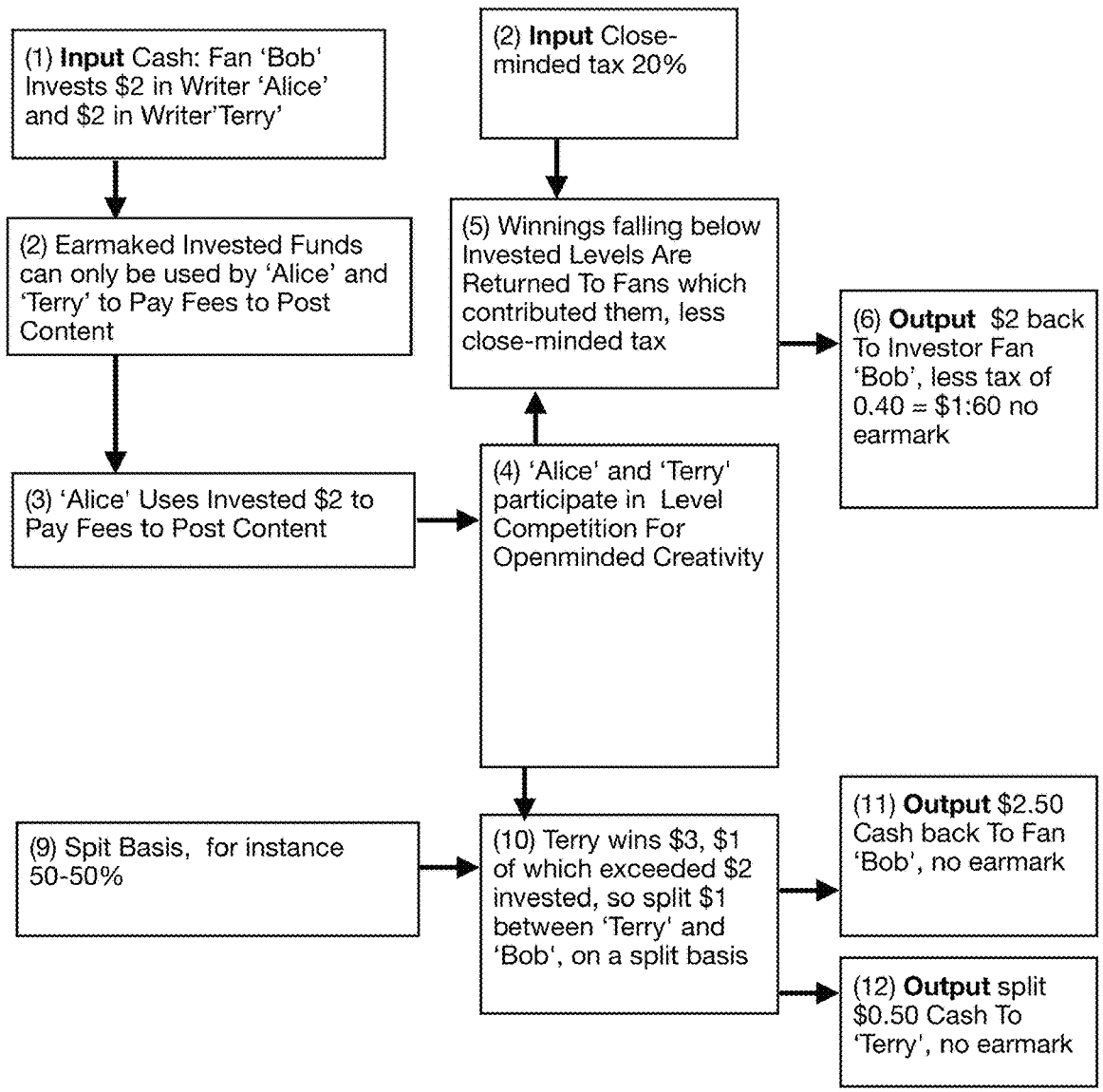
FIG. 80 shows an Example Of Investing In Content Producers Using Cognitive Relativity.
Figure 81:
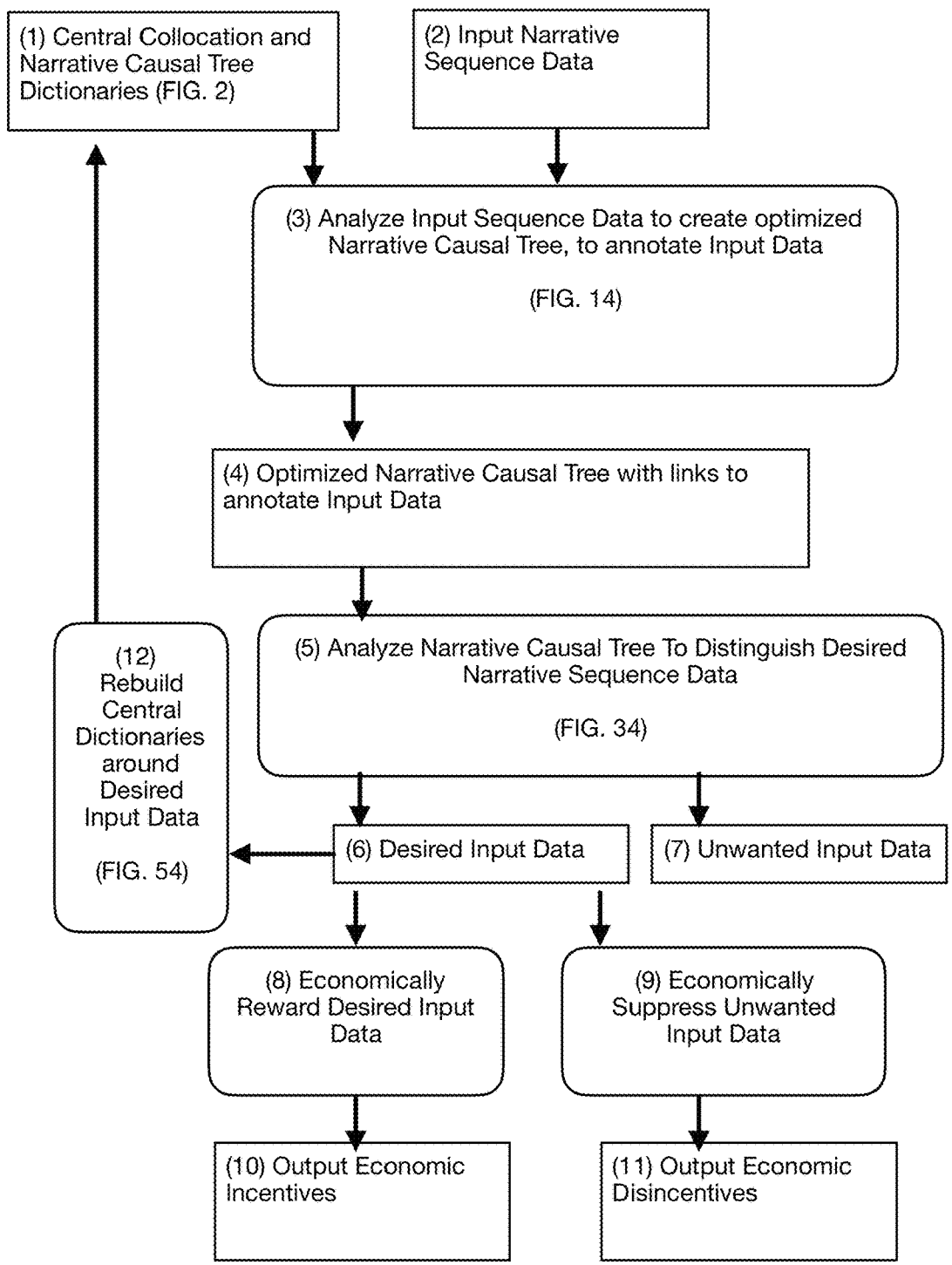
FIG. 81 shows a Method Of Integrating Local Detailed Knowledge With Global Knowledge Optimizations.

FIG. 80 shows an example of an investor 'Bob' who passively invests in $2 each in writers 'Alice' and 'Terry'. Unfortunately for 'Bob', his passive investment of $2 in 'Alice' fails and he takes a haircut on its value, which returns to him as $1.60. His passive investment in 'Terry' succeeds and returns to him as $2.50. The present invention also teaches the creation of leaderboard funds analogous to the S&P 500, comprising historic top creative content writers, as in FIG. 83, so passive investors can simply invest in the fund instead of picking individual writers. For these index-fund style investors, their investment is in the marketplace itself and resembles lower risk, lower yield index fund investments in the stock market, but one in which the market analysts and company executives transparently complete to create knowledge in the market as in FIG. 1.

As earlier stated in the Summary Of The Invention, the present invention teaches a novel crypto currency backed by the value of the creative content indexes by methods of the present invention. Not only is this backing enabled by the leaderboard fund indices, but also the passive investments smart-contracts can be a decentralized crypto currently with extremely low transaction costs enabled by creativity metrics of the present invention.

Figure 82:
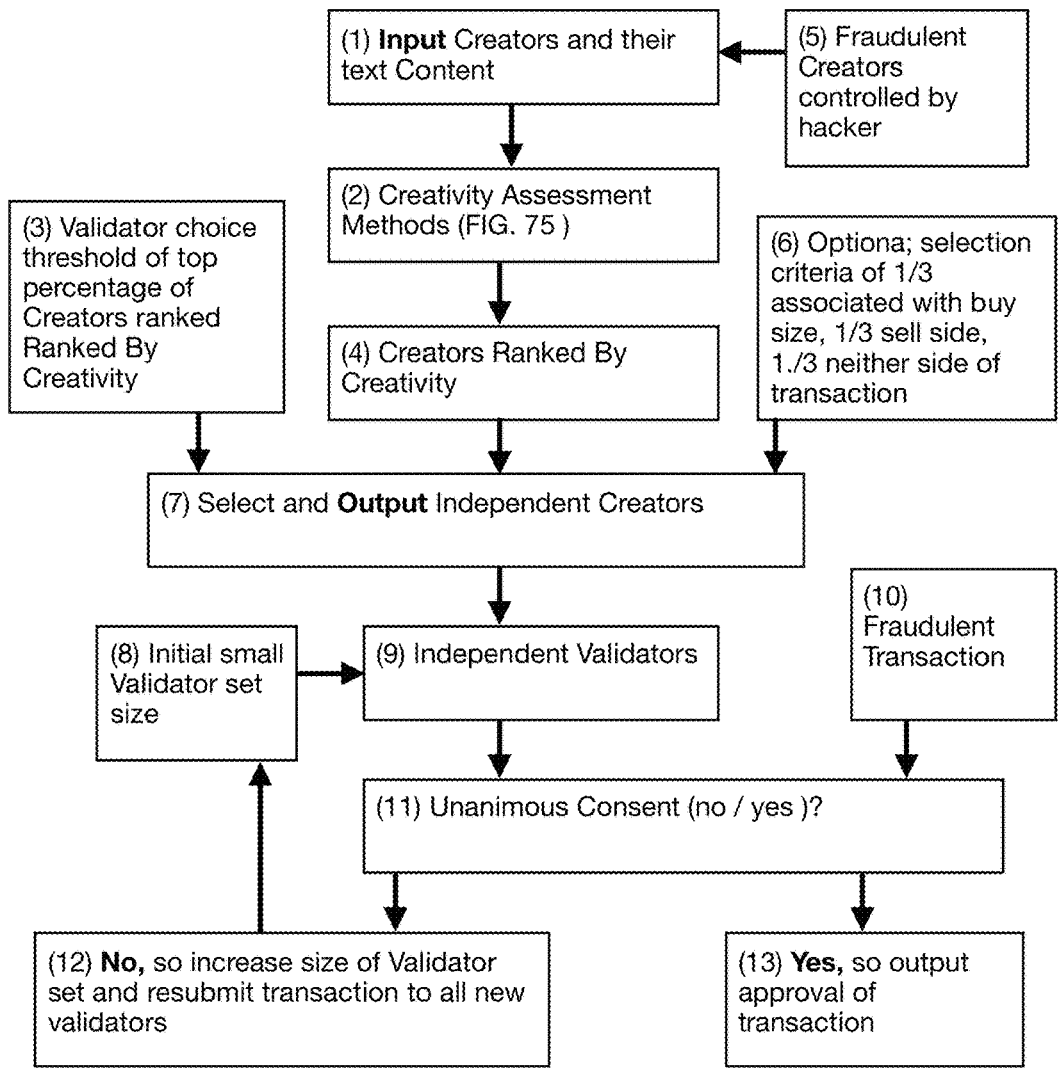
FIG. 82 shows a flowchart where Independent Creators are useful For Governance, Appeals And Transaction Validation.

FIG. 82 shows a method for choosing independent validators of this novel cryptocurrency, by choosing a top percentage of creative content writers, in step (7). These validators are independent enough to reduce the number of validators far lower than prior art proof of stake methods, thus increasing transaction speed and reducing transaction costs. Using unanimous consent instead of majority consent also reduces the number of validators needed, as does choosing validators historically associated with the buy side, the sell side and neither side of each specific transaction. When unanimous consent is not reached, the method of FIG. 82 escalates validation to higher numbers of validators thus automatically investigating suspicious transactions for fraud.

Figure 83:
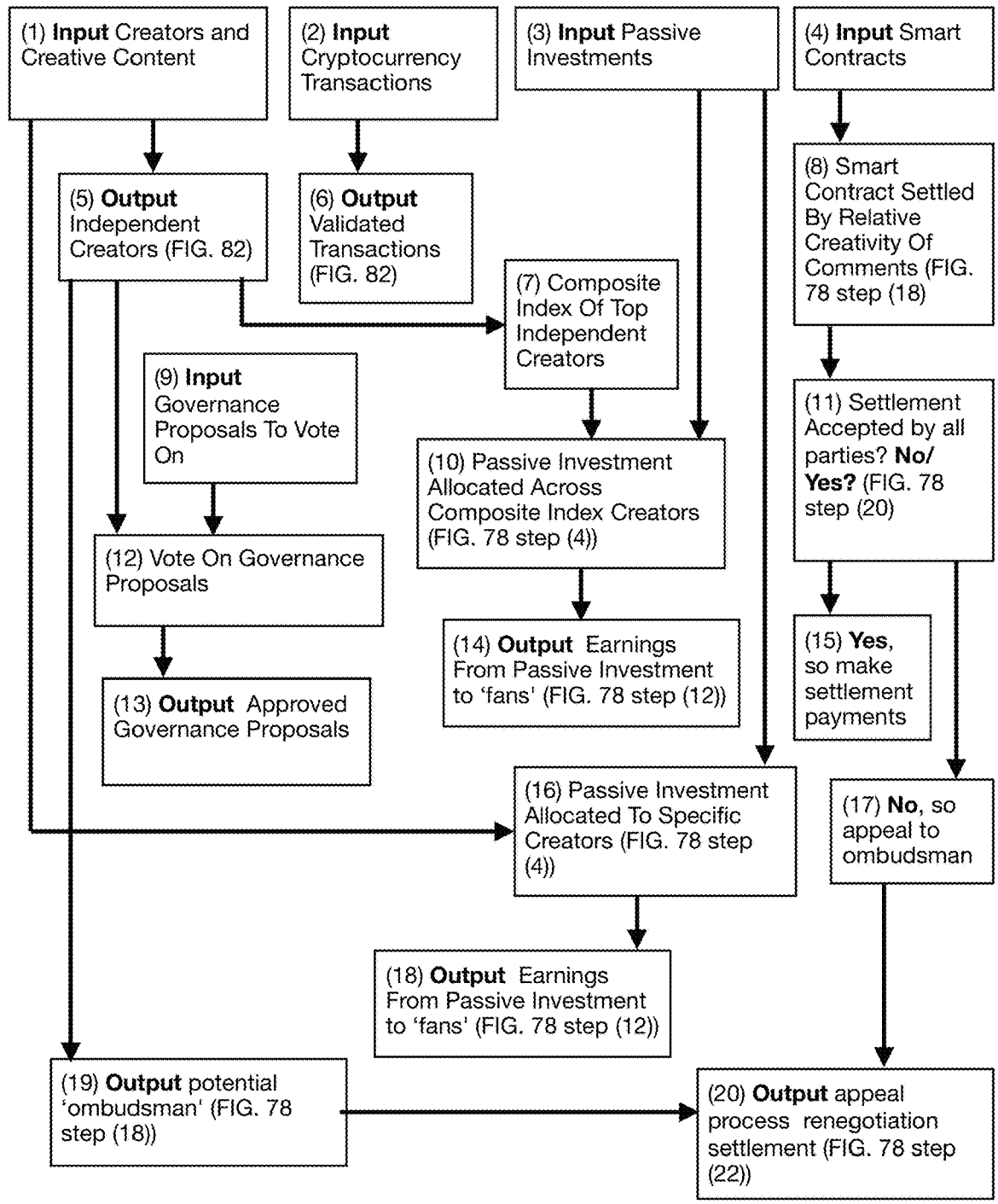
FIG. 83 shows Creativity Based Governance, Appeals And Investment Methods.

Since FIG. 1 provides general knowledge for the social good, it's important for any major social media portal implementing FIG. 1 to be scalable, trustable, transparent and accountable in its decisions. To that end, FIG. 83 outlines governance based on the trusted validators of FIG. 82, with uses them to vote on governance proposals such as software and hardware updates to the system of FIG. 1, as well as track index fund passive investments and payouts, FIG. 83 step (14), and for trusted validators to be ombudsman support for arbitrating smart contracts in FIG. 78, as shown in FIG. 83 step (20).

I claim:

1. A computer implemented system and method for allocating resources to creators of information content, allocating greater resources to creators of content whose content is associated with greater creativity numbers, wherein creativity numbers are calculated in a thought space comprising nodes representing symbols parsed from content and linked into causal paths, wherein causal paths are associated with higher creativity for simultaneous lesser rootedness and greater clarity in comparing nodes in the cause to effect direction along causal paths.

2. A system as in claim 1 wherein rootedness is calculated from a cardinality of distinct collocations of a node's symbols with other symbols in a dictionary of usage.

3. A system as in claim 1 wherein clarity is calculated between symbols of a node, wherein clarity between a first symbol and a second symbol is calculated by dividing convergence of usages between the first symbol and second symbol, by the divergent of usages between the first symbol and the second symbol.

4. A system as in claim 3 wherein the convergence of usages is calculated from a cardinality of distinct symbols collocated both with the first symbol and with the second symbol, and wherein the divergence of usages is calculated from a cardinality of disjunctions between symbols collocated with the first symbol and symbols collocated with the second symbol.

5. A system as in claim 1 wherein open-mindedness is calculated from a gradient difference between rootward cause nodes and leafward effect nodes along causal paths.

6. A system as in claim 5 wherein creators are rewarded for open-minded content, with profits on their investment of time or money into making content, and creators of close-minded content suffer losses on their investment of time or money into making content.

7. A system as in claim 6 wherein passive investment index funds are automatically created around top performing most profitable creators.

8. A system as in claim 6 wherein cryptocurrency transaction validation rights are automatically assigned to top performing most profitable creators.

9. A system as in claim 6 wherein smart contracts automatically adjust payment amounts of disputed contracts, with disputes conducted in conversational threads, wherein conversational thread analysis for creativity to adjust payment amounts to favor the more open-mindedly creative thread participants.

10. A system as in claim 6 wherein ombudsmen participate in appeal level smart contract arbitration, in appeal level conversational threads, wherein ombudsmen are chosen from top performing most profitable creators.

11. A system as in claim 6 wherein votes in governance proposals are made by top performing most profitable creators.

12. A system as in claim 5 wherein an empirical polysemous causal dictionary is automatically generated from narrative text.

* * * * *